(12) United States Patent
Marston et al.

(10) Patent No.: US 10,336,602 B2
(45) Date of Patent: Jul. 2, 2019

(54) FUEL DELIVERY MANAGEMENT SYSTEM

(71) Applicant: FRANKLIN FUELING SYSTEMS, INC., Madison, WI (US)

(72) Inventors: Daniel H. Marston, Old Orchard Beach, ME (US); Andrew P. Knapp, McFarland, WI (US); Jason A. Nees, Huntertown, IN (US); Randall S. Boucher, Saco, ME (US); Barrett L. Stetson, Portland, ME (US)

(73) Assignee: Franklin Fueling Systems, LLC, Madison, WI (US)

( * ) Notice: Subject to any disclaimer, the term of this patent is extended or adjusted under 35 U.S.C. 154(b) by 0 days.

(21) Appl. No.: 15/149,555

(22) Filed: May 9, 2016

(65) Prior Publication Data
US 2017/0096325 A1 Apr. 6, 2017

Related U.S. Application Data

(63) Continuation of application No. 13/630,126, filed on Sep. 28, 2012, now Pat. No. 9,352,951.

(51) Int. Cl.
*G06F 3/048* (2013.01)
*B67D 7/08* (2010.01)
(Continued)

(52) U.S. Cl.
CPC .............. *B67D 7/08* (2013.01); *B67D 7/02* (2013.01); *B67D 7/06* (2013.01); *G06F 3/0488* (2013.01);
(Continued)

(58) Field of Classification Search
CPC ... G06F 3/00; G06F 3/01; G06F 3/041; G06F 3/048; G06F 3/0484; G06F 3/0488;
(Continued)

(56) References Cited

U.S. PATENT DOCUMENTS 6,005,578 A * 12/1999 Cole ................... G06F 3/04815
715/854
6,128,551 A * 10/2000 Davis ................... G06Q 20/341
700/236

(Continued)

OTHER PUBLICATIONS

Veeder-Root, *TLS-4XX Setup and Operation Screens Manual*, Manual No. 577013-940 Revision B; © Veeder-Root 2008, 405 pages.

(Continued)

*Primary Examiner* — Xiomara L Bautista
(74) *Attorney, Agent, or Firm* — Faegre Baker Daniels LLP

(57) ABSTRACT

A console for a fuel delivery management system, including a processor, a touch-sensitive display, a plurality of ports configured to facilitate communications with a plurality of lines, tanks, containments, sensors and pumps, and a memory including a plurality of instructions which when executed by the processor cause the console to generate a home screen on the display, the home screen having a quick jump menu icon which when activated by a user, causes the processor to generate a navigation window on the home screen, the navigation window including a plurality of function icons, each corresponding to a function screen, wherein activation of one of the plurality of function icons causes the processor to generate a function screen including a graphic indication of a parameter of one of the plurality of lines, tanks, containments, sensors and pumps.

10 Claims, 87 Drawing Sheets

(51) Int. Cl.
| | | |
|---|---|---|
| *B67D 7/06* | (2010.01) | |
| *B67D 7/02* | (2010.01) | |
| *G06F 3/0481* | (2013.01) | |
| *G06F 3/0488* | (2013.01) | |
| *G06F 3/14* | (2006.01) | |
| *B67D 7/04* | (2010.01) | |
| *G06F 3/0482* | (2013.01) | |

(52) U.S. Cl.
CPC ............ *G06F 3/04817* (2013.01); *G06F 3/14* (2013.01); *B67D 2007/0442* (2013.01); *G06F 3/0482* (2013.01); *G06F 3/04886* (2013.01)

(58) Field of Classification Search
CPC ...... G06F 3/04883; G06F 3/044; G06F 3/016; G06F 3/0481; G06F 3/0482; G06F 9/4443; G06F 8/34; B65D 90/00; B65D 90/48
See application file for complete search history.

(56) References Cited

U.S. PATENT DOCUMENTS

| | | | | |
|---|---|---|---|---|
| 6,246,402 B1* | 6/2001 | Setogawa | ............ | G11B 19/022 386/281 |
| 6,360,137 B1 | 3/2002 | Royal, Jr. et al. | | |
| 6,415,164 B1* | 7/2002 | Blanchard | ......... | H04M 1/72547 379/387.01 |
| 7,295,919 B2* | 11/2007 | Humphrey | ............ | G01F 15/061 701/533 |
| 8,434,020 B2* | 4/2013 | Martyn | ................. | G06F 3/0482 715/808 |
| 8,566,923 B2* | 10/2013 | Fredette | .................... | G06F 8/34 715/853 |
| 8,713,476 B2* | 4/2014 | Martyn | ................. | G06F 3/0482 715/808 |
| 9,352,951 B2 | 5/2016 | Marston et al. | | |
| 9,733,804 B2* | 8/2017 | Huang | .................. | G06F 3/0484 |
| 2004/0155909 A1* | 8/2004 | Wagner | ............... | G06F 3/04817 715/854 |
| 2006/0036515 A1* | 2/2006 | Ingalsbe | .............. | G06Q 10/087 705/28 |
| 2006/0271623 A1 | 11/2006 | Horowitz et al. | | |
| 2007/0050752 A1* | 3/2007 | Woodall | ................ | G06F 17/211 717/105 |
| 2007/0083152 A1* | 4/2007 | Williams, Jr. | ......... | A61M 5/172 604/65 |
| 2007/0251951 A1* | 11/2007 | Miller | ................ | G01F 23/0069 222/64 |
| 2008/0216008 A1* | 9/2008 | McCampbell | ......... | G05B 11/00 715/772 |
| 2008/0319808 A1* | 12/2008 | Wofford | ................. | G06Q 10/02 705/6 |
| 2009/0048707 A1* | 2/2009 | DeLine | .................... | B67D 7/08 700/231 |
| 2009/0126481 A1* | 5/2009 | Burris | ................. | G01F 23/2962 73/290 V |
| 2010/0241277 A1* | 9/2010 | Humphrey | .......... | G01F 23/0076 700/282 |
| 2010/0245259 A1* | 9/2010 | Bairagi | .............. | G05B 19/0423 345/173 |
| 2011/0071420 A1* | 3/2011 | St. Pierre | ........... | A61B 5/02055 600/549 |
| 2011/0147194 A1* | 6/2011 | Kamen | ................ | B01D 1/0082 202/185.1 |
| 2012/0065793 A1* | 3/2012 | Kaji | .......................... | H02J 3/14 700/291 |
| 2012/0260217 A1* | 10/2012 | Celebisoy | ........... | G06F 3/04815 715/836 |
| 2012/0272145 A1* | 10/2012 | Ryan | .................... | G11B 19/025 715/702 |
| 2012/0278454 A1 | 11/2012 | Stewart et al. | | |
| 2013/0007650 A1* | 1/2013 | Van Hoy | ................... | B64F 1/28 715/771 |
| 2013/0008361 A1* | 1/2013 | Trevino | ............... | A01B 79/005 111/120 |
| 2013/0086933 A1* | 4/2013 | Holtkamp | ............... | F25D 29/00 62/129 |
| 2013/0090946 A1* | 4/2013 | Foo | ........................ | G06Q 10/06 705/3 |
| 2013/0144827 A1* | 6/2013 | Trevino | ................... | G06N 5/02 706/46 |
| 2013/0187768 A1* | 7/2013 | Eisterhold | .............. | G08C 17/02 340/12.53 |
| 2014/0107835 A1 | 4/2014 | Biasi et al. | | |
| 2014/0125496 A1* | 5/2014 | D'Alessandro | ..... | G01F 23/0069 340/870.11 |

OTHER PUBLICATIONS

Franklin Fueling Systems, *Colibri Tank Monitoring System, CL6 Series, Set-Up and Operator's Guide*, 2009, 32 pages.
Franklin Fueling Systems, *T5 Series, Fuel Management System, Thermal Brochure*, Jun. 2010, 4 pages.
Franklin Fueling Systems, *Fuel Management Systems, Programming Guide, T5 Series*, 2011, pp. 18, 19, 20, 36, 37.
OPW Fuel Management Systems, *Leading the Way in Electronic Fuel Management Systems*, a Dover Company, 2011, 20 pages.
Fafnir, *VISY-Monitor, Software Application*, www.fafnir.com, Feb. 2012, pp. 41-42.
Fafnir, *VISY-Tank, Central Software Application*, www.fafnir.com, Feb. 2012, pp. 43-44.
Franklin Fueling Systems, *Fuel Management Systems, Global Product Catalog*, effective Jun. 1, 2012, pp. 9, 11, 13, 17.
Omnitec, *Proteus® Mini-Me™ Universal Remote Display*, Part No. RD7CTS, rev. date Jul. 10, 2012.
Fafnir, *VISY-X, Automatic Tank Gauging System*, www.fafnir.com, Jul. 2012, 52 pages.
Quickborn Consulting, *POS for Fuel and Convenience*, available at least as early as Aug. 1, 2012, 4 pages.
International Search Report in PCT/US2012/057978, dated Mar. 28, 2013, 2 pages.
Office Action issued by the Canadian Patent Office, dated Jul. 23, 2018, for Canadian Patent Application No. 2,885,866, 4 pages.

* cited by examiner

```
FFS TS-550 eva
Franklin Fueling Systems
    3760 Marsh Road
      Madison, WI
      608-838-8786
          USA
  09/24/2012 14:06:22

INVENTORY REPORT units:gal, in, °F, 95 %

TANKS

Unleaded
Unleaded
Capacity        10,152.3
Gross            7,571.3
Net              7,527.0
Level              67.15
Temperature        68.31
Ullage           2,060.7
Water Volume        12.6
Water Level         0.78

Unleaded 2
Unleaded
Capacity        10,152.3
Gross            7,552.8
Net              7,506.1
Level              66.99
Temperature        68.78
Ullage           2,080.0
Water Volume        11.9
Water Level         0.75

Super
Super
Capacity        10,152.3
Gross            7,528.4
Net              7,485.0
Level              66.73
Temperature        69.25
Ullage           2,111.6
Water Volume         4.6
Water Level         0.40
```

```
Super 2
Super
Capacity        10,152.3
Gross            7,504.4
Net              7,459.0
Level              66.51
Temperature        69.72
Ullage           2,138.9
Water Volume         1.4
Water Level         0.18

Diesel
Diesel
Capacity        10,152.3
Gross            7,467.8
Net              7,414.2
Level              66.24
Temperature        70.19
Ullage           2,172.9
Water Volume         4.1
Water Level         0.37

Diesel 2
Diesel
Capacity        10,152.3
Gross            7,443.4
Net              7,387.5
Level              66.02
Temperature        70.67
Ullage           2,200.2
Water Volume         1.0
Water Level         0.15
```

FIGURE 9A

```
Kerosene
Kerosene
Capacity        10,152.3
Gross            7,420.1
Net              7,379.0
Level               65.83
Temperature         71.14
Ullage           2,224.5
Water Volume         0.0
Water Level          0.01

Manifolds

Unleaded Man
Unleaded
Capacity        20,304.6
Gross           15,124.1
Net             15,033.1
Ullage           4,140.7

Diesel Man
Diesel
Capacity        20,304.6
Gross           14,911.2
Net             14,801.7
Ullage           4,373.1
```

FIGURE 9B

```
       FFS TS-550 eva
   Franklin Fueling Systems
       3760 Marsh Road
         Madison, WI
         608-838-8786
             USA
    09/24/2012 14:13:33                          3 WIRE SENSOR SENSOR REPORT                       Unlead Int
         Last Available                      Ok
                                             09/24/2012 14:13:33
         2 WIRE SENSOR
                                             Super Int
   Unlead STP                                Ok
   Ok                                        09/24/2012 14:13:33
   09/24/2012 14:13:33
                                             Diesel Int
   Super STP                                 Ok
   Ok                                        09/24/2012 14:13:33
   09/24/2012 14:13:33
                                             Kerosene Int
   Diesel STP                                Ok
   Ok                                        09/24/2012 14:13:33
   09/24/2012 14:13:33

Kerosene STP                                   MAG SENSOR
   Ok
   09/24/2012 14:13:33
                                                No Records Found
   Disp 1-2
   Ok
   09/24/2012 14:13:33

Disp 3-4
   Ok
   09/24/2012 14:13:33

Disp 5-6
   Ok
   09/24/2014 14:13:33
```

FIGURE 19

```
FFS TS-550 eva                    Frequency:              0
Franklin Fueling Systems          Flow Rate:           0.00
3760 Marsh Road                      Controller Switches
Madison, WI                       Mast-Slave:           Off
608-838-8786                      Auto Restart:         Off
USA                               Alt Circuit:          Off
09/24/2012 14:14:34               Exten Run:             On
                                  Fault Shut:           Off
PUMP STATUS REPORT                Fault Read:           Off
                                  Bypass:               Off
units: gal, °F, psi, gph
                                  Pump         Super 1 SCI
Pump         Unleaded SCI         State            Enabled
State            Enabled          Status                Ok
Status                Ok          Pump On              Off
Pump On              Off          Address:               2
Address:               0          Type:            Smart 1
Type:            Smart 1          Voltage:             208
Voltage:             208          Cal Voltage:         208
Cal Voltage:         208          Current:               0
Current:               0          Cal Current:          10
Cal Current:          10          Power:                 0
Power:                 0          Cal Power:          1000
Cal Power:          1000          Frequency:             0
Frequency:             0          Flow Rate:          0.00
Flow Rate:          0.00             Controller Switches
   Controller Switches            Mast-Slave:          Off
Mast-Slave:          Off          Auto Restart:        Off
Auto Restart:        Off          Alt Circuit:         Off
Alt Circuit:         Off          Exten Run:            On
Exten Run:            On          Fault Shut:          Off
Fault Shut:          Off          Fault Read:          Off
Fault Read:          Off          Bypass:              Off
Bypass:              Off Pump        Unleaded 2 SCI
State            Enabled
Status                Ok
Pump On              Off
Address:               1                 FIGURE 22A
Type:            Smart 1
Voltage:             208
Cal Voltage:         208
Current:               0
Cal Current:          10
Power:                 0
Cal Power:          1000
```

```
Pump          Super 2 SCI         Pump          Diesel 2 VFC
State             Enabled         State             Enabled
Status                 Ok         Status                 Ok
Pump On               Off         Pump On               Off
Address:                3         Address:                5
Type:             Smart 1         Type:             Mag/Eco
Voltage:              208         Voltage:              208
Cal Voltage:          208         Current:                0
Current:                0         Power:                  0
Cal Current:           10         Frequency:              0
Power:                  0         Flow Rate:           0.00
Cal Power:           1000         Pressure:           32.01
Frequency:              0         Temperature:       140.00
Flow Rate:           0.00            Controller Switches
   Controller Switches            Product:              Gas
Mast-Slave            Off         Compensation:Comp 3 Most
Auto Restart:         Off         Nom Power:           4 KW
Alt Circuit:          Off         B Press Inc:          Off
Exten Run:             On         Mast-Slave            Off
Fault Shut:           Off         Auto Restart:         Off
Fault Read:           Off         Alt Circuit:          Off
Bypass:               Off         Exten Run:             On
                                  Fault Shut:           Off
Pump          Diesel 1 VFC        Old VFC:              Off
State             Enabled
Status                 Ok
Pump On               Off
Address:                4
Type:             Mag/Eco
Voltage:              208
Current:                0
Power:                  0
Frequency:              0
Flow Rate:           0.00
Pressure:           32.01
Temperature:       140.00
   Controller Switches
Product:              Gas
Compensation:Comp 3 Most
Nom Power:           4 KW
B Press Inc:          Off
Mast-Slave            Off
Auto Restart:         Off
Alt Circuit:          Off
Exten Run:             On
Fault Shut:           Off
Old VFC:              Off
```

FIGURE 22B

FUEL DELIVERY MANAGEMENT SYSTEM

CROSS-REFERENCE TO RELATED APPLICATION

This application is a continuation of U.S. patent application Ser. No. 13/630,126, filed Sep. 28, 2012, titled FUEL DELIVERY MANAGEMENT SYSTEM, the entire disclosure of which is expressly incorporated by reference herein.

FIELD

The present disclosure generally relates to fuel delivery management systems, and more particularly to a system and method for facilitating user control of fuel delivery management systems.

BACKGROUND

Retail fuel sales generally take place at a fuel sales location such as a gas station, truck stop, convenience store or the like. Such fuel sales locations include one or more fuel delivery systems, which generally include one or more underground storage tanks for containing fuel of various types and grades such as gasoline, diesel, kerosene, etc. The systems also include submersible pumps associated with the various tanks for transporting fuel from the tanks through fuel lines to one or more fuel dispensers for use by consumers. Sensors are used to monitor fuel levels, tank and line pressures, and various other system parameters. Signals from the pumps, dispensers, sensors and other system components are provided to a system controller, which may be connected to various other devices at the fuel sales location such as cash registers, printers, etc. Such controllers function to control system operations, monitor system operations, and generate alarms when monitored parameters reach certain thresholds.

As controlling the operation of a fuel delivery system can be complex, it is desirable to provide a user interface which permits rapid navigation between various system functions, provides user programmable functionality to permit execution of certain system function with minimal user input, and provides context sensitive help.

SUMMARY

In one embodiment, the present disclosure provides a fuel delivery management system, including a console having a processor, a touch-sensitive display, a plurality of ports configured to facilitate communications with a plurality of lines, tanks, containments, sensors and pumps, and a memory including a plurality of instructions which when executed by the processor cause the console to generate a home screen on the display, the home screen having a quick jump menu icon which when activated by a user, causes the processor to generate a navigation window on the home screen, the navigation window including a first plurality of function icons which is a subset of a plurality of system function icons, each corresponding to a function screen.

In a variation of this embodiment, the navigation window further includes a left icon and a right icon, which when activated by the user cause the processor to populate the navigation window with a second plurality of function icons that is different from the first plurality of function icons.

In another variation of this embodiment, the plurality of system function icons includes a tanks function icon, which when activated by the user causes the processor to display a tank function screen on the display, the tank function screen including a tank icon which provides a graphic depiction of a level of product contained in a corresponding tank. In a further variant, the tank function screen further includes a numeric indicator associated with the tank icon which provides numeric information about the level of product contained in the corresponding tank.

In yet a further variant, activation of the tank icon causes the processor to display a tank detail screen on the display, the tank detail screen including a detailed tank icon which provides a graphic depiction of the level of product contained in the corresponding tank, a first upper hash mark indicating a high fill alarm limit for the corresponding tank, a first lower hash mark indicating a low fill alarm limit for the tank, and a plurality of tabs, activation of which cause the processor to populate a content field of the tank detail screen with further information relating to the corresponding tank. In a further variant, the detailed tank icon further includes a second upper hash mark indicating a high, high fill alarm limit for the corresponding tank, and a second lower hash mark indicating a low, low fill alarm limit for the corresponding tank. In yet a further variant, the tank function screen and the tank detail screen each include the quick jump menu icon.

In another variation of this embodiment, the plurality of system function icons includes a lines function icon, which when activated by the user causes the processor to display a line function screen on the display, the line function screen including a line icon which provides a graphic depiction of a pressure of fluid in a corresponding line. In a further variant, the line function screen further includes a numeric indicator associated with the line icon which provides numeric information about the pressure of fluid in the corresponding line. In a further variant, activation of the line icon causes the processor to display a line detail screen on the display, the line detail screen including a detailed line icon which provides a graphic depiction of the pressure of fluid product in the corresponding line, and a control button, activation of which causes the processor to display a line control screen on the display, the line control screen including at least one test button, activation of which causes the console to perform a leak test on the corresponding line. In yet a further variant, the line function screen and the line detail screen each include the quick jump menu icon.

In another variation of this embodiment, the plurality of system function icons includes a sensors function icon, which when activated by the user causes the processor to display a sensor function screen on the display, the sensor function screen including a sensor icon which provides a graphic depiction of a status of a corresponding sensor. In a further variant, the sensor function screen further includes the quick jump menu icon.

In yet another variation of this embodiment, the plurality of system function icons includes a pumps function icon, which when activated by the user causes the processor to display a pump function screen on the display, the pump function screen including a pump icon which provides an indication of whether a corresponding pump is active or idle. In a further variant, activation of the pump icon causes the processor to display a pump detail screen on the display, the pump detail screen including a detailed pump icon which provides an indication of whether the corresponding pump is active or idle, a content field which provides further information relating to the corresponding pump, and a control button, activation of which causes the processor to display a pump control screen on the display, the pump control screen including a reset button for resetting the pump. In another variant, the pump function screen and the pump detail screen each include the quick jump menu icon.

In another variation of this embodiment, the home screen further includes a status window which includes system status information and is displayed in one of a plurality of different ways, each corresponding to a different system status.

In another variation of this embodiment, the home screen further includes a plurality of one-touch buttons, each one-touch button corresponding to a different user-selected function of the console and being programmable via a utilities function icon which is accessible using the navigation window. In a further variant, the location of each one-touch button on the home screen is defined by the user.

In another variation of this embodiment, the home screen and each function screen corresponding to the plurality of system function icons includes a help button, activation of which from a currently active screen causes the processor to display a help screen on the display including information corresponding to the currently active screen. In a further variant, the help screen further includes an index selection button, activation of which causes the processor to display a list of available help screens on the display.

In another embodiment, the present disclosure provides a method for controlling a fuel delivery management system, including the steps of providing a console having a touch-sensitive display that generates screens in response to activation of icons on the display, generating a home screen on the console, the home screen including a quick jump menu icon, activation of which results in generation of a navigation window including a plurality of function icons, generating a function screen in response to activation of one of the plurality of function icons, the function screen including the quick jump menu icon and a system component icon corresponding to one of a line, tank, containment, sensor and pump in communication with the console, generating a detail function screen in response to activation of the system component icon, the detail function screen including the quick jump menu icon and a detailed system component icon corresponding to the one of the line, tank, containment, sensor and pump corresponding to the system component icon, and generating the navigation window on the display in response to activation of the quick jump menu icon displayed on one of the function screen and the detail function screen.

A variation of this embodiment further includes the step of displaying a status window on each of the home screen, the function screen and the detailed function screen, the status window including status information and being displayed in a first color when no system alarm condition is present and a second color that is different from the first color when a system alarm condition is present.

Another variation of this embodiment further includes the step of displaying a plurality of one-touch buttons on the home screen, each one-touch button corresponding to a different user-selected function of the console and being programmable using one of the plurality of function icons of the navigation window.

Another variation of this embodiment further includes the steps of displaying a help button on each of the home screen, the function screen and the detailed function screen, and displaying a help screen in response to activation of the help button, the help screen including information corresponding to the home screen, the function screen or the detailed function screen, depending upon which screen was active when the help button was activated. In yet another embodiment, the present disclosure provides a console for a fuel delivery management system, including a processor, a touch-sensitive display, a plurality of ports configured to facilitate communications with a plurality of lines, tanks, containments, sensors and pumps, and a memory including a plurality of instructions which when executed by the processor cause the console to generate a home screen on the display, the home screen having a quick jump menu icon which when activated by a user, causes the processor to generate a navigation window on the home screen, the navigation window including a plurality of function icons, each corresponding to a function screen. Activation of one of the plurality of function icons causes the processor to generate a function screen including a graphic indication of a parameter of one of the plurality of lines, tanks, containments, sensors and pumps. In a variant of this embodiment, the plurality of instructions when executed by the processor further cause the processor to generate a FAST icon, activation of which causes the processor to verify that the correct lines, tanks, containments, sensors and pumps are connected for communications with the console in a factory programmed configuration.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

FIGS. 9A-B depict a tank inventory report printout.

FIG. 19 is a sensor status report printout.

FIGS. 22A-B depict a pump status report printout.

Figure 1:
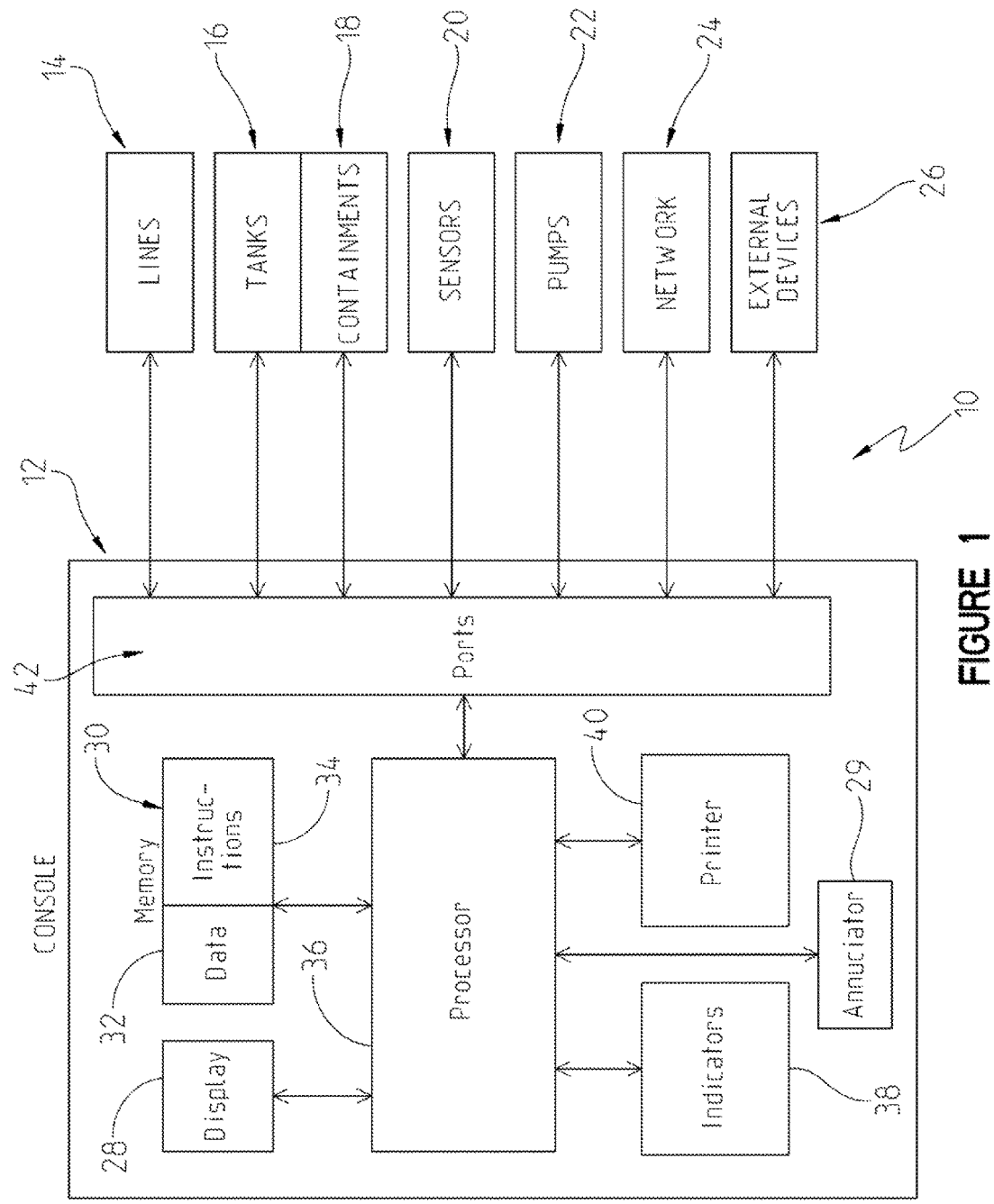
FIG. 1 is a block diagram of a fuel delivery management system.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF EMBODIMENTS OF THE DISCLOSURE

For the purposes of promoting an understanding of the principles of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. The disclosure includes any alterations and further modifications in the illustrated devices and described methods and further applications of the principles taught herein which would normally occur to one skilled in the art to which the disclosure relates.

The terms "network," "local area network," "LAN," "wide area network," or "WAN" mean a connection infrastructure wherein two or more computing devices are connected in such a manner that messages may be transmitted between the devices. In such networks, typically one or more computing devices operate as a "server," a computer with large storage devices such as hard disk drives and communication hardware to operate peripheral devices such as printers or modems. Other devices, termed "workstations," provide a user interface so that users of networks can access the network resources, such as shared data files, common peripheral devices, and inter-workstation communication. The computing devices typically have at least one processor for executing machine instructions, and memory for storing instructions and other information. Many combinations of processing circuitry and information storing equipment are known by those of ordinary skill in these arts. A processor may be a microprocessor, a digital signal processor ("DSP"), a central processing unit ("CPU"), or other circuit or equivalent capable of interpreting instructions or performing logical actions on information. Memory includes both volatile and non-volatile memory, including temporary and cache, in electronic, magnetic, optical, printed, or other format used to store information.

Referring now to FIG. 1, a fuel delivery management system 10 is depicted including a system controller or console 12 in communication with a plurality of lines 14, a plurality of tanks 16, a plurality of containment systems 18, a plurality of sensors 20, a plurality of pumps 22, one or more networks 24, and one or more external devices 26, all of which are described in detail below. In one embodiment, console 12 generally includes a display 28, a memory 30 including data 32 and instructions 34, a processor 36, one or more indicators 38, an internal printer 40, and a plurality of communication ports 42.

Figure 2:
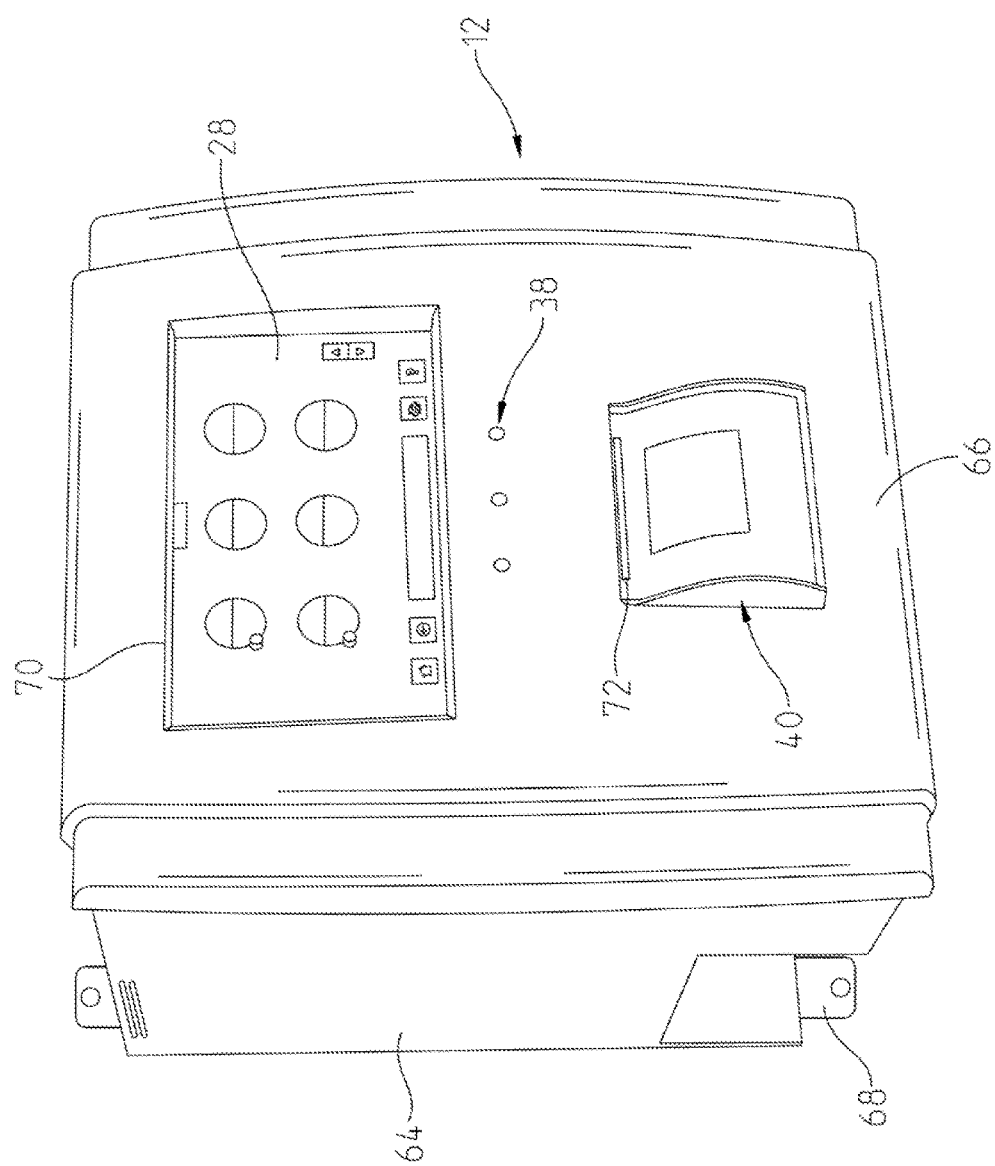
FIG. 2 is a perspective view of a console according to the teachings of the present disclosure.

Console 12 is an open architecture, modular computing device with a highly evolved graphic user interface (described below) which enables users to monitor and control a plurality of components of fueling system 10. As best shown in FIG. 2, console 12 is configured with a housing 64 having a front panel 66 and mounting brackets 68. Display 28 is mounted to be accessible through an opening 70 in front panel 66. Similarly, printer 40 is mounted within housing 64 to be accessible through an opening 72 in front panel 66. Indicators 38 are likewise mounted to front panel 66 to be viewed by a user. In a typical installation, console 12 is mounted to a wall inside an area of a fuel sales location that is accessible only by employees.

In one embodiment, display 28 is a color LCD touch screen display which functions both as an output display device and an input device. Display 28 provides a plurality of different information and control screens (described in detail below) which may be navigated by a user through contact with various buttons and/or icons displayed on the screens. The user is provided soft keyboards and/or keypads where appropriate to enter textual and numeric information into console 12.

Memory 30 may include any of a variety of memory devices suitable for storing data 32 and instructions 34. As is further described below, data 32 includes a plurality of different variables and parameters relating to components of system 10 as well as historical performance information that may be retrieved using the reporting functions of console 12 as is further described below. Instructions 34 include an operating system and a plurality of software modules which enable the functions described below. As will be understood by those skilled in the art, instructions 34 may be configured in a variety of suitable programming languages and/or configurations.

Memory 30 includes computer readable media. Computer-readable media may be any available media that may be accessed by processor 36 of console 12 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other non-transitory medium which may be used to store the desired information and which may be accessed by processor 36.

While processor 36 is depicted in FIG. 1 as a single block, it should be understood that processor 36 includes a plurality of different electronic components configured in circuits to perform the various control and communication functions described below. Processor 36 includes at least one microcontroller which functions as a computing device that receives information and commands, processes such information and commands, and outputs information and commands to other components of system 10. In one embodiment, processor 36 represents a distributed processing system with multiple processing units linked together through a CAN Open back plane. Throughout this disclosure, console 12 is described as performing various functions. More particularly, these functions are primarily performed by processor 36 accessing instructions 34 and data 32 of memory 30, accessing various system components through ports 42, and updating screens on display 28 and/or providing outputs through indicators 38, printer 40, or external devices 26.

Indicators 38 provide users with instant visual information about the general status of system 10. In one embodiment, indicators 38 include a green LED 74 which indicates that console 12 is powered and in operation, a yellow LED 76 which indicates that console 12 has detected a malfunction or a warning condition, and a red LED 78 which indicates that console 12 has detected an alarm condition as is further described below.

Figure 3:
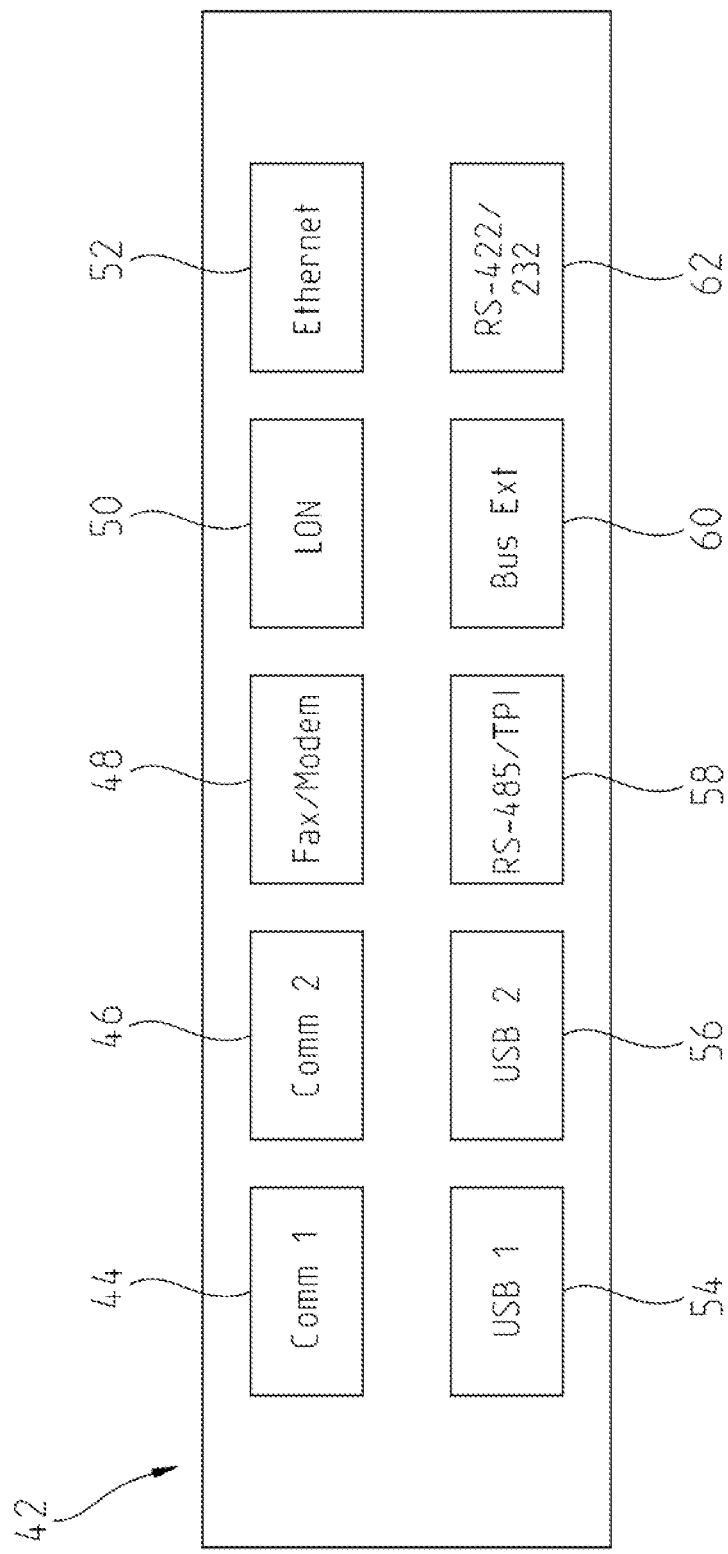
FIG. 3 is a block diagram of a plurality of ports included on the console of FIG. 2.

FIG. 3 depicts communication ports 42 of console 12. In one embodiment, communication ports 42 include a comm 1 port 44, a comm 2 port 46, a fax/modem port 48, a LON port 50, an Ethernet port 52, a USB 1 port 54, a USB 2 port 56, an RS/485/TPI port 58, a bus extension port 60 and an RS-422/232 port 62. Comm 1 port 44 (a DB9 female connector) and Comm 2 port 46 (a DB9 male connector) are both suitable for communication with external devices 26 such as a Point of Sale ("POS") terminal, an external modem, or a local personal computer. Fax/modem port 48 is an RJ-11 connector configured for connection to a telephone line. LON port 50 is a 2-pin terminal block suitable for connection to an IFSF network. Ethernet port 52 is an RJ-45 connector suitable for connection to network 24. USB 1 port 54 and USB 2 port 56 are type A connectors which may be used to connect to any of a variety of USB compatible external devices 26 such as an external printer at the fuel sale location. RS-485/TPI port 58 is a 4-pin terminal block suitable for connection to an external TS-DIM and intelligent pump controllers. Bus extension port 60 is a 3-pin terminal block suitable for connection to an EVO-EXPC or EVO-EXPC2. Finally, RS-422/232 port 62 is a DB9 male connector suitable for connection to a dispenser distribution box.

Referring back to FIG. 1, lines 14 are fluid conduits for moving fuel from a submersible pump to a fuel dispenser. As is further described below, each of lines 14 may include a transducer which permits console 12 to monitor pressure in the line 14 and perform leak tests on the line 14.

Tanks 16 of FIG. 1 are typically submersible fuel containers positioned below the surface of a fueling area at a fuel sale location. Tanks 16 include a plurality of inventory control probes which detect the levels of fuel in tanks 16, float kits, overfill prevention valves, drop tubes, submersible turbine pumps, and tank bottom protectors.

Containments 18 of FIG. 1 refer to tanks 16, lines 14 and containment sumps which have double walls enclosing an air or liquid filled volume surrounding the inner wall. For air filled containments 18, a transducer is included to permit console 12 to monitor a vacuum applied to the containment 18 to detect leaks.

Sensors 20 of FIG. 1 are liquid and/or hydrocarbon detection devices located in areas where liquid could collect in the event of a leak (e.g., outside tanks 16, in various sumps, containments 18, etc.). Sensors 20 generally detect the presence of such fluids and/or hydrocarbons and provide signals to console 12.

Pumps 22 of FIG. 1 represent intelligent pump controllers which interface with console 12, control operation of the submersible pumps, and detect error conditions associated with the pumps. Typically, one intelligent pump controller interfaces with one submersible pump. Console 12 interfaces with pumps 12 to activate or deactivate the corresponding submersible pump, and can reset pumps 12 in the event of an alarm condition.

Network 24 of FIG. 1 represents a connection to a LAN or WAN.

External devices 26 of FIG. 1 may include an external printer, modem, expansion console, point of sale device, or other accessory that is accessible via one of comm 1 port 44 or a comm 2 port 46.

Having generally described system 10, the remainder of this disclosure provides detail regarding the operation of console 12. More particularly, the remaining disclosure describes various screens generated by processor 36 of console 12 by accessing memory 30 (including instructions 34) and displayed on display 28. As described above, display 28 is a touch-screen display and as such, by providing the plurality of screenshots described below and receiving information from users through tactile contact, display 28 functions as a touch sensitive graphic user interface.

Home Screen

Figure 4A:
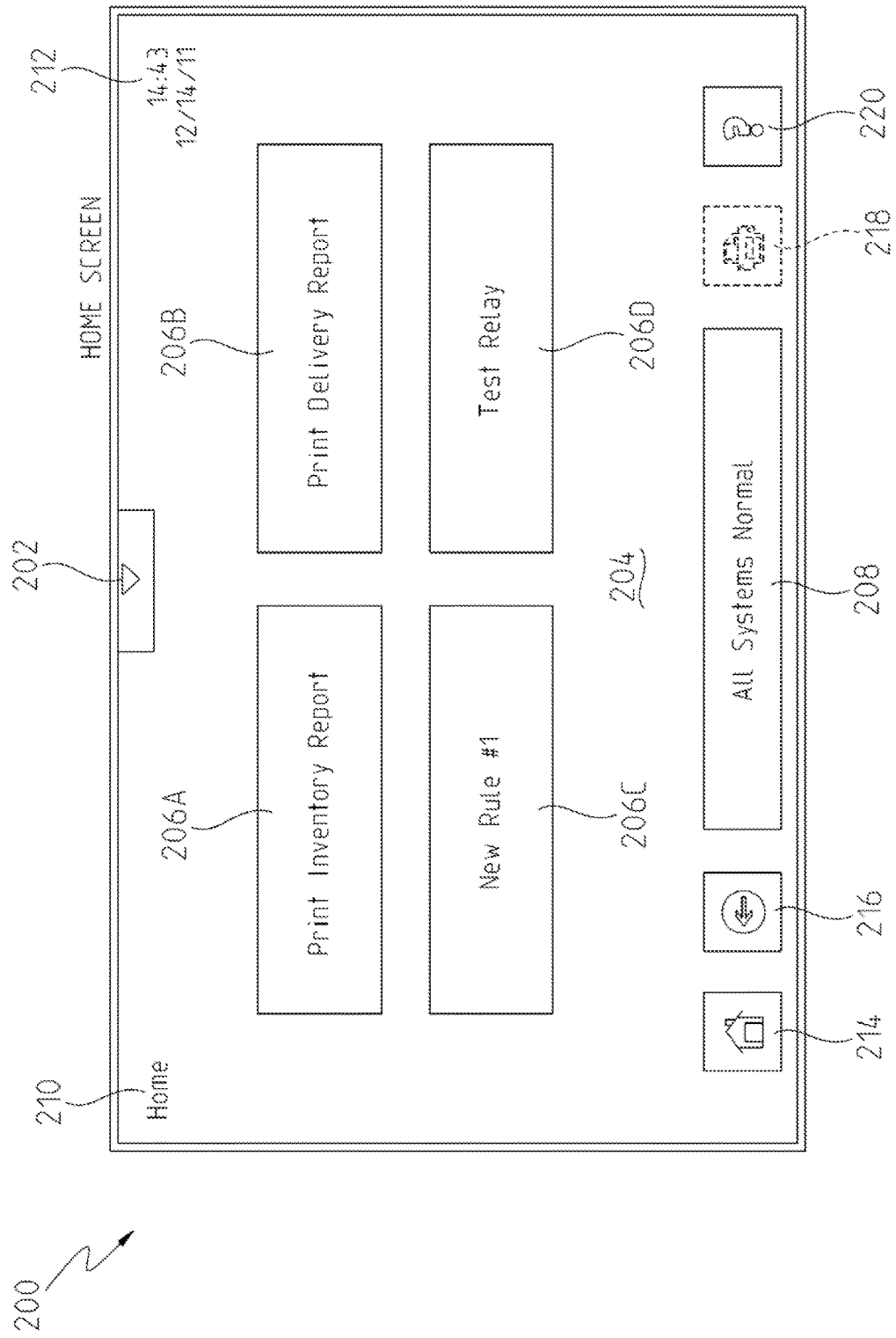
FIG. 4A is a screenshot of a home screen generated by the console of FIG. 1.

As shown in FIG. 4A, home screen 200 generally includes a quick jump menu ("QJM") icon 202, a content field 204 populated with a plurality of customizable, one-touch buttons 206A-D, a status window 208, a screen identification field 210, a date/time field 212, a home button 214, a back button 216, a print button 218, and a help button 220. QJM icon 202 generally allows rapid navigation to a plurality of other function screens as is further described below. Many of the features of these screens, and some of the screens themselves, are restricted to users having a particular access level. In one embodiment of the disclosure, console 12 provides three access levels, including guest, user, and administrator, to prevent unauthorized access to critical information and settings. Each access level has an associated password, which may be adjusted by users having administrator level access (typically certified technicians for console 12). In general, guest level access permits users to access menu options, check configuration settings for system 10, and print reports. Users having guest level access cannot modify the various settings of console 12. User level access permits users to access functions associated with performing line and tank leak tests, and resetting line alarms. Administrator level access permits users to access all areas of programming and setup configuration.

One-touch buttons 206A-D generally permit the user to execute a particular function or group of functions associated with each one-touch button 206A-D with a single touch as is described below. In the embodiment depicted in FIG. 4A, four one-touch buttons 206A-D are shown. It should be understood, however, that it is within the scope of the present disclosure to provide greater or fewer than four one-touch buttons 206A-D. Status window 208 generally provides information regarding the status of the system and, when one or more alarm conditions are detected in the manner described below, provides specific alarm information along with a visual indication of the existence of one or more alarm conditions (such as by changing color). Screen identification field 210 contains an identification of the currently active screen to orient the user as he navigates through the various system functions. Date/time field 212 provides a continuously updated display of the current date and time. Home button 214 provides one-touch navigation to home screen 200 from any of a variety of other screens generated by console 12. Back button 216 returns the user to the screen displayed immediately prior to the currently active screen. Print button 218 enables printing functions as further described below. Print button 218 is screen sensitive and is displayed as inactive when displayed on screens where a print function is not available. Finally, help button 220 provides context-sensitive help information corresponding to the currently active screen.

Figure 5:
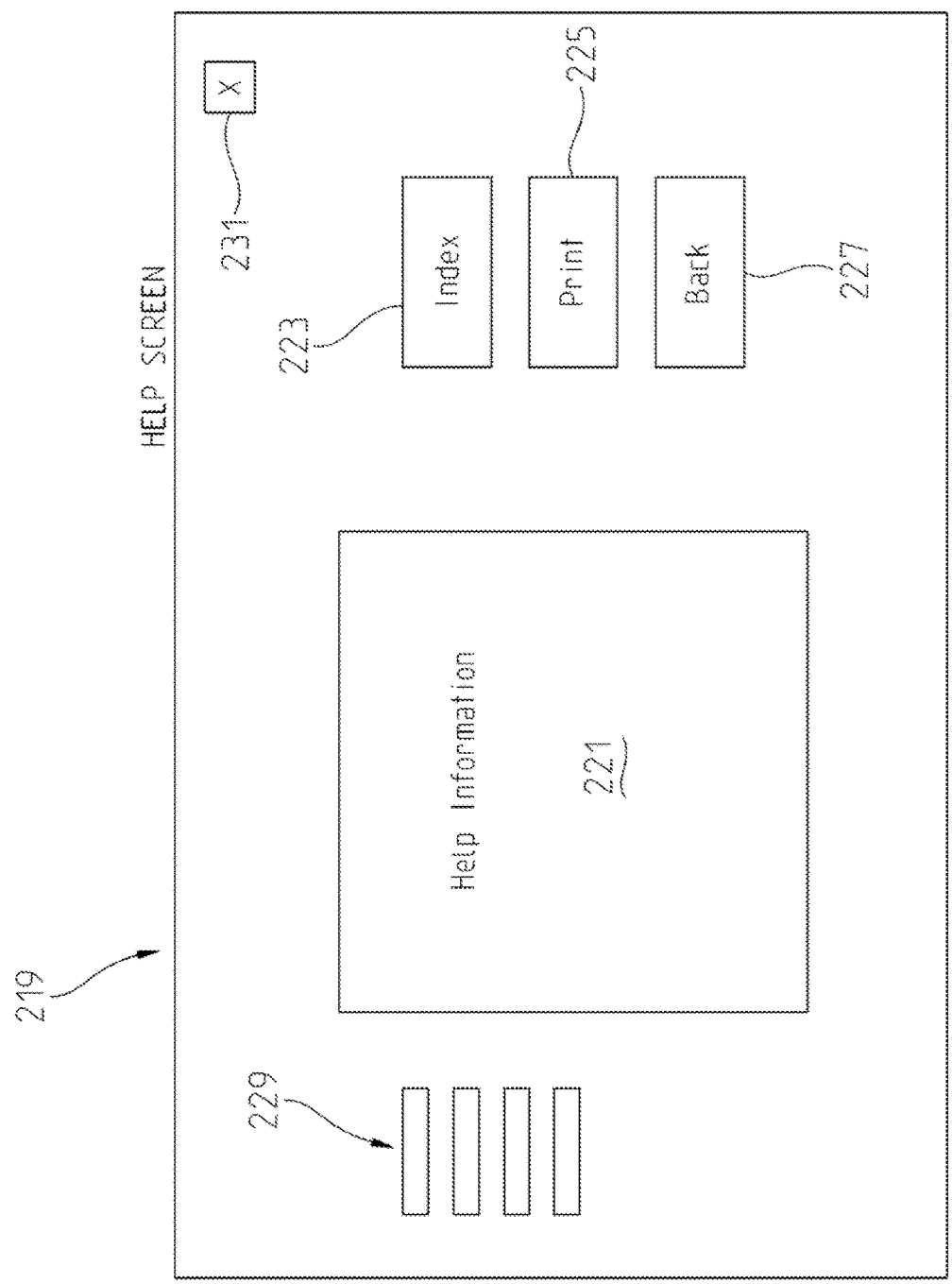
FIG. 5 is a screenshot of a help screen.

The help screen 219 (FIG. 5) displayed upon activation of help button 220 includes information 221 describing the currently active screen, as well as an index selection button 223, activation of which provides a listing of all available help screens. Help screen 219 also provides a print button 225 which permits the user to print the help screen to an external printer, and a back button 227 which returns the user to the previously viewed help screen. Help screen 219 also includes a plurality of links 229 to other help screens which may be related to the content of the currently active help screen 219. Finally, help screen 219 includes a return button 231, activation of which returns the user to the screen that was active when the user activated help button 220.

Figure 6:
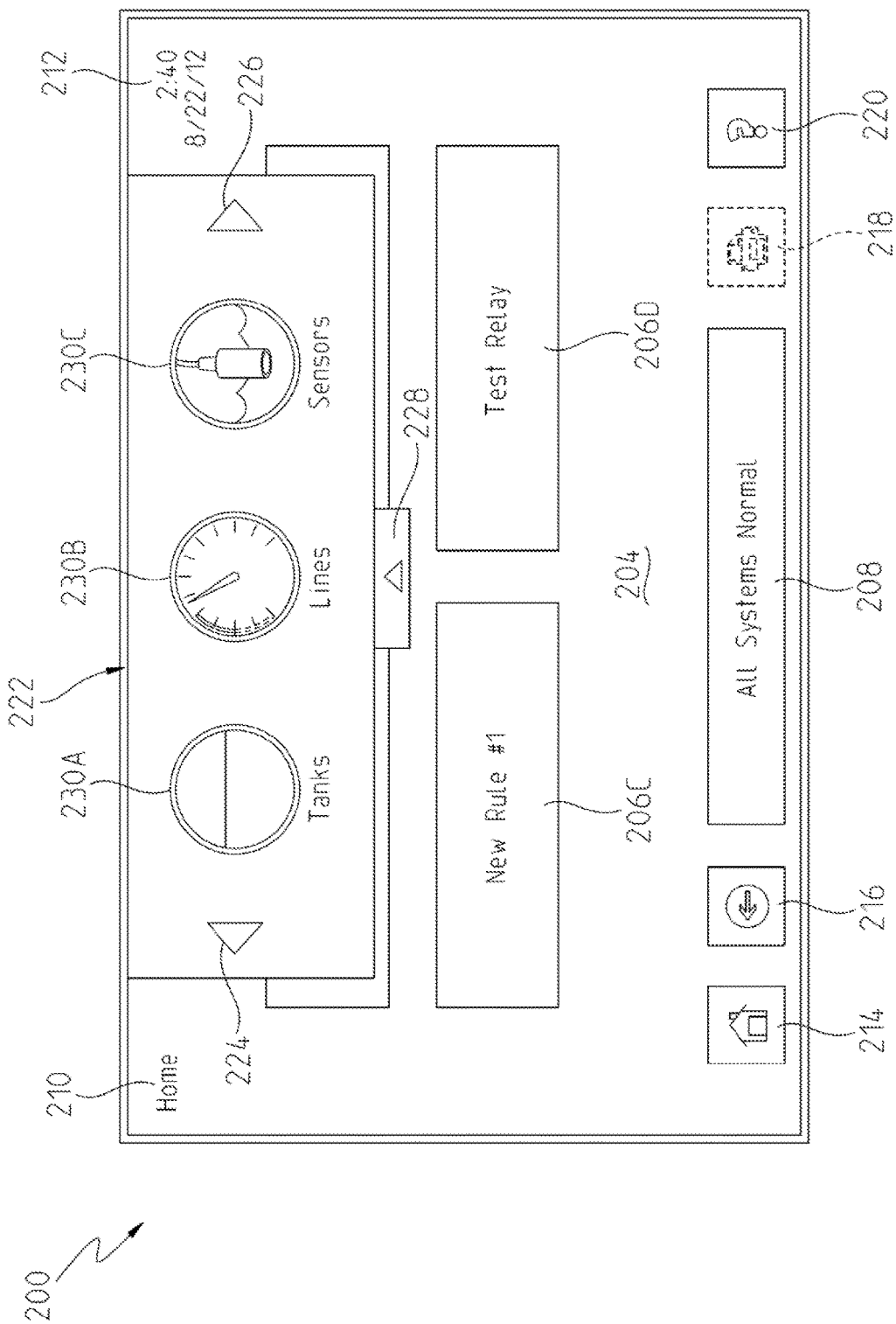
FIG. 6 is another screenshot of a home screen generated by the console of FIG. 1.

Referring now to FIG. 6, when the user clicks on QJM icon 202 of home screen 202 (FIG. 4A), a navigation window 222 drops down over QJM icon 202. In the depicted embodiment, navigation window 222 includes a left icon 224, a right icon 226, a close icon 228 and a plurality of function icons 230A-C. It should be understood that while three function icons 230A-C are shown in FIG. 6, more or fewer function icons 230A-C may be included within navigation window 222 in accordance with the teachings of the present disclosure. The displayed function icons 230A-C correspond to available system functions (i.e., those system functions having the corresponding hardware and software installed in a particular installation of system 10). Navigation window 222 may include a subset of the total function icons 230 available to the user (in this case, three). The user may activate one of the displayed function icons 230A-C, which causes display of a function screen in the manner described below, or activate left icon 224 or right icon 226 to scroll to additional function icons 230. In one embodiment, activation of either left icon 224 or right icon 226 causes the three function icons 230A-C displayed within navigation window 222 to be replaced with three different function icons 230. In an alternate embodiment, activation of either left icon 224 or right icon 226 shifts the position of function icons 230A-C by one or more positions in the corresponding direction and causes the display of new function icons 230 in a number corresponding to the number of position shifts. Activation of close icon 228 causes navigation window 222 to close and be replaced with QJM icon 202.

Figure 7:
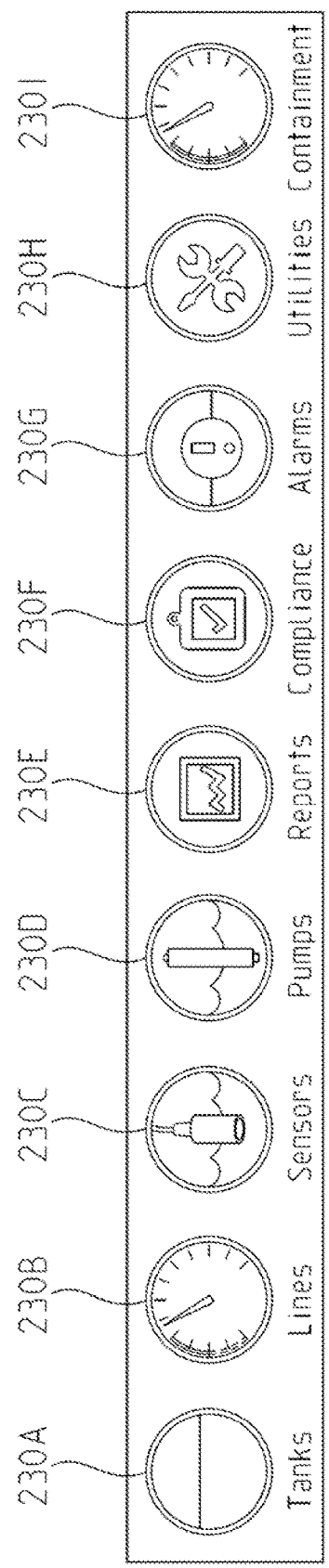
FIG. 7 is a graphic depiction of various function icons accessible through a quick jump menu of the home screen of FIGS. 5 and 6.

In one embodiment, nine function icons 230A-I may be available to the user depending upon the installation configuration of system 10. Of course, more or fewer function icons may be provided within the scope of the present disclosure. As depicted in FIG. 7, these nine function icons 230A-I include a tanks icon 230A, a lines icon 230B, a sensors icon 230C, a pumps icon 230D, a reports icon 230E, a compliance icon 230F, an alarms icon 230G, a utilities icon 230H, and a containment icon 230I. A description of each of the function screens associated with activation of these function icons 230A-I is provided in a later section of this disclosure.

Status window 208 is presented on many of the function screens and detail screens described below. In each instance, status window 208 provides a written indication of any warning or alarm conditions detected by system 10. Status window 208 also provides a color-coded indication of the status of system 10 as is described in more detail below. In situations where more than one warning and/or alarm condition exists at the same time, status window 208 sequentially displays the written indications of the warnings and/or alarms, and is displayed in an appropriate color code for each warning and/or alarm. Activation of status window 208 causes console 12 to display the alarm screen depicted in FIG. 36, which is also described below.

Figure 4B:
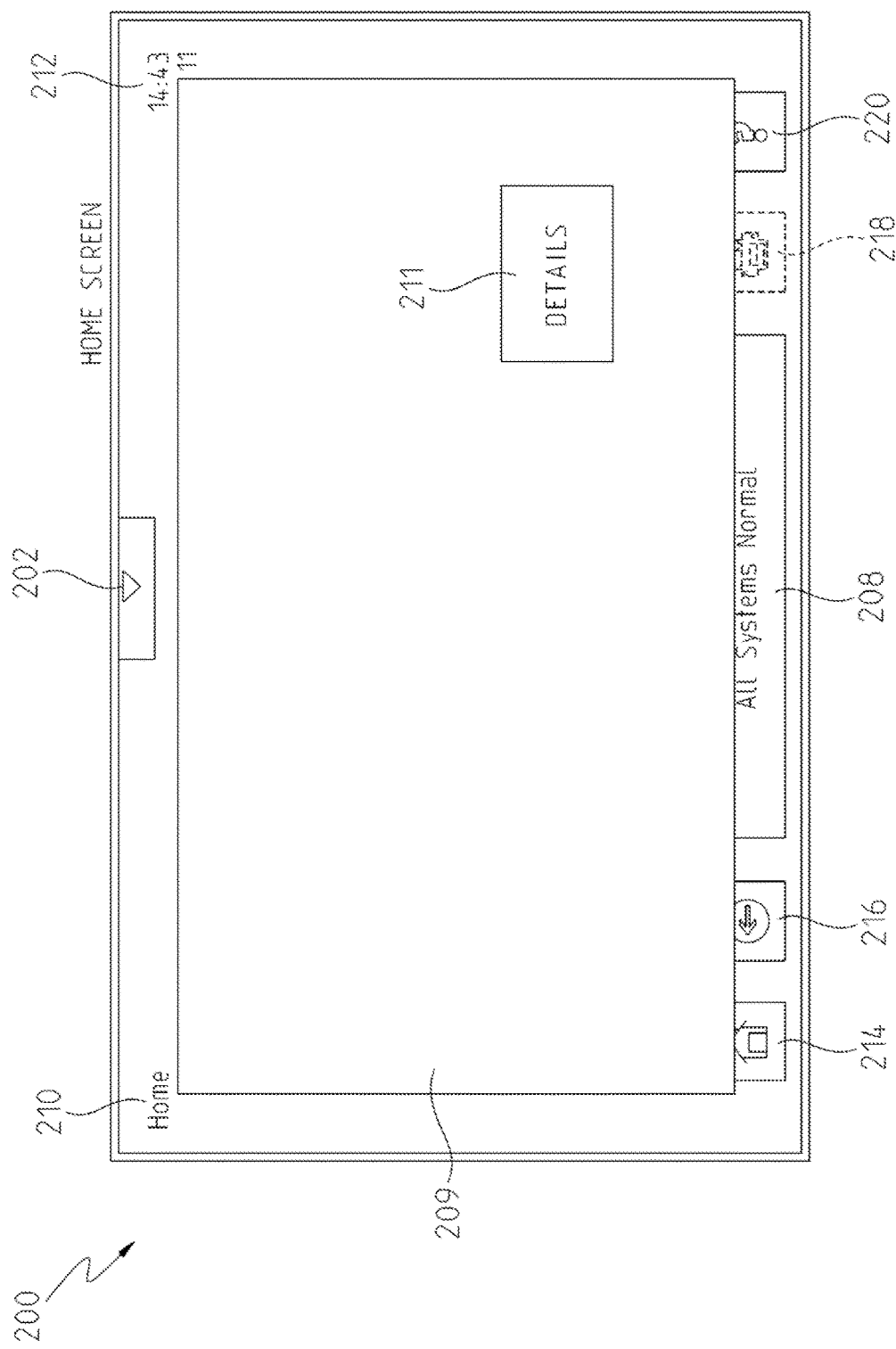
FIG. 4B is another screenshot of a home screen generated by the console of FIG. 1 including an alarm popup window.

In addition to status window 208, in the event of an alarm condition, an alarm popup window 209 such as that depicted in FIG. 4B is displayed regardless of the nature of the currently active screen. Alarm popup window 209 includes information about the alarm and a details button 211, activation of which causes the console to display an alarm function screen such as that depicted in FIG. 36. In one embodiment, all of the other functions of the currently active screen are disabled when alarm popup window 209 is display, thereby requiring the user to activate details button 211 and view the alarm functions screen.

One-Touch Buttons

One-touch buttons 206A-D are programmable buttons which perform any of a variety of different functions upon activation of a single button. One-touch buttons 206A-D may be configured or programmed via a rules engine as described below.

Tanks Function Screen

Figure 8:
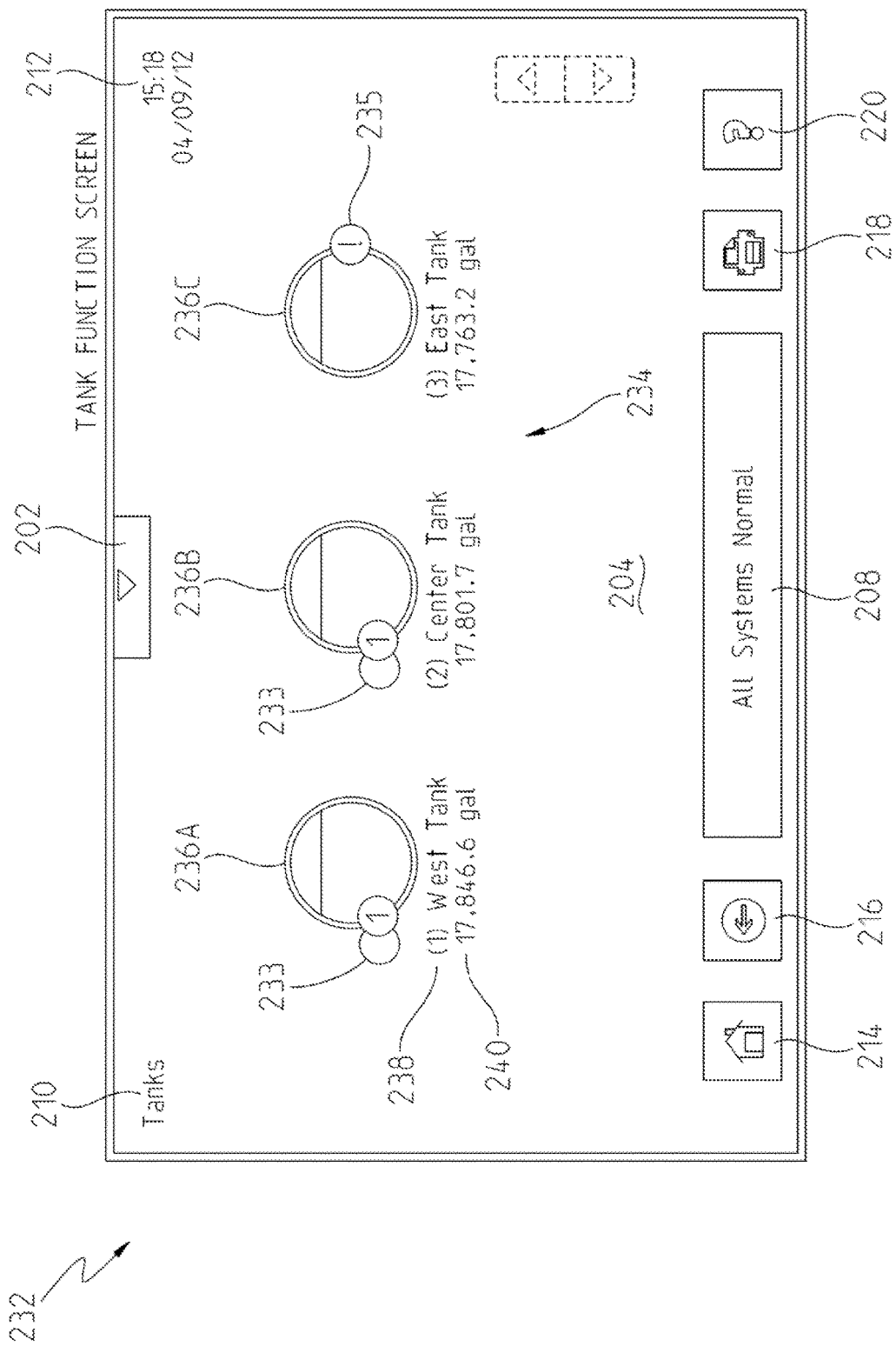
FIG. 8 is a screenshot of a tank function screen generated by the console of FIG. 1.

Activation of tanks icon 230A from navigation window 222 (FIGS. 6 and 7) causes console 12 to display tanks function screen 232 as depicted in FIG. 8. In general, tanks function screen 232 permits the user to access inventory information regarding and perform control functions on tanks 16 and manifolds installed at the site. As shown, tanks function screen 232 includes all of the components of home screen 200 except that one-touch buttons 206A-D previously occupying content field 204 are replaced with tank inventory information 234. Screen identification field 210 is populated with the word "Tanks" to identify tanks function screen 232.

Tank inventory information 234 includes graphical, summary information about the product and water levels in tanks 16 installed at the site, in addition to alarm condition information, if any. In the example of FIG. 8, three tank icons 236A-C are shown, each graphically depicting the level of product in a corresponding tank 16. Tank icons 236A-C may be programmed (using parameters screen 720 of FIG. 48) to use different colors to provide a visual indication of the type of fuel stored in the tank. Each tank icon 236A-C is accompanied by tank identification information 238, and a numeric indicator 240 of the quantity of product in the tank 16. When tank function screen 232 is active, the user may touch print button 218 to print an inventory report for all tanks as shown in FIGS. 9A-B. If two or more tanks 16 are coupled together via a manifold, tank icons 236A-C may include a manifold icon 233 to provide a visual indication of the connection. Manifold icon 233 may include a number indicating the manifold number. Such manifold icons 233 may be displayed on any of the tank screens discussed herein. Additionally, an alarm icon 235 may be superimposed on any tank icon (such as shown on tank icon 236C), sensor icon, pump icon or containment icon displayed on any of the screens discussed herein. Alarm icon 235 may be displayed in different colors corresponding to the severity of the condition (e.g., yellow for warning conditions, red for alarm conditions), and may include a symbolic indicator corresponding to the severity of the condition (e.g., triangle for warning conditions, exclamation point for alarm conditions).

Tank Detail Screen

Figure 10:
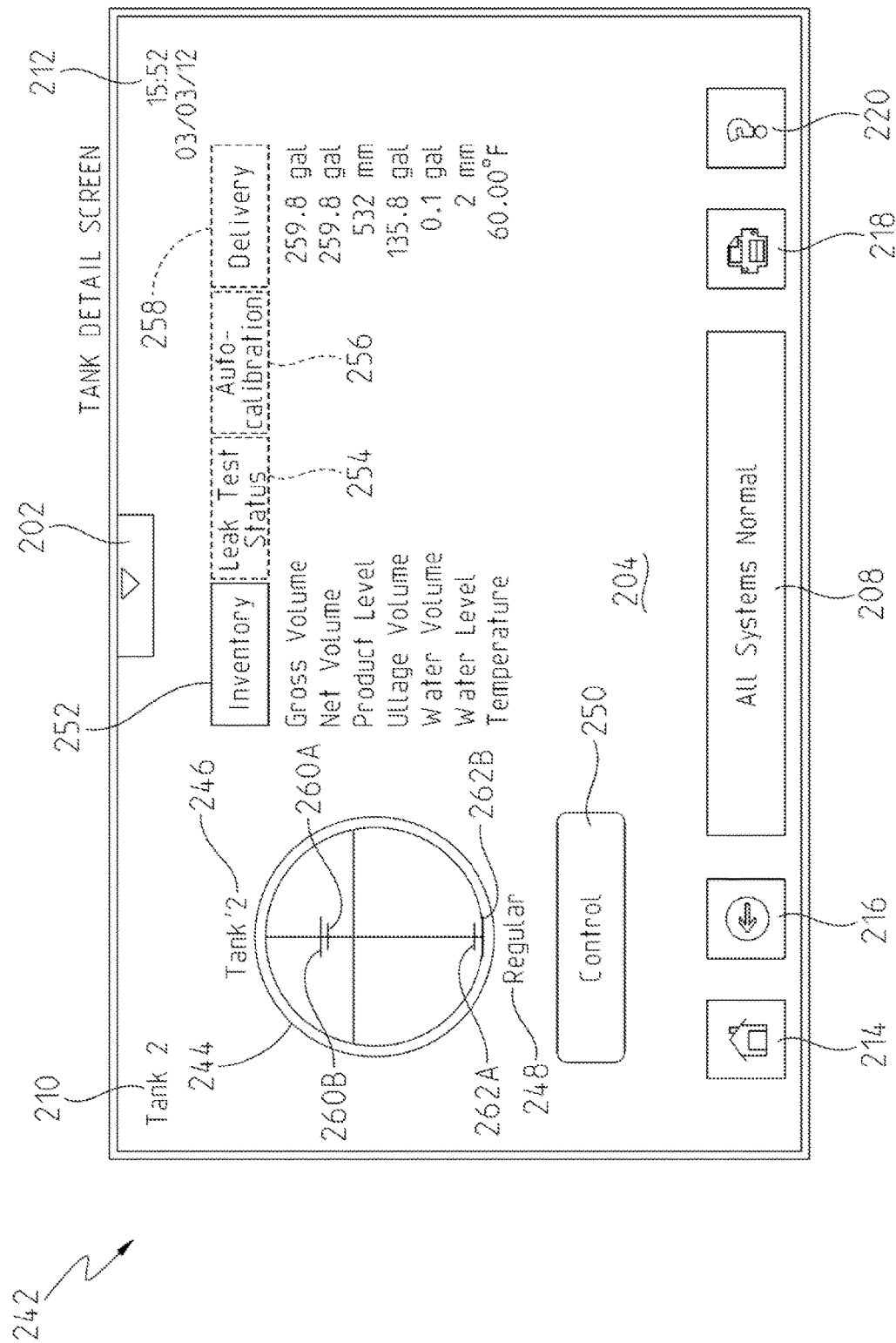
FIGS. 10-13 are screenshots of a tank detail screen accessible through the tank function screen of FIG. 8.

The user may obtain additional information about any of the tanks 16 represented by each of tank icons 236A-C by touching the desired tank icon 236A-C. When any one of tank icons 236A-C is activated, a tank detail screen 242 such as that depicted in FIG. 10 is displayed. As shown in FIG. 10, screen identification field 210 is populated with an identification of the tank 16 corresponding to the tank icon 236A-C activated by the user and content field 204 is populated with information regarding the tank 16. Tank detail screen 242 generally includes a detailed tank icon 244 accompanied by detailed tank identification information 246 and product identification information 248 identifying the product stored in the tank 16, a control button 250, an inventory tab 252, a leak test status tab 254, an autocalibration tab 256, and a delivery tab 258. Detailed tank icon 244 graphically displays the amount of product in tank 16, and includes a first upper hash mark 260A that indicates the high fill alarm limit for tank 16, a second upper hash mark 260B that indicates the high, high fill alarm limit for tank 16, and a first lower hash mark 262A that indicates the low fill alarm limit for tank 16, and a second lower hash mark 262B that indicates the low, low fill alarm limit for tank 16.

Figure 11:
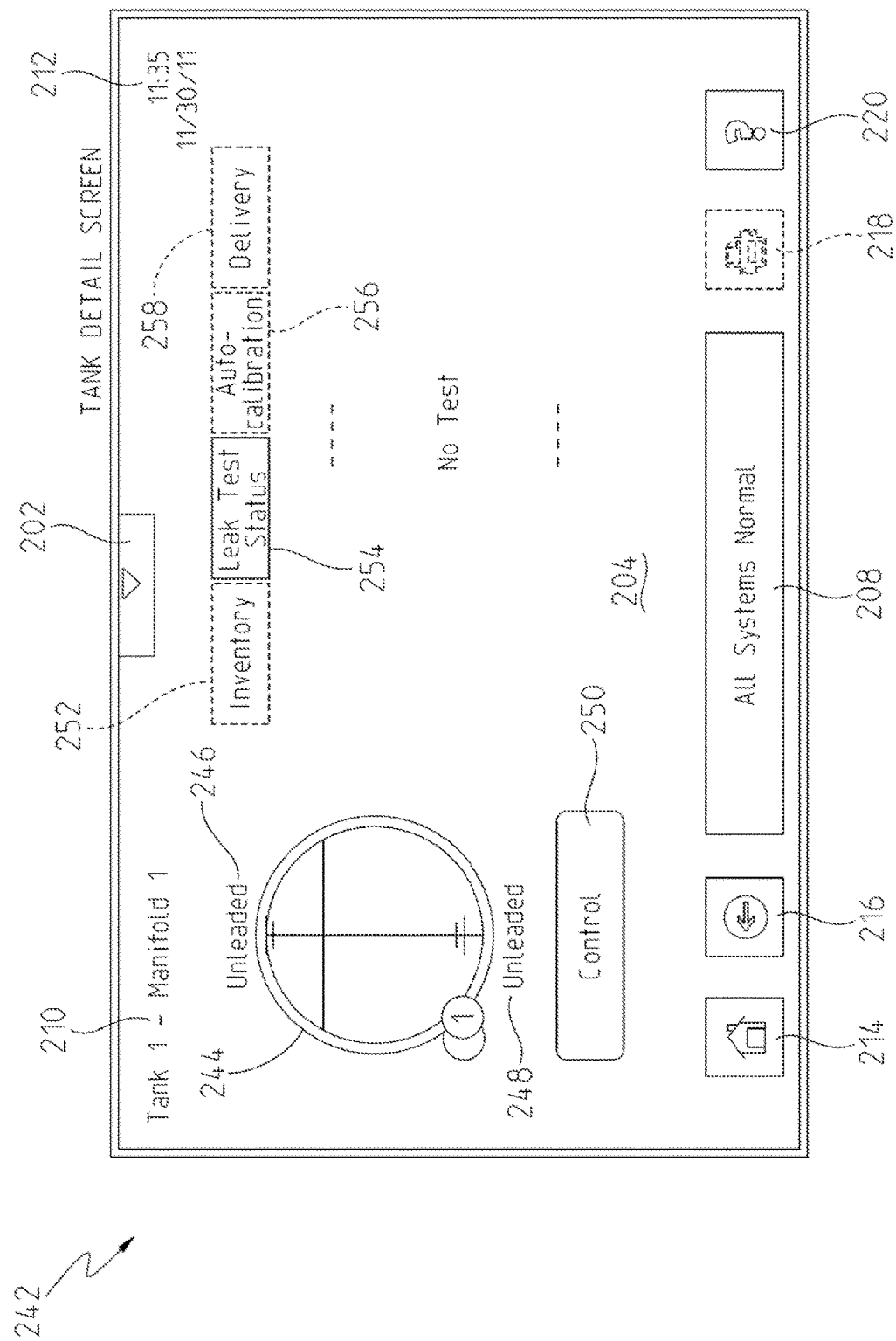

In FIG. 10, inventory tab 252 is shown as active. As such, detailed information regarding the inventory of product stored in Tank 2 (i.e., the selected tank 16 in this example) is displayed in content field 204. As shown, this detailed information includes gross volume, net volume, product level, ullage level, water volume, water level, and tank temperature. The detailed information in content field 204 may also include density, net density and mass when density floats are used. When leak test status tab 254 is activated, content field 204 includes detailed information regarding any active leak tests currently being performed on tank 16 as depicted in FIG. 11. If a test is active, content field 204 includes the name of the test in process, indicates whether it is a monthly test, annual test, etc., and provides the status of the test.

Figure 12:
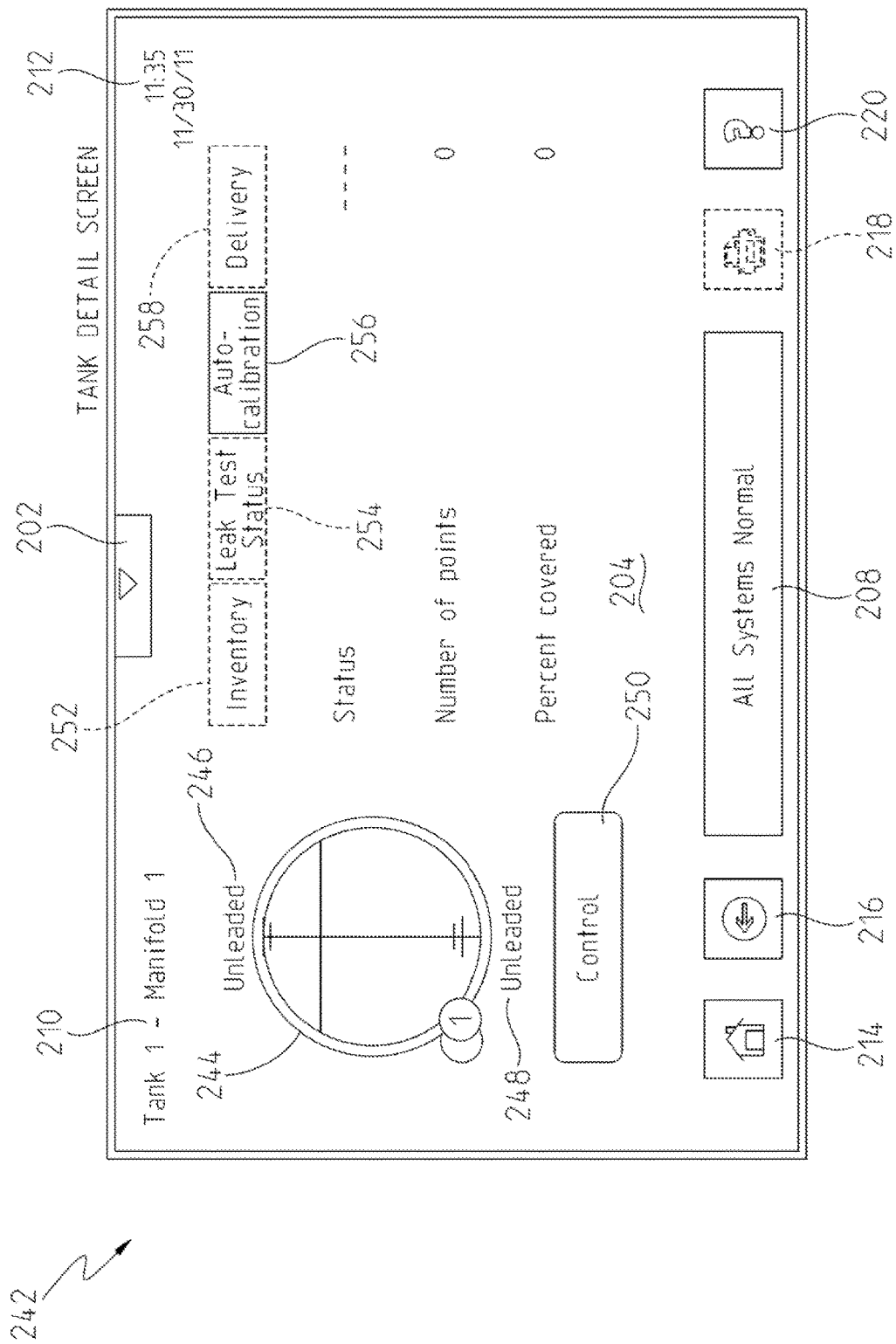

When autocalibration tab 256 is activated, content field 204 includes detailed information regarding the status of an autocalibration procedure on the active tank 16, the number of points, and the percent covered as depicted in FIG. 12. When a tank 16 is installed, the manufacturer of the tank 16 normally provides a tank chart which provides information about how the level of fluid in the tank 16 relates to the volume of fluid in the tank 16. In this manner, by monitoring the level of fluid in the tank 16, the volume of fluid may be determined. Over time, however, the tank 16 may deform or become tilted, which makes the manufacturer's level to volume tank chart inaccurate. The autocalibration procedure described herein permits the user to create a new chart, and content field 204 of FIG. 12 provides information about the status of the procedure, the number of points in the new chart that have been completed, and the percentage of the tank 16 the new chart covers.

Figure 13:
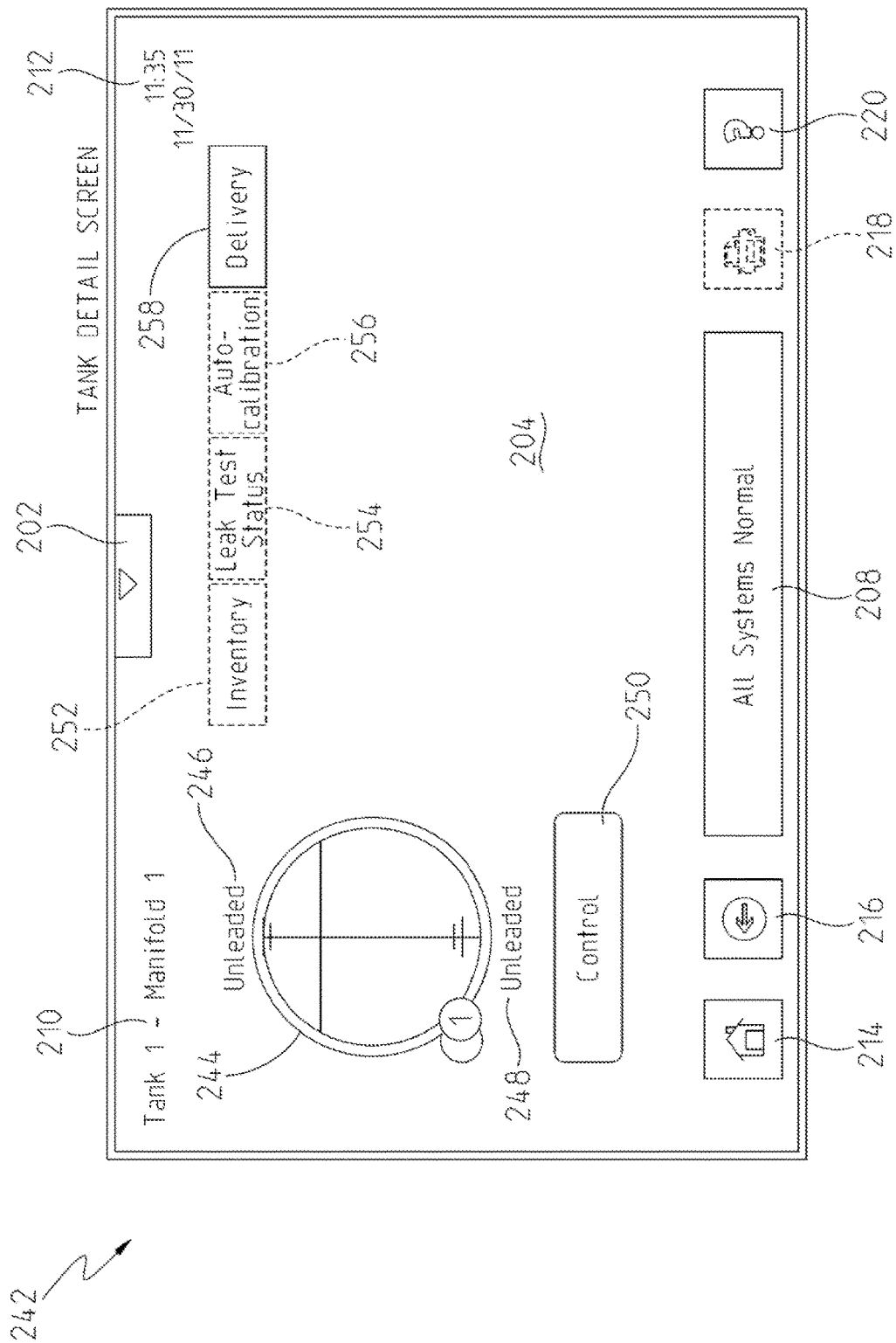

Finally, when delivery tab 258 is activated, content field 204 includes detailed information regarding the delivery history of product stored in tank 16 as depicted in FIG. 13. While no delivery history is shown in FIG. 13, content field 204 would normally include the date, time and amount of the last ten fuel deliveries to tank 16.

Figure 14:
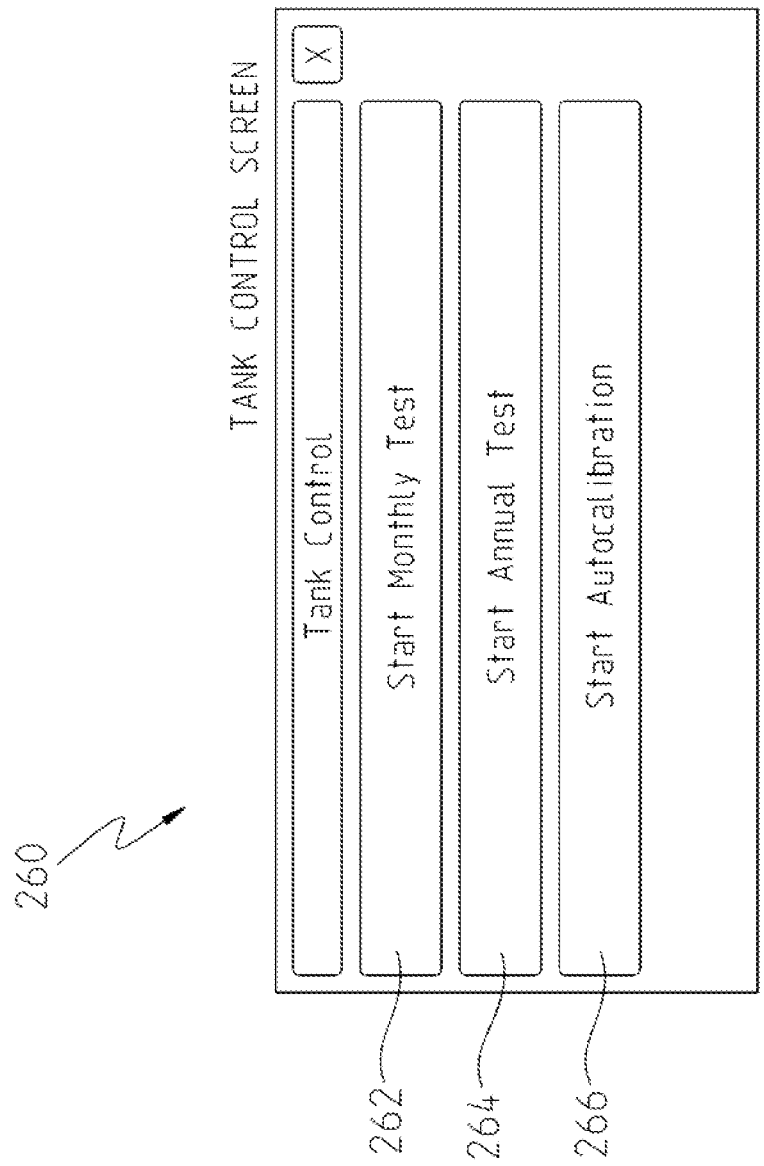
FIG. 14 is a screenshot of a tank control screen accessible through the tank detail screens of FIG. 10-13.

Activation of control button 250 of tank detail screen 242 causes display of tank control screen 260 as depicted in FIG. 14. Tank control screen 260 includes a start monthly test button 262, a start annual test button 264, and a start autocalibration button 266. Depending upon the user role assigned to the current user as described above (i.e., guest, user or administrator), the user may initiate either of the tank tests (by touching button 262 or button 264) or autocalibration (by touching button 266). Unlike the SCALD (statistical continuous automatic leak detection) tests described below, the monthly and annual tests activated by buttons 262, 264 respectively are static tests that must be activated when the corresponding tank 16 is not pumping fuel. The tests determine whether the tank 16 maintains its fuel volume to within a small threshold of gallons per hour. While these tests may be activated from tank control screen 260, they are normally performed automatically at night according to rules established during set up of system 10. Autocalibration button 266 may be activated after tank 16 is filled. During the autocalibration procedure initiated by activation of autocalibration button 266, as fuel is dispensed from tank 16, the level of tank 16 is monitored and recorded to create a new level to volume chart as described above. To perform this function, console 12 must be connected to an external device 26, typically a POS device, that provides the amount of fuel sold through the fuel delivery system.

Lines Function Screen

Figure 15:
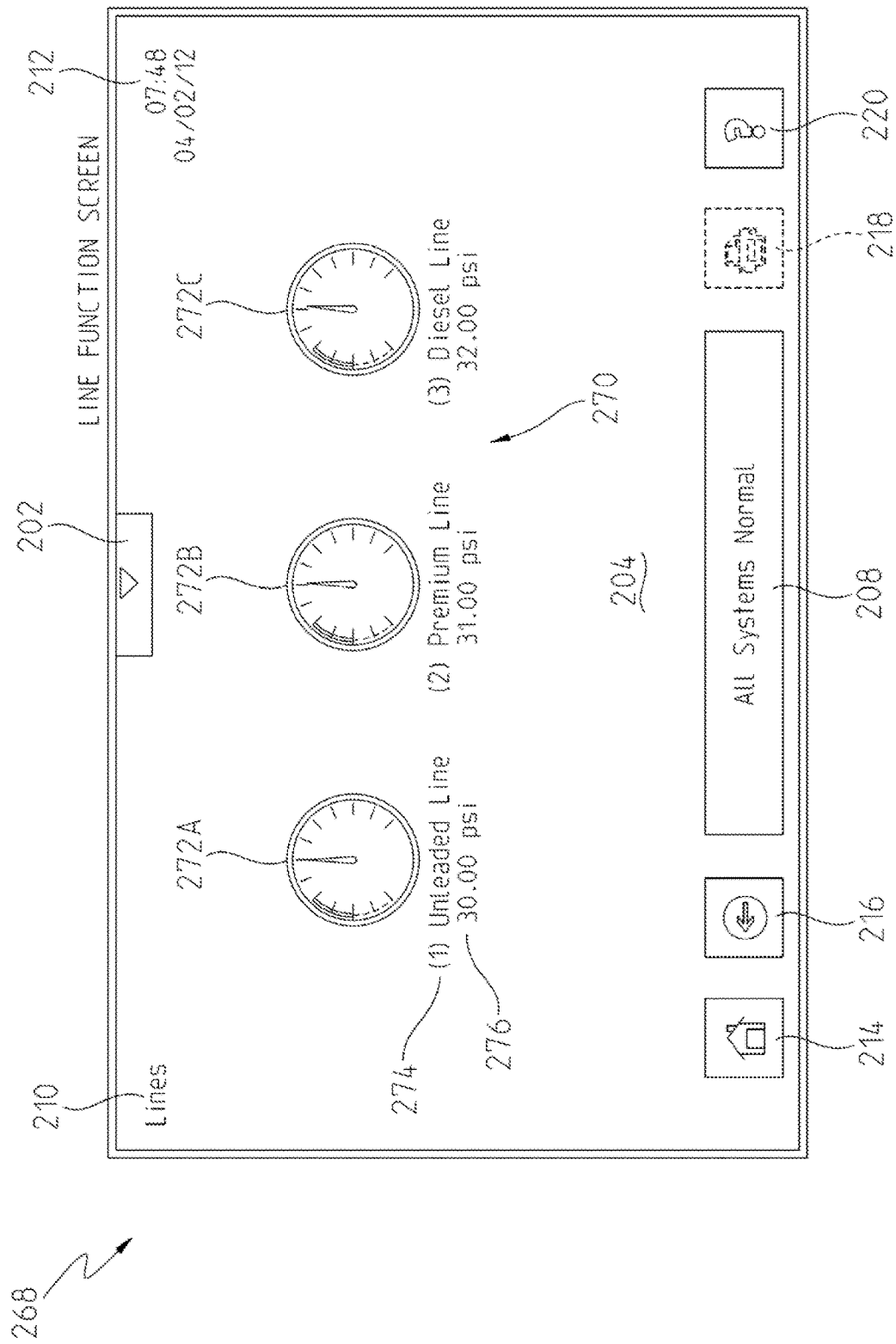
FIG. 15 is a screenshot of a lines function screen generated by the console of FIG. 1.

Activation of lines icon 230B from navigation window 222 (FIGS. 6 and 7) causes console 12 to display lines function screen 268 as depicted in FIG. 15. In general, lines function screen 268 permits the user to access information regarding the status of lines 14 and the status of line leak tests and perform control and calibration functions on lines 14 installed at the site. As shown, lines function screen 268 includes all of the components of home screen 200 except that one-touch buttons 206A-D previously occupying content field 204 are replaced with line pressure information 270. Screen identification field 210 is populated with the word "Lines" to identify lines function screen 268.

Line pressure information 270 includes graphical, summary information about the pressure in each line 14 installed at the site, in addition to alarm condition information, if any. In the example of FIG. 15, three line icons 272A-C are shown, each graphically depicting the pressure in the corresponding line 14. Each line icon 272A-C is accompanied by line identification information 274, and a numeric indicator 276 of the pressure in line 14.

Figure 16:
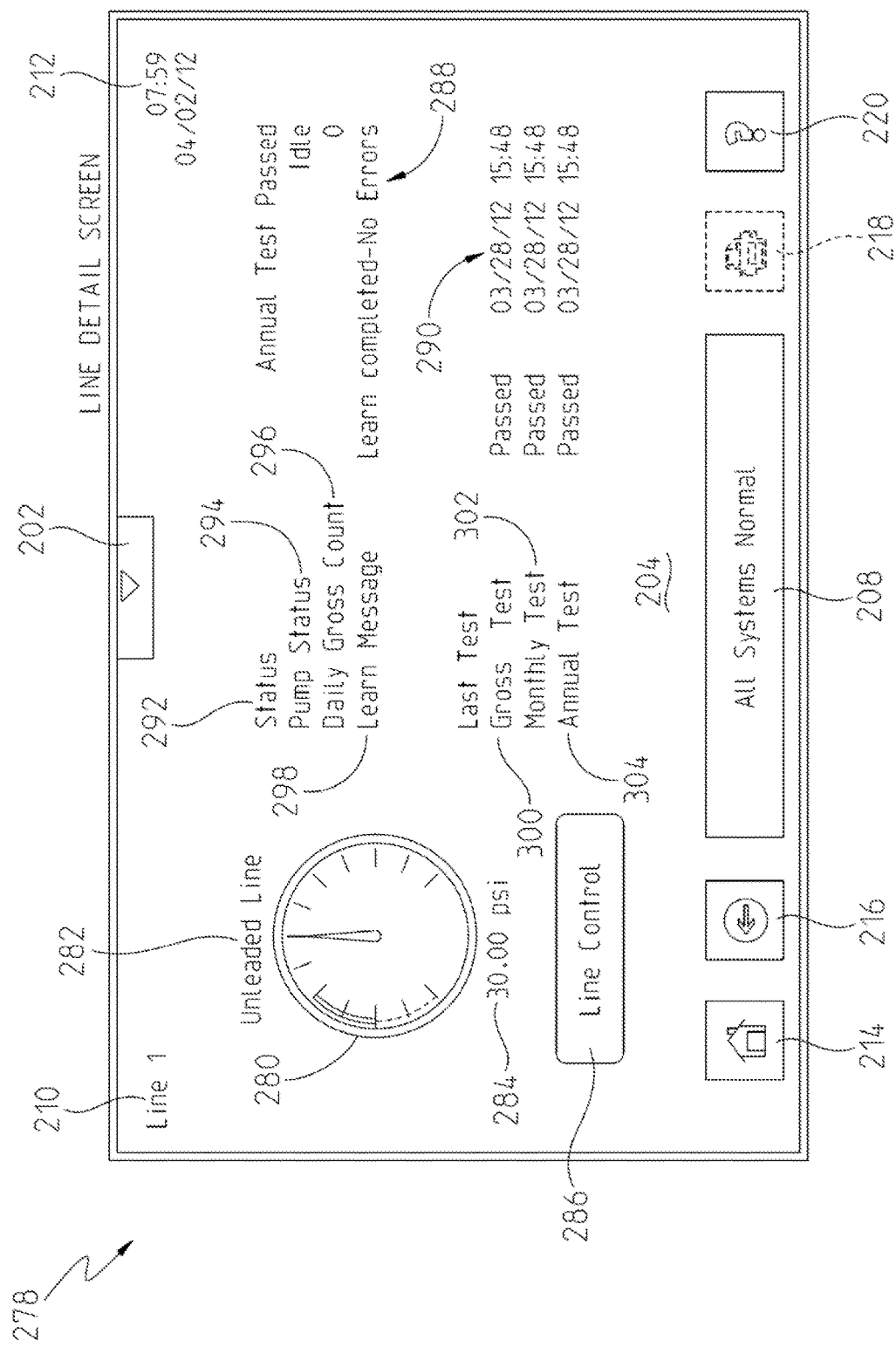
FIG. 16 is a screenshot of a line detail screen accessible through the lines function screen of FIG. 15.

The user may obtain additional information about any of lines 14 represented by each of line icons 272A-C by touching the desired line icon 272A-C. When any one of line icons 272A-C is activated, a line detail screen 278 such as that depicted in FIG. 16 is displayed. As shown in FIG. 16, screen identification field 210 is populated with an identification of the line 14 corresponding to the line icon 272A-C activated by the user and content field 204 is populated with information regarding the line 14. Line detail screen 278 generally includes a detailed line icon 280 accompanied by detailed line identification information 282 and line pressure information 284, a control button 286, line status information 288, and line leak test information 290. Line status information 288 includes a status field 292 which contains an identification of the status of line 14, a pump status field 294 which indicates whether the pump 22 associated with the line 14 is idle or active, a daily gross count field 296 and a learn message field 298. Line leak test information 290 includes a gross test field 300 which indicates the result and date and time of the last gross test performed on line 14, a monthly test field 302 which indicates the result and date and time of the last monthly test performed on line 14, and an annual test field 304 which indicates the result and date and time of the last annual test performed on line 14. In general, there are three levels of tests for lines 14 including monthly, annual and gross. The gross test runs automatically every time fuel is dispensed through a line 14 (at the time the handle of the corresponding dispenser is returned to its holder). The gross test verifies that fuel is not flowing through line 14 at more than a particular threshold (e.g., three gallons per hour), and may be performed many times per day after each consumer dispenses fuel. Daily gross count field 296 provides the number of times the gross test has been performed on the line 14 since a particular time such as midnight.

Learn message field 298 provides the status of an auto-learn procedure for determining the performance of a line 14. In particular, the auto-learn procedure is normally performed during installation of the line, and consists of a simulated leak of the line 14 that provides console 12 with information about the pressure decay curve associated with the line 14. As described below, the auto-learn procedure may be initiated by activating control button 286.

Figure 17:
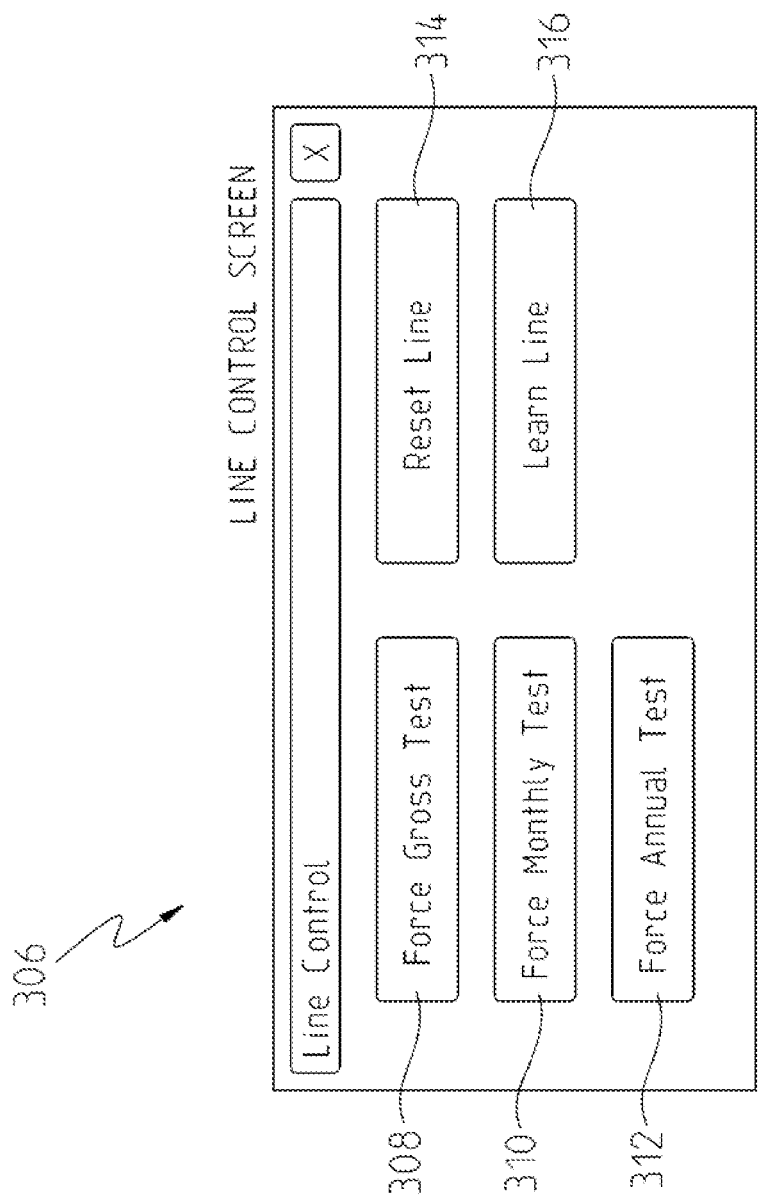
FIG. 17 is a screenshot of a line control screen accessible through the line detail screen of FIG. 16.

Activation of control button 286 of line detail screen 278 causes display of line control screen 306 as depicted in FIG. 17. Line control screen 306 includes a force gross test button 308, a force monthly test button 310, a force annual test button 312, a reset line button 314, and a learn line button 316. Depending upon the user role assigned to the current user as described above (i.e., guest, user or administrator), the user may initiate any one of the line tests (by touching one of buttons 308-312), reset the line 14 (by touching button 314) or learn the line 14 (by touching button 316).

Sensors Function Screen

Figure 18:
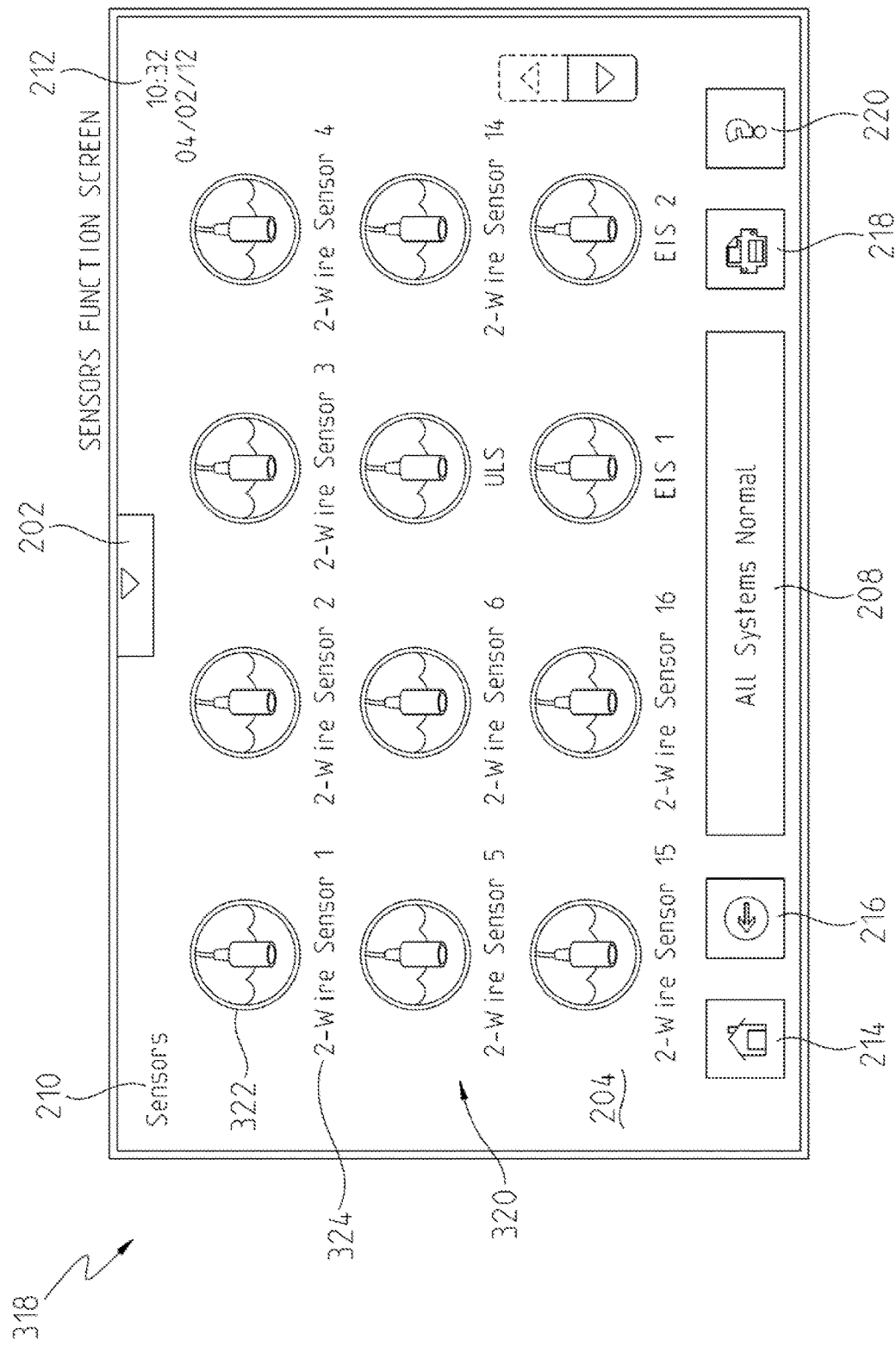
FIG. 18 is a screenshot of a sensors function screen generated by the console of FIG. 1.

Activation of sensors icon 230C from navigation window 222 (FIGS. 6 and 7) causes console 12 to display sensors function screen 318 as depicted in FIG. 18. In general, sensors function screen 318 permits the user to access information regarding the status of various sensors 20 and perform control functions on sensors 20 installed at the site. As shown, sensors function screen 318 includes all of the components of home screen 200 except that one-touch buttons 206A-D previously occupying content field 204 are replaced with sensor status information 320. Screen identification field 210 is populated with the word "Sensors" to identify sensors function screen 318.

Sensor status information 320 includes graphical, summary information about sensors 20 installed at the site, in addition to alarm condition information, if any. In the example of FIG. 18, twelve sensor icons 322 are shown, each graphically depicting the status of a corresponding sensor 20. Each sensor icon 322 is accompanied by sensor identification information 324. When sensor function screen 318 is active, the user may touch print button 218 to print a sensor status report for all sensors 20 as shown in FIG. 19.

Figure 20:
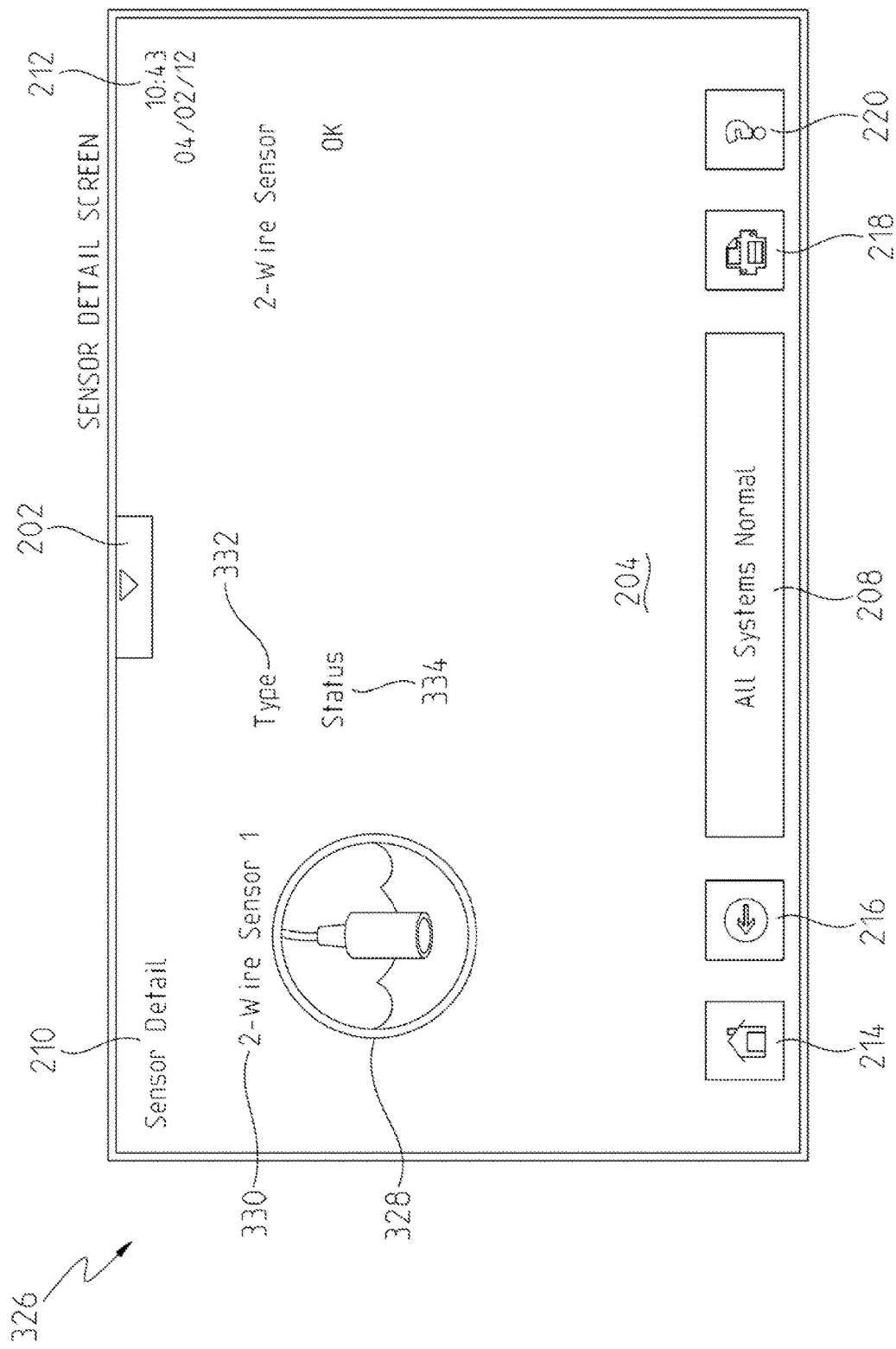
FIG. 20 is a screenshot of a sensor detail screen accessible through the sensors function screen of FIG. 18.

The user may obtain additional information about any of the sensors 20 represented by each of sensor icons 322 by touching the desired sensor icon 322. When any one of sensor icons 322 is activated, a sensor detail screen 326 such as that depicted in FIG. 20 is displayed. As shown in FIG. 20, screen identification field 210 is populated with an identification of the sensor detail screen 326 and content field 204 is populated with information regarding the selected sensor 20. Sensor detail screen 326 generally includes a detailed sensor icon 328 accompanied by detailed sensor identification information 330, a sensor type field 332, which identifies the sensor type, and a status field 334 which indicates the status of sensor 20. The user may touch print button 218 to print a report on the selected sensor 20.

Pumps Function Screen

Figure 21:
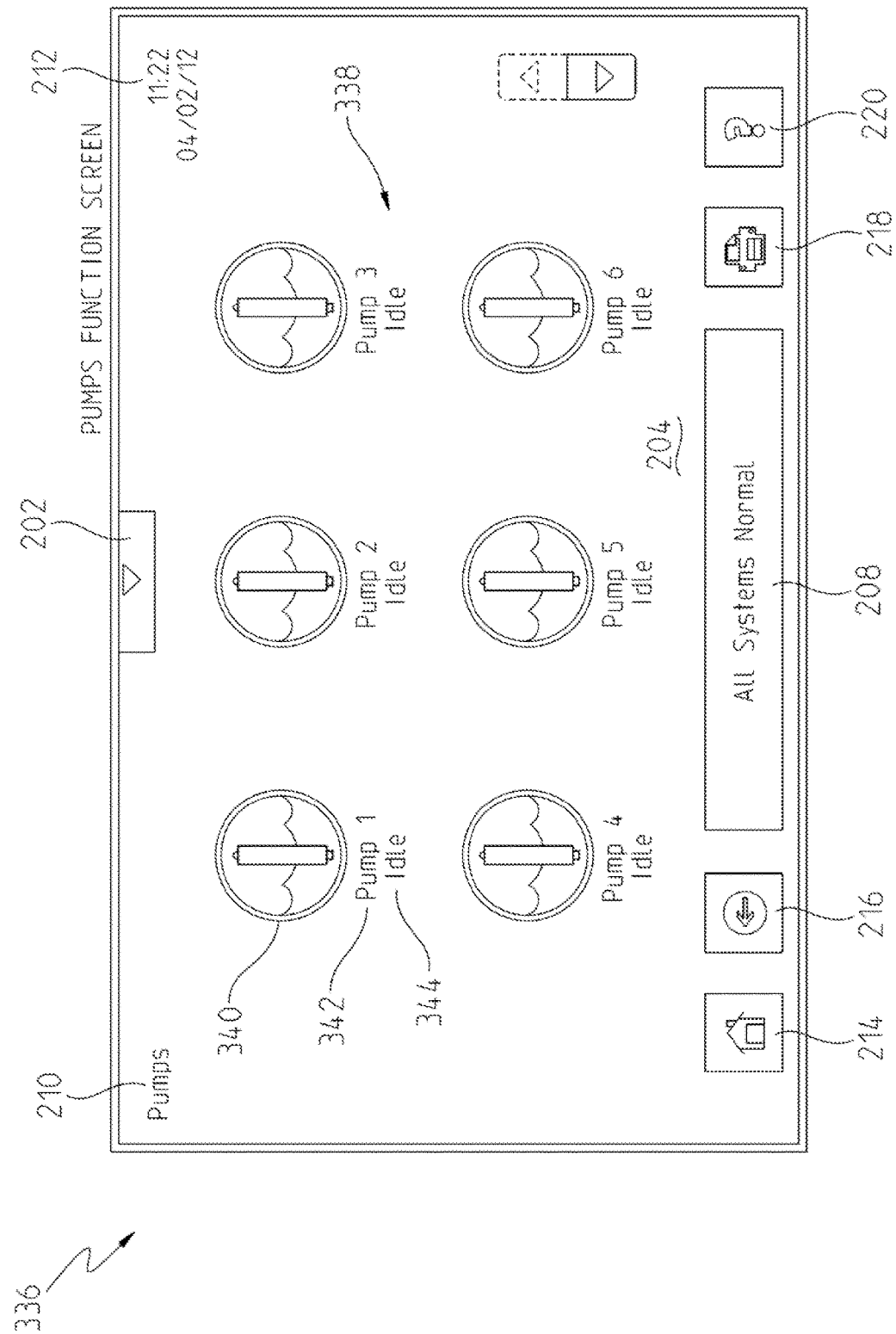
FIG. 21 is a screenshot of a pumps function screen generated by the console of FIG. 1.

Activation of pumps icon 230D from navigation window 222 (FIGS. 6 and 7) causes system to display pumps function screen 336 as depicted in FIG. 21. In general, pumps function screen 336 permits the user to access information regarding and perform control functions on each of the submersible pumps 22 installed at the site through use of a pump interface as is further described below. As shown, pumps function screen 336 includes all of the components of home screen 200 except that one-touch buttons 206A-D previously occupying content field 204 are replaced with pump status information 338. Screen identification field 210 is populated with the word "Pumps" to identify pumps function screen 336.

Pump status information 338 includes graphical, summary information about the status of each pump 22 installed at the site, in addition to alarm condition information, if any. In the example of FIG. 21, six pump icons 340 are shown, each accompanied by pump identification information 342 and an indicator 344 of whether the pump 22 is idle or active. When pump function screen 336 is active, the user may touch print button 218 to print a pump status report for all pump as shown in FIGS. 22A-B.

Figure 23:
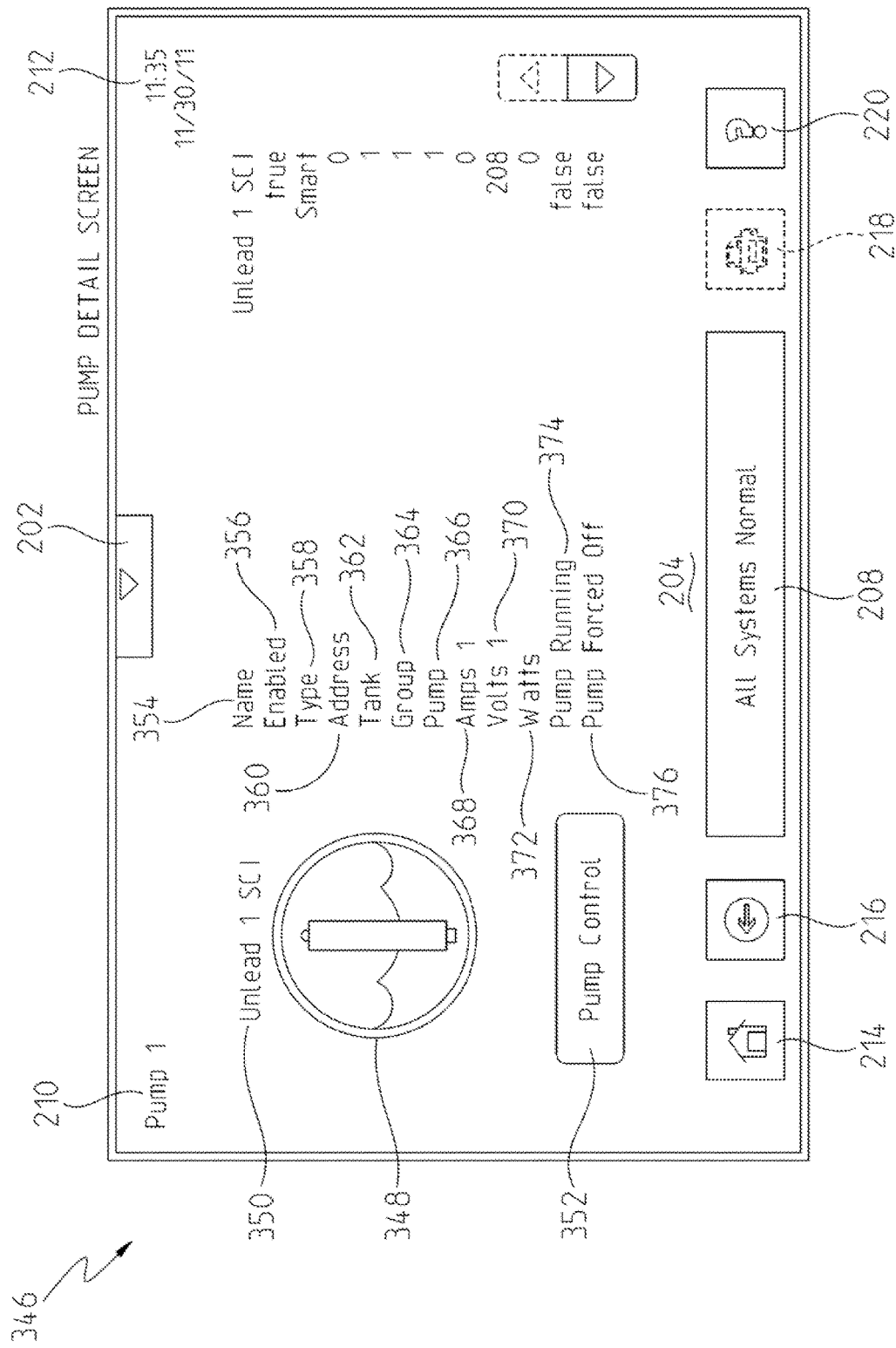
FIG. 23 is a pump detail screen accessible through the pumps function screen of FIG. 21.

The user may obtain additional information about any of pumps 22 represented by each of pump icons 340 by touching the desired pump icon 340. When any one of pump icons 340 is activated, a pump detail screen 346 such as that depicted in FIG. 23 is displayed. As shown in FIG. 23, screen identification field 210 is populated with an identification of the pump 22 corresponding to the pump icon 340 activated by the user and content field 204 is populated with information regarding the pump 22. Pump detail screen 346 generally includes a detailed pump icon 348 accompanied by detailed pump identification information 350, a control button 352, a pump name field 354, an enabled field 356, a controller type field 358, a controller address field 360, a tank field 362 indicating the tank 14 in which the pump 22 is installed, a pump group field 364, a pump field 366, an amps field 368, a volts field 370, a watts field 372, a pump running field 374, and a pump forced off field 376. In general, these fields provide console 12 information about the configuration of the intelligent pump controller associated with a particular submersible pump.

Figure 24:
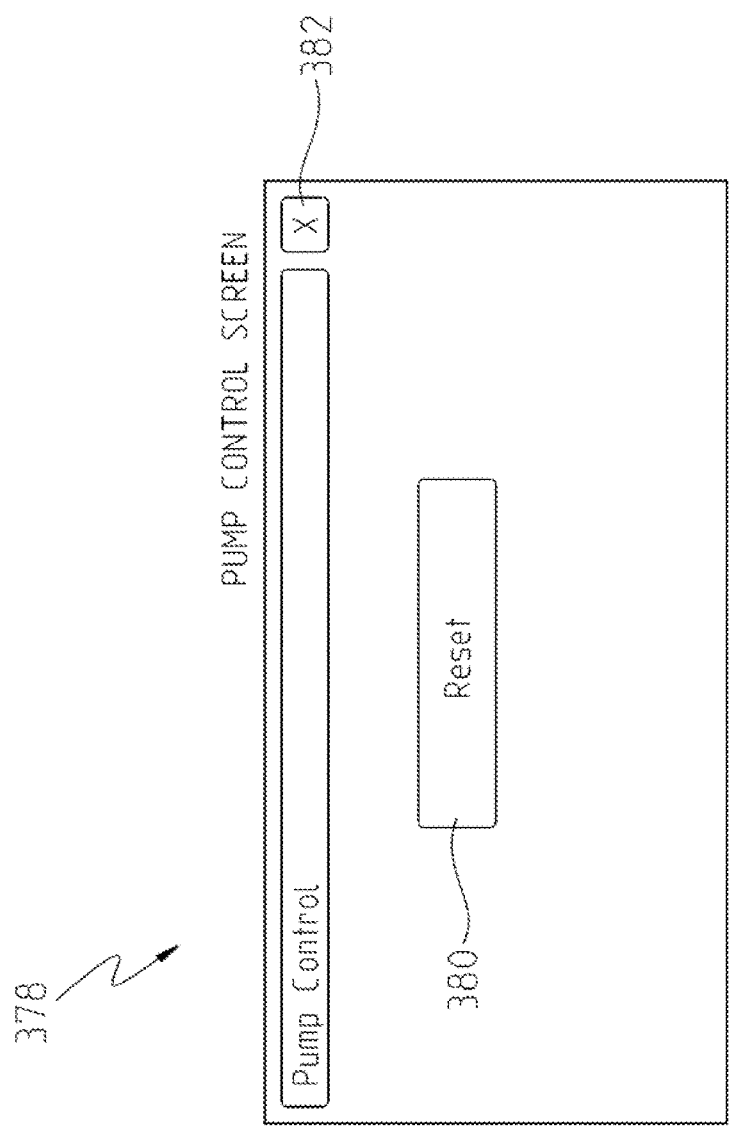
FIG. 24 is a screenshot of a pump control screen accessible through the pump detail screen of FIG. 23.

Activation of control button 352 of pump detail screen 346 causes display of pump control screen 378 as depicted in FIG. 24. Pump control screen 378 includes a reset button 380 and a cancel button 382. The user may activate the cancel button 382 to return to pump detail screen 346. Depending upon the user role assigned to the current user as described above (i.e., guest, user or administrator), the user may reset the hardware and software associated with the pump 22 by touching reset button 380. In particular, if there is an alarm condition associated with pump 22, the user may reset the alarm from pump control screen 378 (i.e., by activating reset button 380) without having to physically access the pump 22.

Reports Function Screen

Figure 25:
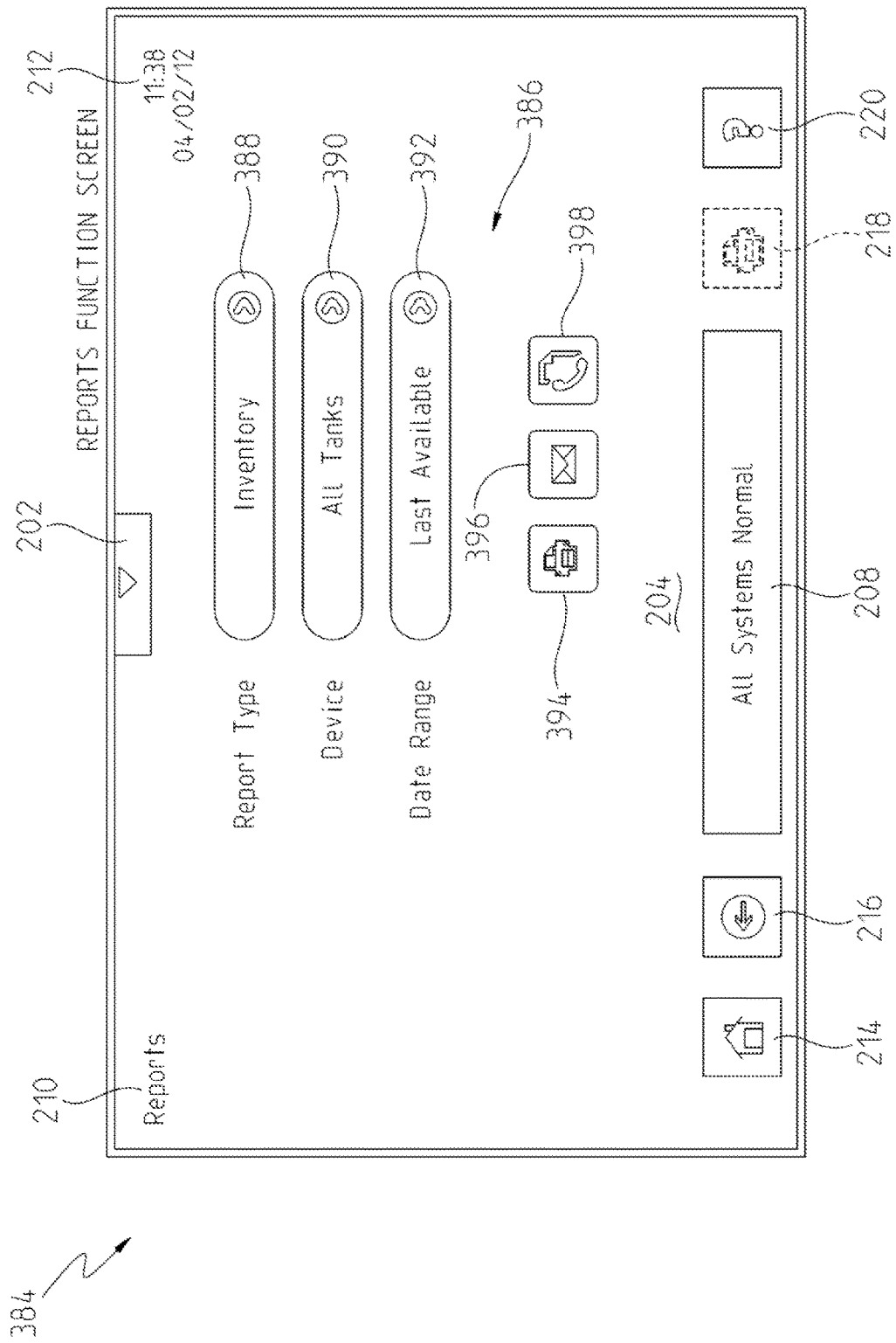
FIG. 25 is a screenshot of a reports function screen generated by the console of FIG. 1.

Activation of reports icon 230E from navigation window 222 (FIGS. 6 and 7) causes console 12 to display reports function screen 384 as depicted in FIG. 25. In general, reports function screen 384 permits the user to generate any of a plurality of system 10 and application reports as described below. As shown, reports function screen 384 includes all of the components of home screen 200 except that one-touch buttons 206A-D previously occupying content field 204 are replaced with report controls 386. Screen identification field 210 is populated with the word "Reports" to identify reports function screen 384.

Figure 26:
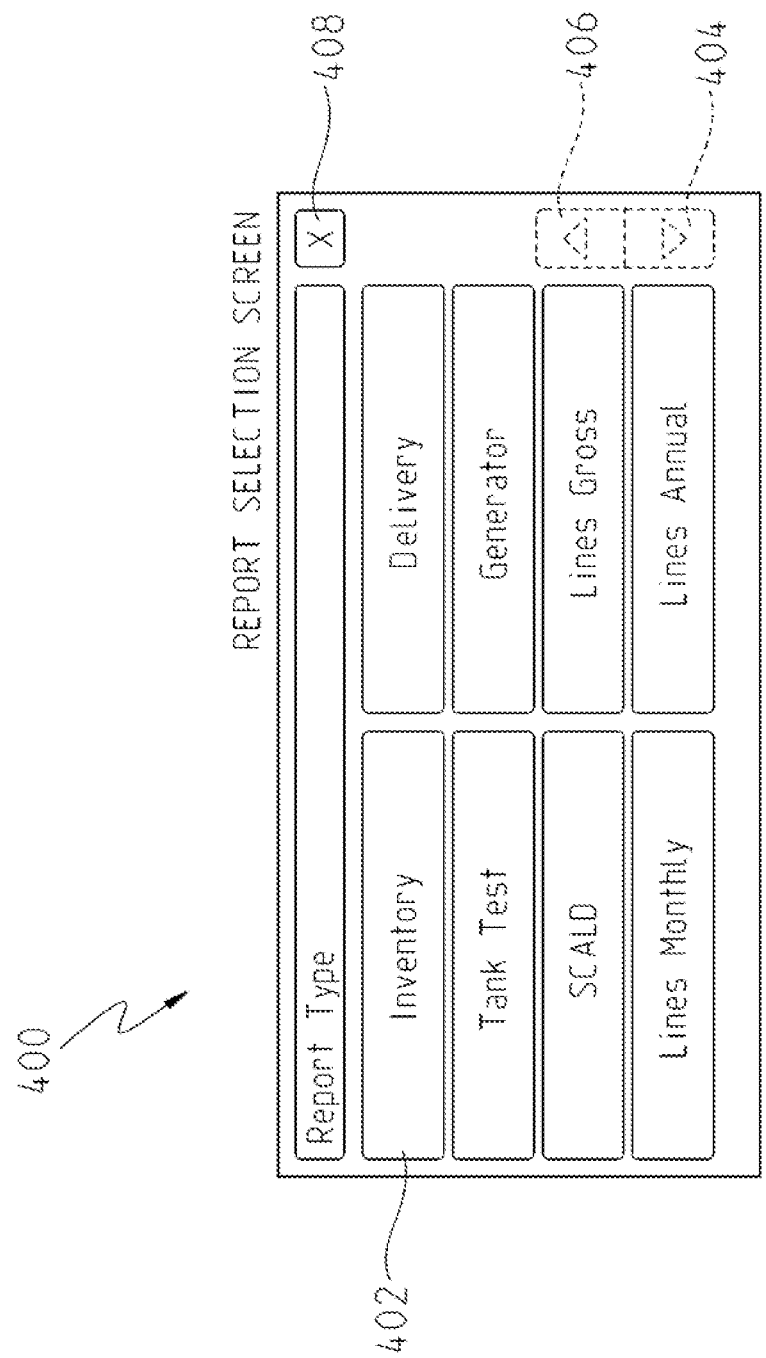
FIG. 26 is a screenshot of a report selection screen accessible through the reports function screen of FIG. 25.

Report controls 386 include a report type button 388, a device button 390, a date range button 392, a print icon 394, a mail icon 396 and a fax icon 398. When the user activates report type button 388, a report selection screen 400 such as that depicted in FIG. 26 is displayed. Report selection screen 400 includes a plurality of report icons 402 which correspond to the report options available to the user depending upon the software options included in console 12 and the configuration of system 10. As shown in FIG. 26, report icons 402 correspond to reports for inventory (including complete level, volume, temperature and ullage information for each tank 16), delivery (including start and ending level and volume information and total amount delivered), tank test (including annual and monthly static tank testing results, assuming the tank testing option is installed), generator (used when a tank 16 fuels a generator and providing information on the fuel consumption of the generator during operation), SCALD (including 24 hour continuous monthly tank testing results, assuming the tank testing option is installed), lines gross, lines monthly, and lines annual (each respectively including gross, monthly and annual line test results, assuming the line leak option is installed). Report selection screen 400 includes scroll arrows 404, 406 which permit the user to display additional report options, such as pump status (which provides information on the configuration of the intelligent pump controllers), reconciliation (which provides information about fuel dispensed, fuel delivered, calculated fuel remaining, actual fuel remaining, and any variances), regulatory (including complete compliance report information for all tanks 16, lines 14 and sensors 20), sensor status (including alarm status information for all monitoring sensors 20), alarm history (including a history of the alarms that system 10 has generated), setup (including a printout of the system programming) and application event history (including a history of any events recorded by console 12 that are not alarms, but are of interest such as when deliveries occur, when tank tests occur, when a setup is modified, etc.). The user may return to reports function screen 384 by activating cancel button 408. When the user selects a report icon 402, reports function screen 384 is again displayed and report type button 388 is populated with name of the selected report icon 402 (in the example of FIG. 25, "Inventory").

Figure 27:
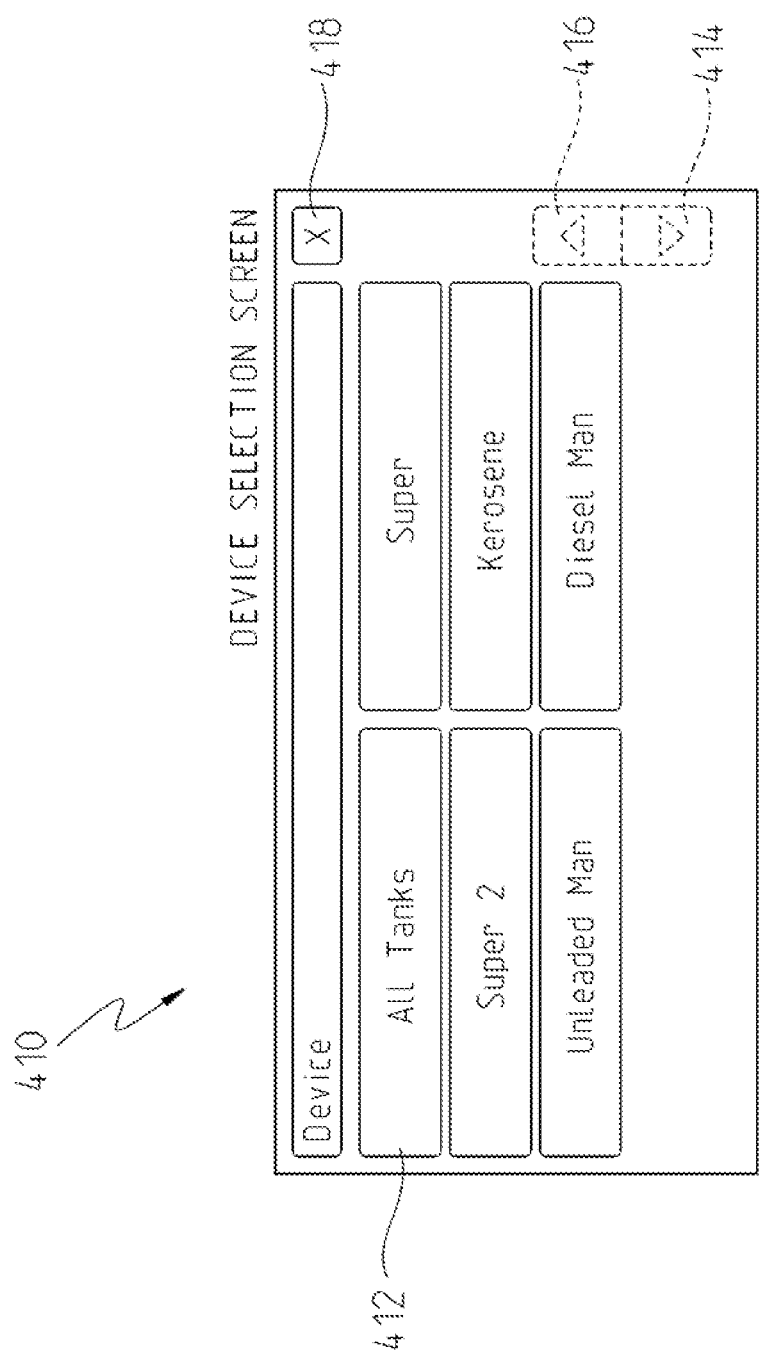
FIG. 27 is a screenshot of a device selection screen accessible through the reports function screen of FIG. 25.

When the user activates device button 390 of reports function screen 384, a device selection screen 410 such as that depicted in FIG. 27 is displayed. Device selection screen 410 includes a plurality of device icons 412 which correspond to the plurality of devices included in system 10. Device selection screen 410 also includes scroll arrows 414, 416 which permit the user to display additional devices. The user may return to reports function screen 384 by activating cancel button 418. When the user selects a device icon 412, reports function screen 384 is again displayed and device button 390 is populated with name of the selected device icon 412 (in the example of FIG. 25, "All Tanks").

Figure 28:
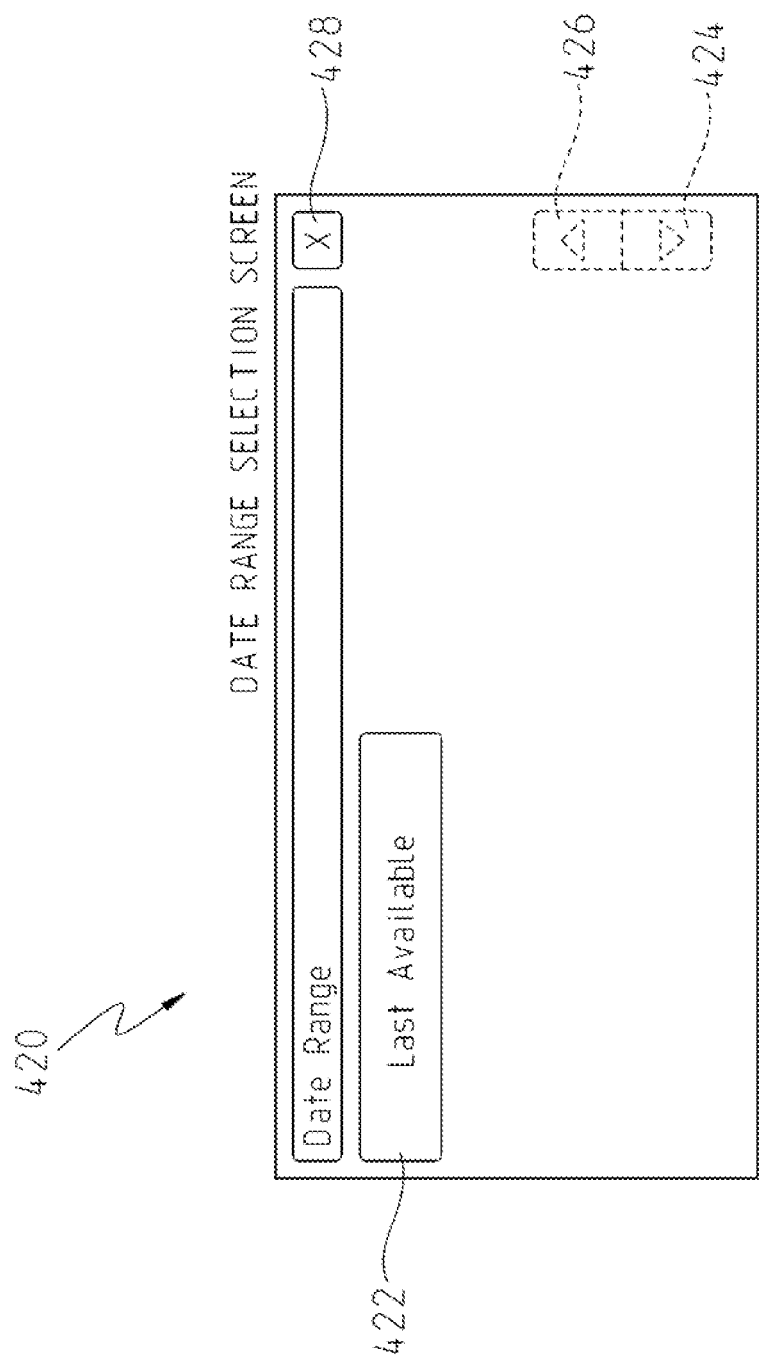
FIG. 28 is a screenshot of a date range selection screen accessible through the reports function screen of FIG. 25.

When the user activates date range button 392 of reports function screen 384, a date range selection screen 420 such as that depicted in FIG. 28 is displayed. Date range selection screen 420 includes a plurality of date range icons 422 (only one shown) which permit the user to specify the date range for the report. Depending upon the type of report requested, date range icons 422 may include different date ranges. The last available date range specifies that the report should provide information relating to the last instance of the requested item of information (e.g., one hour in the past, two months in the past, etc.). Date range selection screen 420 also includes scroll arrows 424, 426 which permit the user to display additional date range icons 422. The user may return to reports function screen 384 by activating cancel button 428. When the user selects a date range icon 422, reports function screen 384 is again displayed and date range button 392 is populated with name of the selected date range icon 422 (in the example of FIG. 25, "Last Available").

After the user has selected the report type, device, and date range, the user may activate print icon 394 which causes console 12 to print the report. A pop-up window (not shown) provides the user an indication that the report is being printed. As indicated above, internal printer 40 may be used to print reports if such a printer is installed in console 12. Alternatively, as is also described above, external printer 26 coupled to the system via on of USB ports 54, 56 may be used to print reports.

Figure 29:
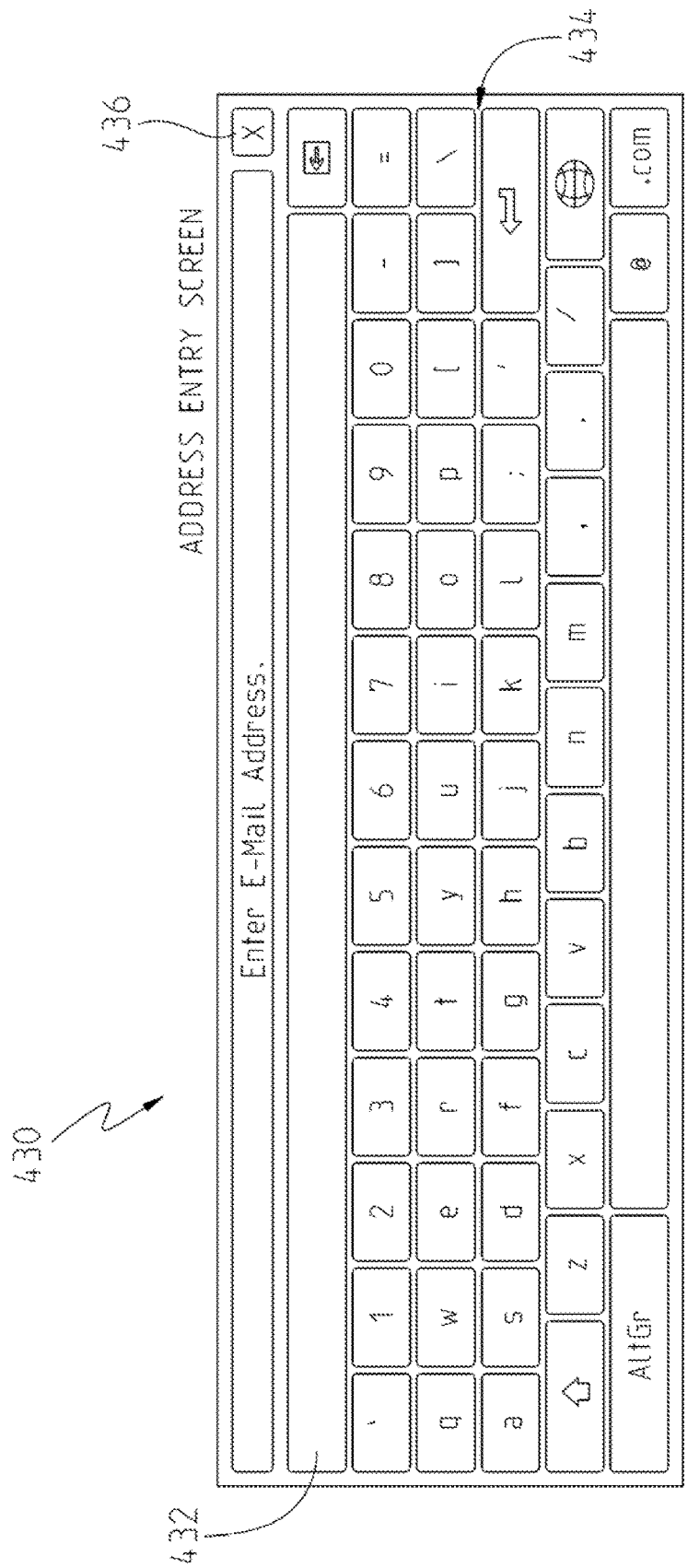
FIG. 29 is a screenshot of an address entry screen accessible through the reports function screen of FIG. 25.

If instead of print icon 394, the user selects mail icon 396 on reports function screen 384 of FIG. 25, then an address entry screen 430 such as that depicted in FIG. 29 is displayed. Address entry screen 430 includes an address field 432, a standard keyboard 434, and a cancel button 436. As the user activates icons on keyboard 434 corresponding to the email address of the intended recipient of the report, address field 432 is populated with the corresponding characters. Activating the enter key sends the report. The user may return to reports function screen 384 by activating cancel button 436.

Figure 30:
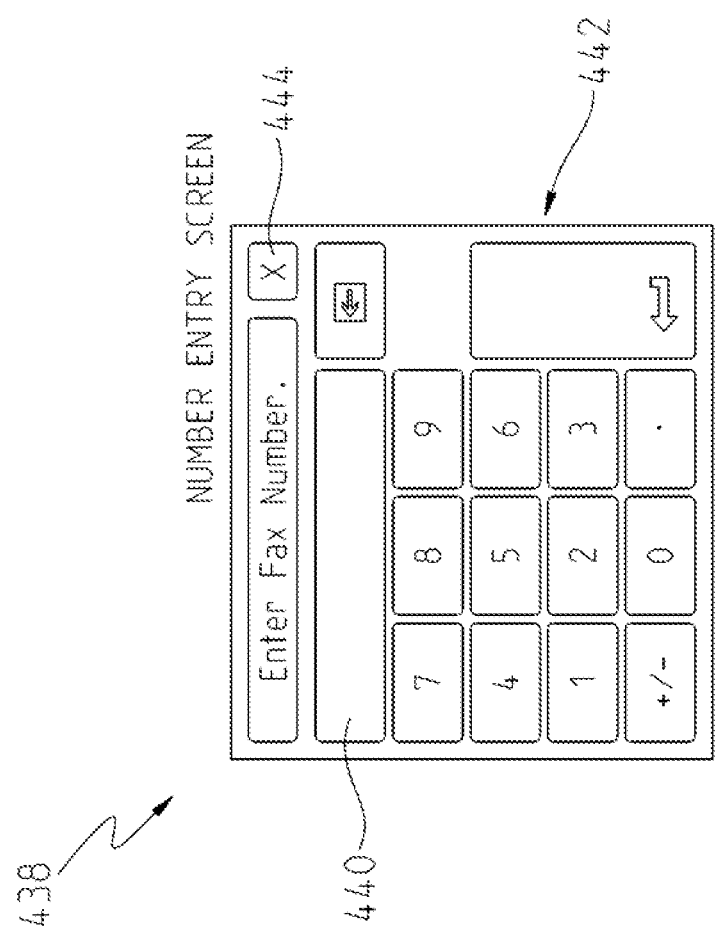
FIG. 30 is a screenshot of a number entry screen accessible through the reports function screen of FIG. 25.

If instead of print icon 394 or mail icon 396, the user selects fax icon 398 on reports function screen 384, then a number entry screen 438 such as that depicted in FIG. 30 is displayed. Number entry screen 438 includes a number field 440, a numeric keypad 442, and a cancel button 444. As the user activates icons on keypad 442 corresponding to the fax number of the intended recipient of the report, number field 440 is populated with the corresponding numbers. Activating the enter key sends the report. The user may return to reports function screen 384 by activating cancel button 444.

Compliance Function Screen

Figure 31:
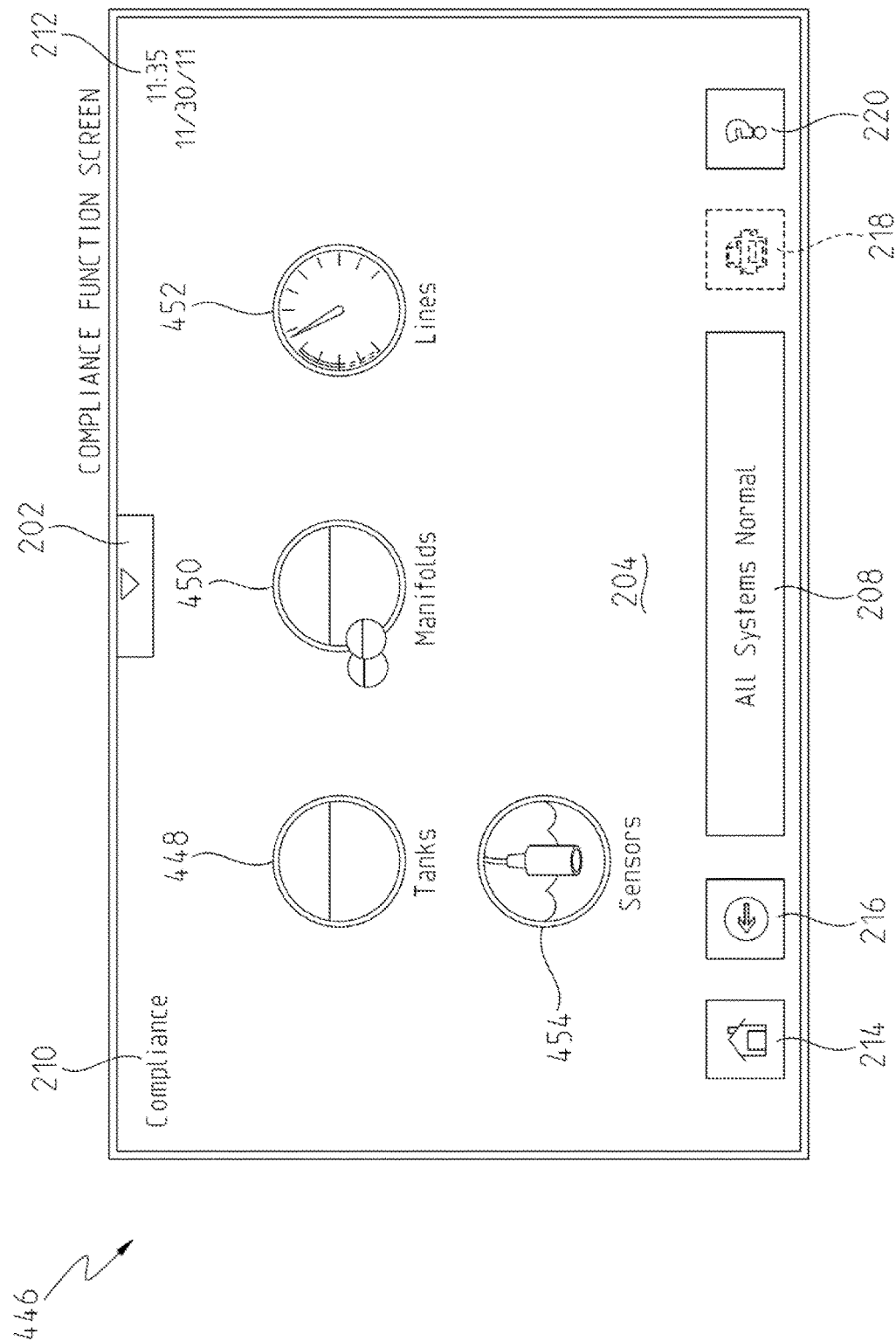
FIG. 31 is a screenshot of a compliance function screen generated by the console of FIG. 1.

Activation of compliance icon 230F from navigation window 222 (FIGS. 6 and 7) causes console 12 to display compliance function screen 446 as depicted in FIG. 31. In general, compliance function screen 446 provides information about the regulatory status of all tanks 16, manifolds, lines 14 and sensors 20 included in system 10. As shown, compliance function screen 446 includes all of the components of home screen 200 except that one-touch buttons 206A-D previously occupying content field 204 are replaced with a tanks icon 448, a manifolds icon 450, a lines icon 452, and a sensors icon 454. Screen identification field 210 is populated with the word "Compliance" to identify reports function screen 384.

Figure 32:
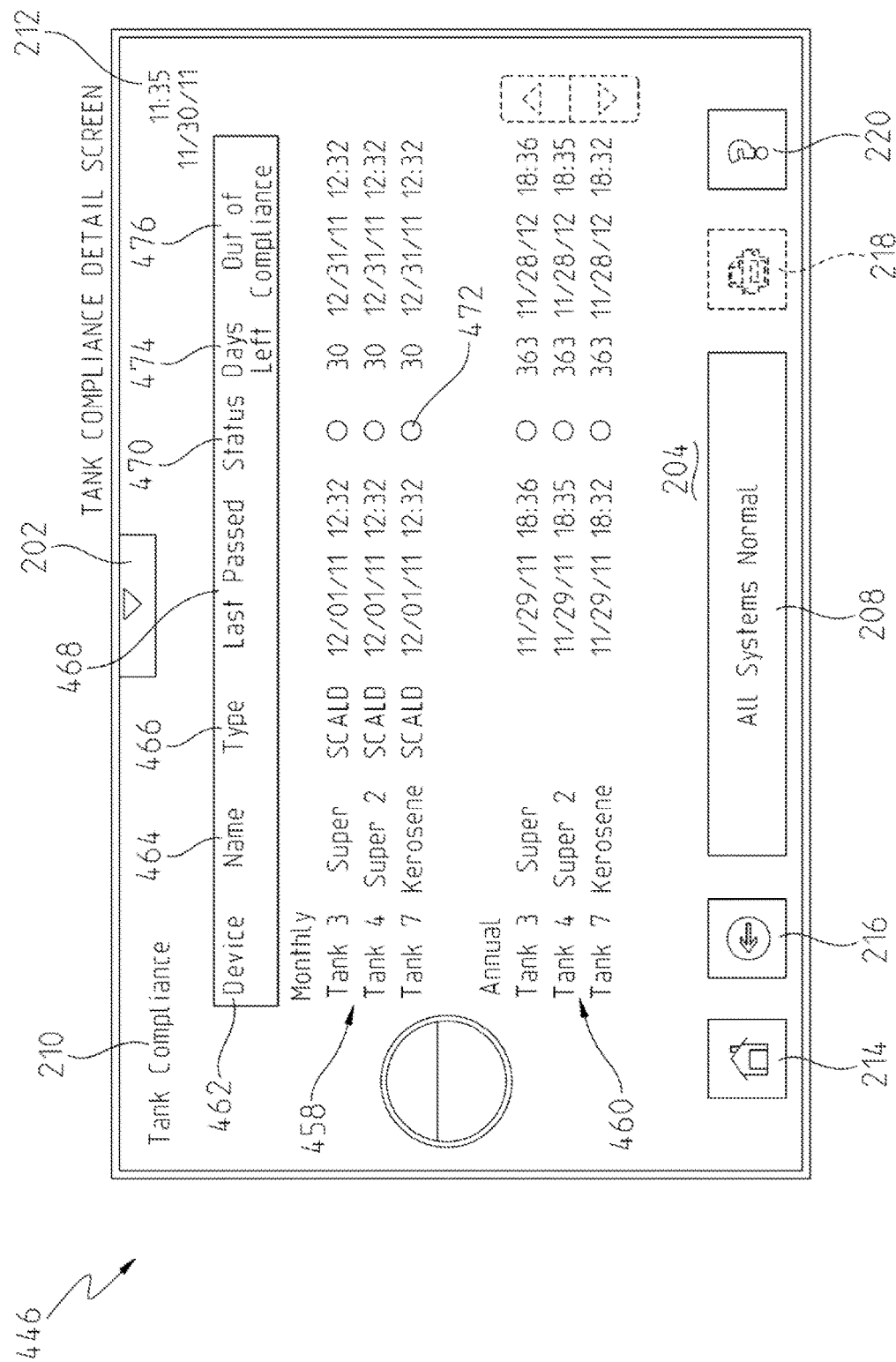
FIG. 32 is a screenshot of a tank compliance detail screen accessible through the compliance function screen of FIG. 31.

When the user activates tanks icon 448, a tank compliance detail screen 456 such as that depicted in FIG. 32 is displayed. As shown, tank compliance detail screen 456 includes a monthly compliance area 458 and an annual compliance area 460. Information in both areas 458, 460 is presented in a tabular format including a device column 462 where the tank 16 number is identified, a name column 464 where the tank 16 name is provided, a type column 466 where the test performed is identified, a last passed column 468 where the date the test was last passed is provided, a status column 470 which includes color coded icons 472 that provide a quick, visual indication of the compliance status of the tank 16, a days left column 474 where the number of days the tank 16 will remain in compliance for a particular test is provided, and an out of compliance column 476 which provides the date on which the tank 16 will be out of compliance for a particular test.

Figure 33:
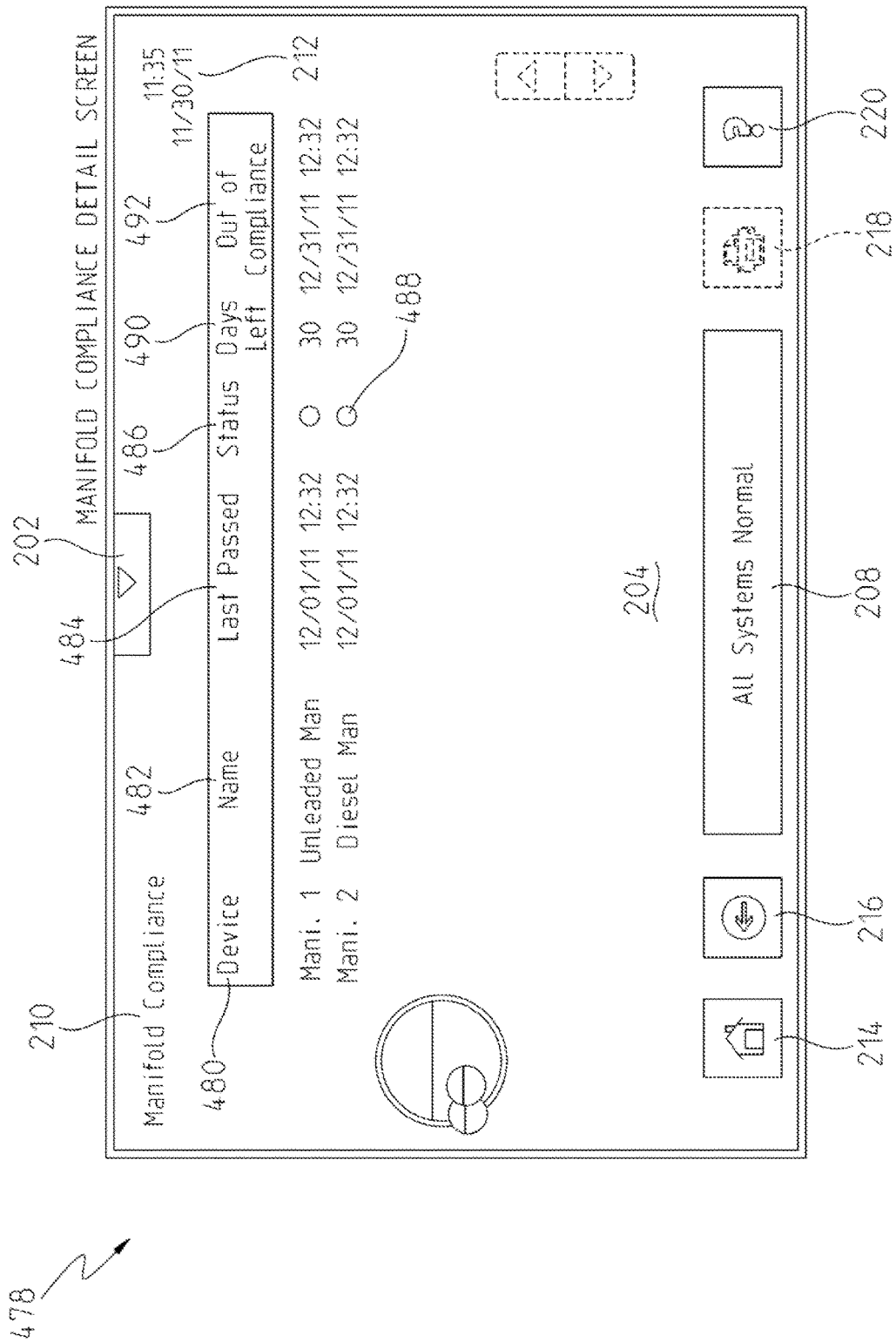
FIG. 33 is a screenshot of a manifold compliance detail screen accessible through the compliance function screen of FIG. 31.

When the user activates the manifolds icon 450, a manifold compliance detail screen 478 such as that depicted in FIG. 33 is displayed. As shown, manifold compliance detail screen 478 similarly includes information in a tabular format including a device column 480 where the manifold number is identified, a name column 482 where the manifold name is provided, a last passed column 484 where the date the manifold test was last passed is provided, a status column 486 which includes color coded icons 488 that provide a quick, visual indication of the compliance status of the manifold, a days left column 490 where the number of days the manifold will remain in compliance for a particular test is provided, and an out of compliance column 492 which provides the date on which the manifold will be out of compliance for a particular test.

Figure 34:
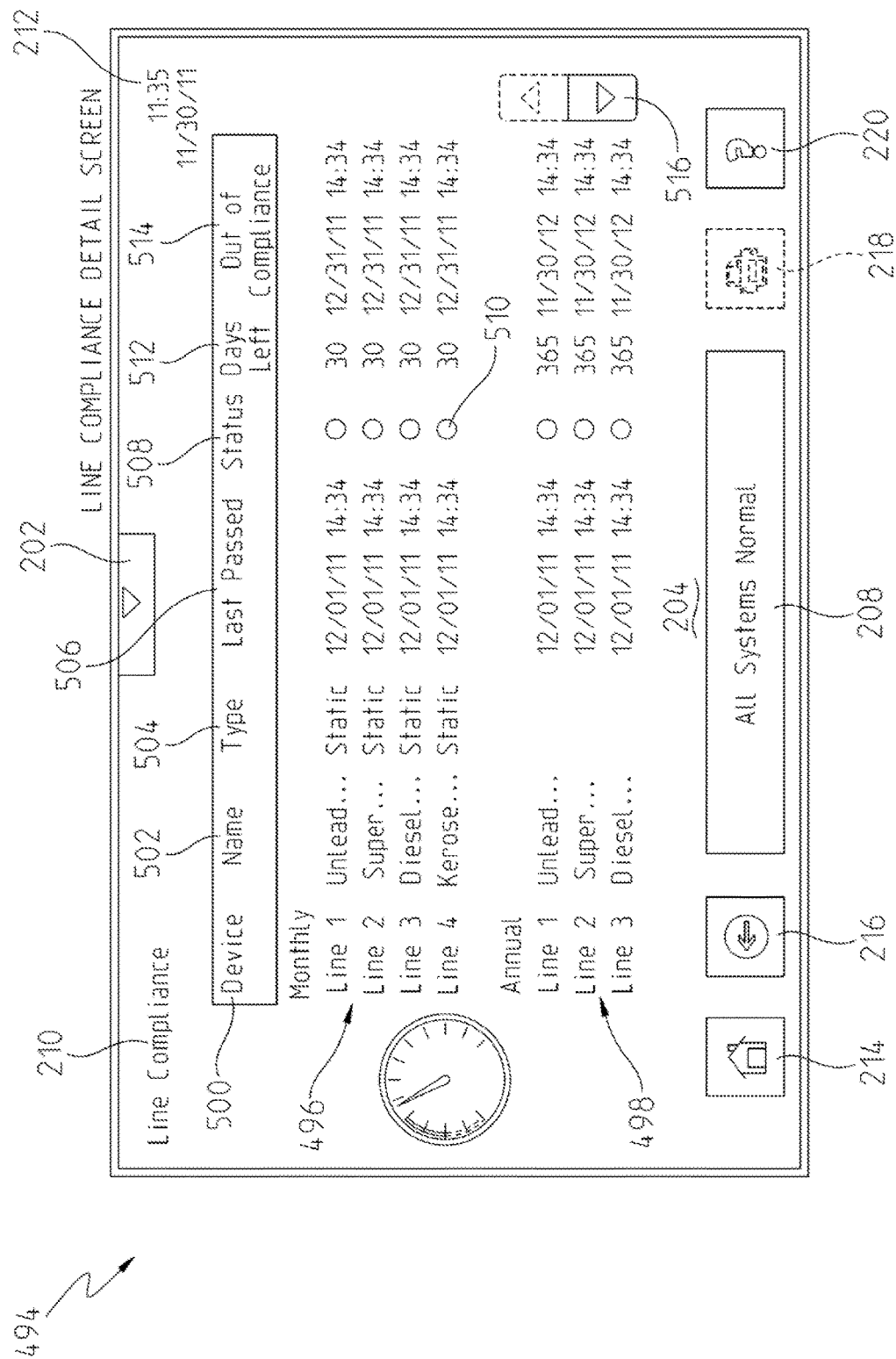
FIG. 34 is a screenshot of a line compliance detail screen accessible through the compliance function screen of FIG. 31.

When the user activates the lines icon 452 of the compliance function screen 446 (FIG. 31), a line compliance detail screen 494 such as that depicted in FIG. 34 is displayed. Like tank compliance detail screen 456 of FIG. 32, line compliance detail screen 494 includes a monthly compliance area 496 and an annual compliance area 498. Information in both areas 496, 498 is presented in a tabular format including a device column 500 where the line 14 number is identified, a name column 502 where the line 14 name is provided, a type column 504 where the test performed is identified, a last passed column 506 where the date the test was last passed is provided, a status column 508 which includes color coded icons 510 that provide a quick, visual indication of the compliance status of the line 14, a days left column 512 where the number of days the line 14 will remain in compliance for a particular test is provided, and an out of compliance column 514 which provides the date on which the line 14 will be out of compliance for a particular test. Compliance information for additional lines 14 may be viewed using scroll arrow 516.

Figure 35:
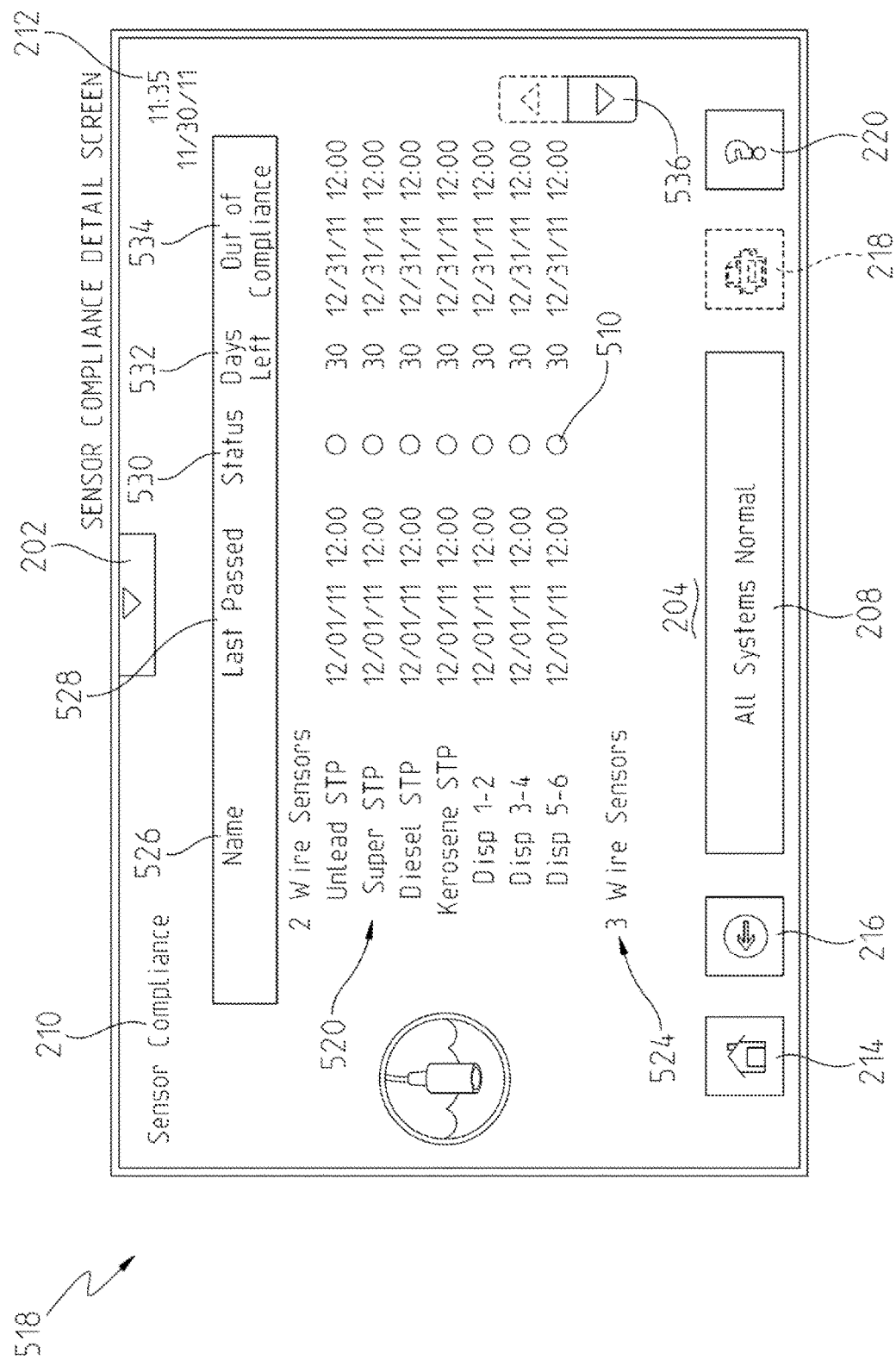
FIG. 35 is a screenshot of a sensor compliance detail screen accessible through the compliance function screen of FIG. 31.

Finally, when the user activates the sensors icon 454 of the compliance function screen 446 (FIG. 31), a sensor compliance detail screen 518 such as that depicted in FIG. 35 is displayed. Sensor compliance detail screen 518 includes a two wire sensor area 520 and a three wire sensor area 522. Information in both areas 520, 522 is presented in a tabular format including a name column 524 where the sensor 20 name is provided, a last passed column 526 where the date the test was last passed is provided, a status column 528 which includes color coded icons 530 that provide a quick, visual indication of the compliance status of the sensor 20, a days left column 532 where the number of days the sensor 20 will remain in compliance for a particular test is provided, and an out of compliance column 534 which provides the date on which the sensor 20 will be out of compliance for a particular test. Compliance information for additional sensors 20 may be viewed using scroll arrow 536.

Alarm Function Screen

Figure 36:
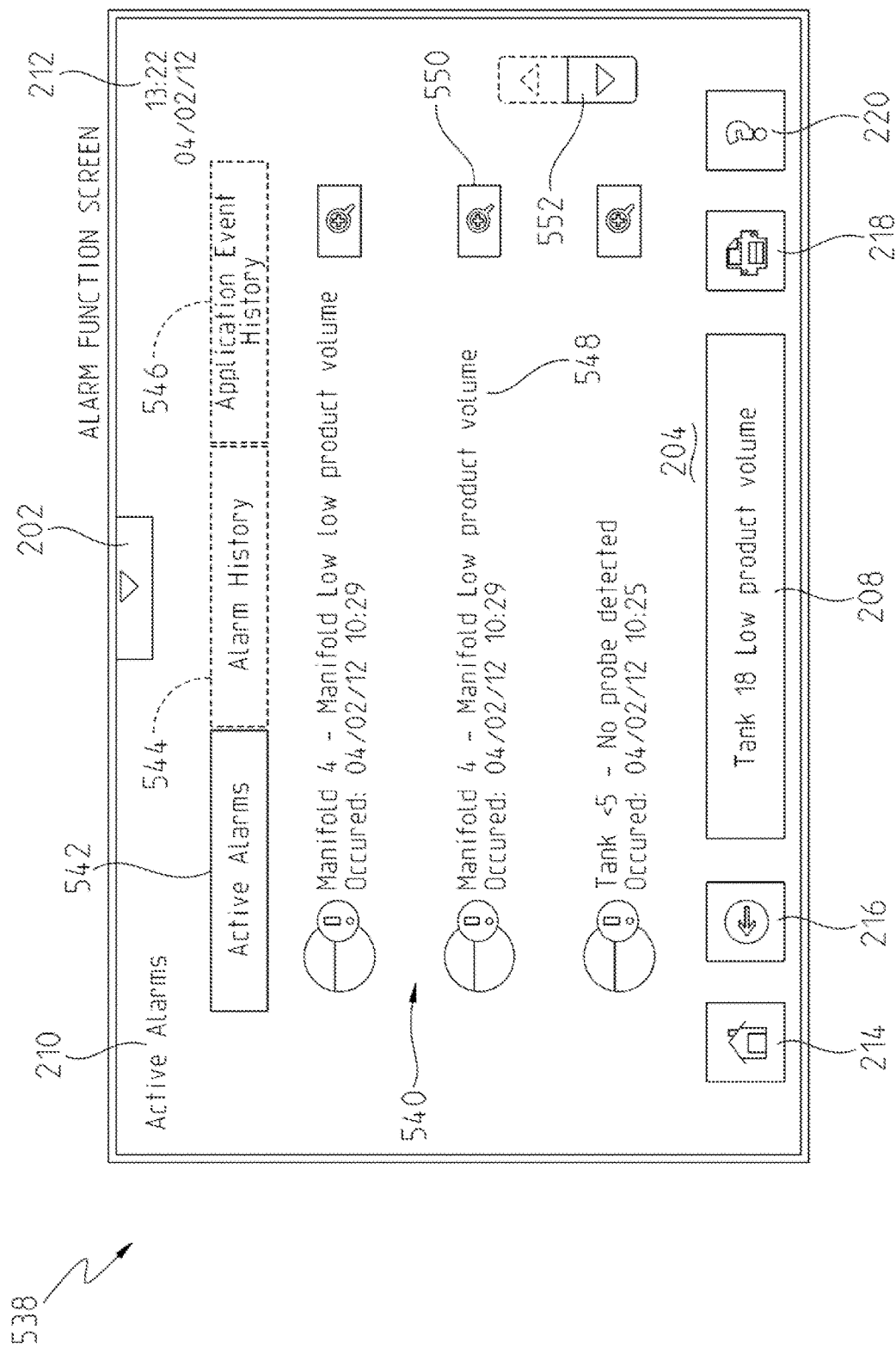
FIG. 36 is a screenshot of an alarm function screen generated by the console of FIG. 1.

Activation of alarm icon 230G from navigation window 222 (FIGS. 6 and 7) causes console 12 to display alarm function screen 538 as depicted in FIG. 36. In general, alarm function screen 538 provides summary and detail information about active system alarms and historical information about system alarms and application events. As shown, alarm function screen 538 includes all of the components of home screen 200 except that one-touch buttons 206A-D previously occupying content field 204 are replaced with an alarm information field 540, an active alarms button 542, an alarm history button 544, and an application event history button 546. In FIG. 36, active alarms button 542 is shown as active, so alarm information field 540 includes information about any active system alarms. More specifically, alarm information field 540 includes alarm summaries 548 and corresponding alarm detail icons 550. Additional alarm information may be viewed using scroll arrow 552. Screen identification field 210 is populated with the words "Active Alarms" to identify alarm function screen 538 with active alarms button 542 activated. As should also be apparent from FIG. 36, status window 208 is populated with alarm information and in one embodiment of the disclosure, has a red background instead of a green background, which is displayed if no alarm conditions exist.

Figure 37:
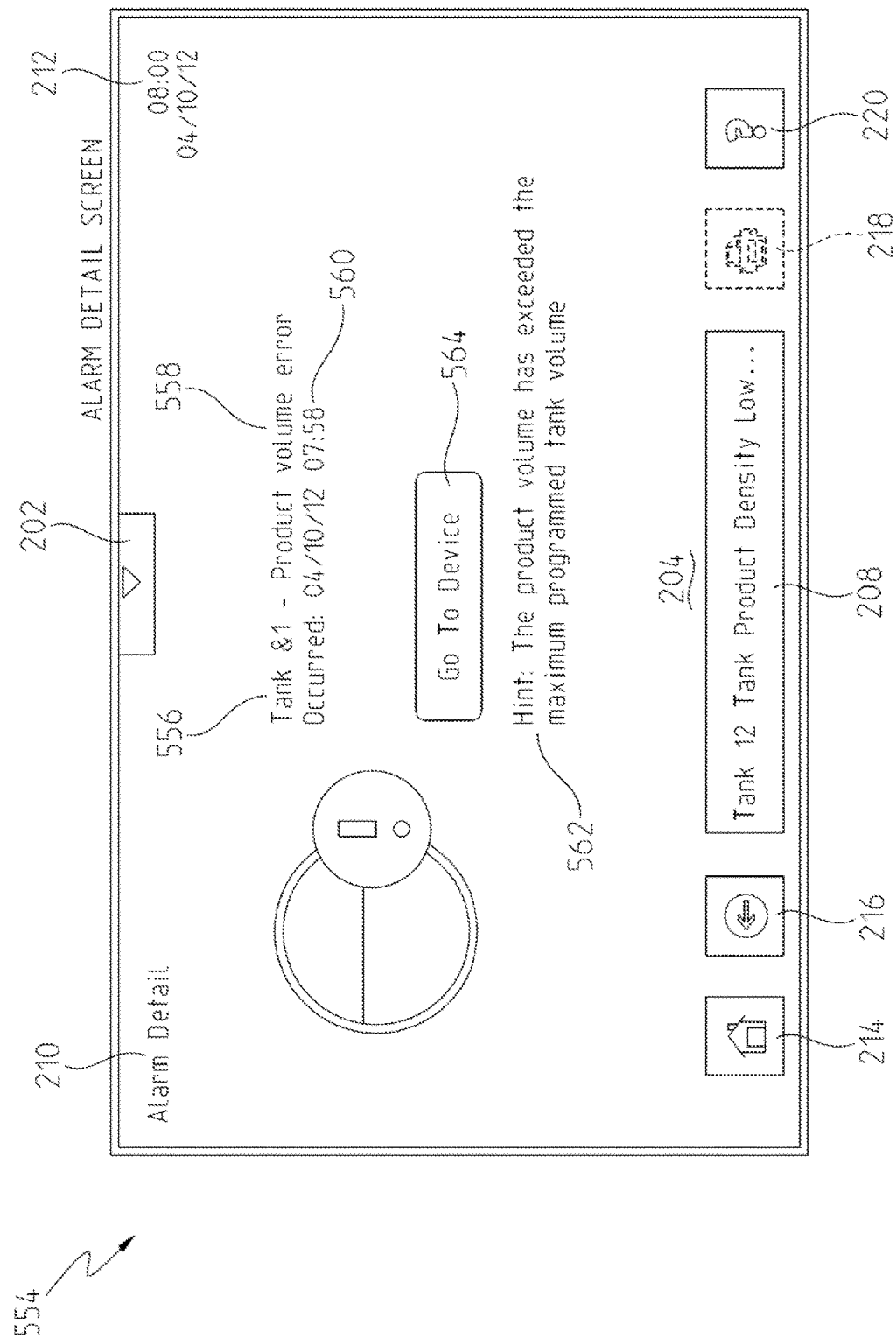
FIG. 37 is a screenshot of an alarm detail screen accessible through the alarm function screen of FIG. 36.

From alarm function screen 538, the user may access additional detail about specific alarms by activating alarm detail icon 550 corresponding to the alarm of interest. Upon activation of an alarm detail icon 550, console 12 displays an alarm detail screen 554 as depicted in FIG. 37. As shown in FIG. 37, screen identification field 210 is populated with the words "Alarm Detail" to identify alarm detail screen 554. Alarm detail screen 554 includes a device identifier 556 which indicates the device associated with the alarm, an alarm description field 558 that provides detailed information about the alarm, a date field 560 which provides the date and time upon which the alarm occurred, and a hint filed 562 which provides more detailed information about the alarm as well as recommended actions and precautions associated with the alarm. Many alarm detail screens 554 will also include a go to device button 564 as shown in FIG. 37. Activation of go to device button 564 directs the user straight to the device to allow the user to perform corrective actions or otherwise address the alarm condition by displaying the detail screen associated with the device that generated the alarm. Alarm detail screen 554 may, in one embodiment, also include an action button (not shown) which allows the user to reset the alarm. The text of the action button depends on the type of alarm (e.g., "reset pump," etc.).

Figure 38:
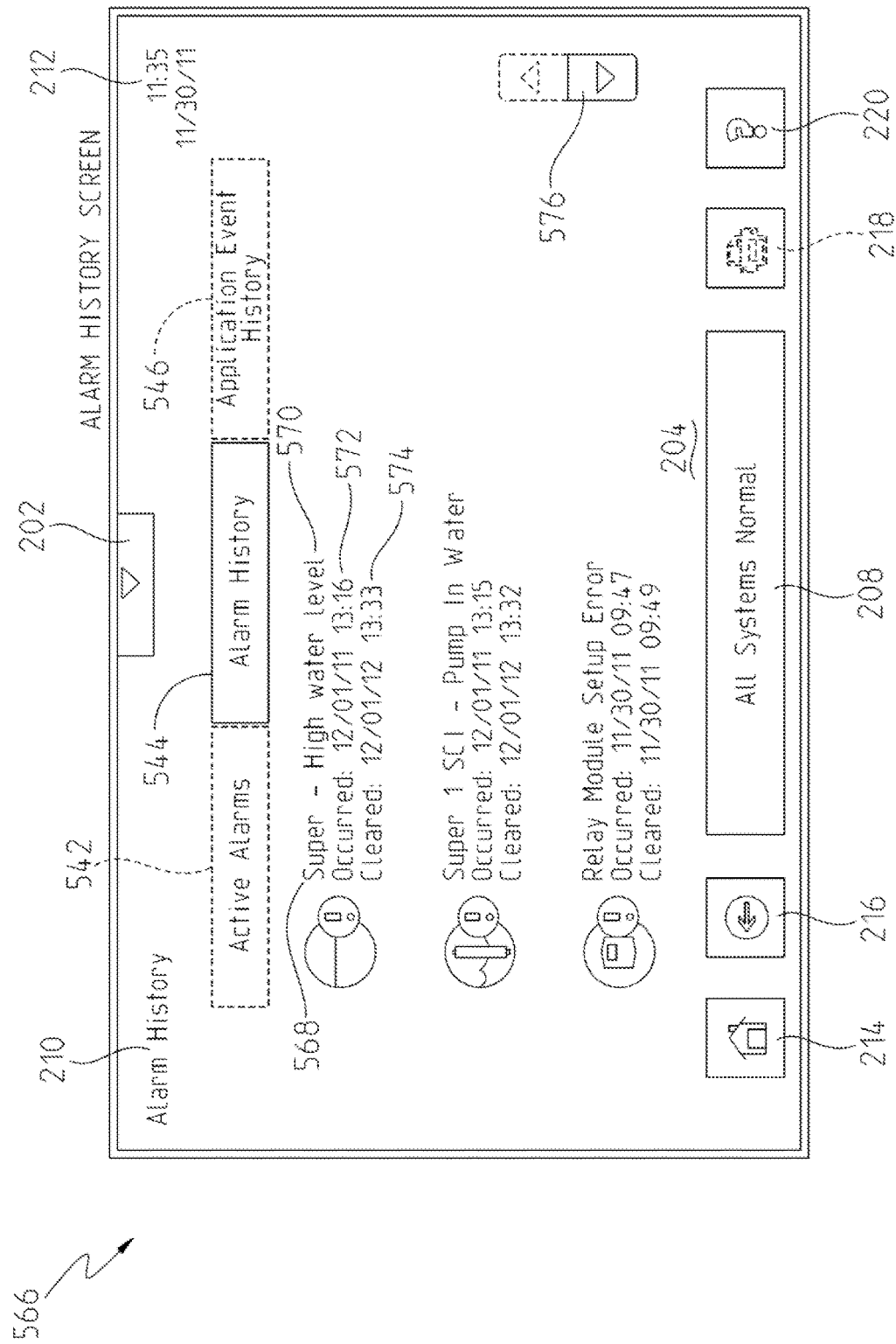
FIGS. 38 and 39 are additional screenshots of the alarm function screen of FIG. 36.

When the user activates alarm history button 544 of alarm function screen 538 (FIG. 36), an alarm history screen 566 such as that depicted in FIG. 38 is displayed. As shown in FIG. 38, screen identification field 210 is populated with the words "Alarm History" to identify alarm history screen 566. Alarm history screen 566 includes, for each alarm that has occurred during operation of system 10, a device identifier 568 which indicates the device associated with the alarm, an alarm description field 570 that provides information about the alarm, a date occurred field 572 which provides the date and time upon which the alarm occurred, and a cleared date field 574 which provides the date and time the alarm was cleared. Additional alarm information may be viewed using scroll arrow 576.

Figure 39:
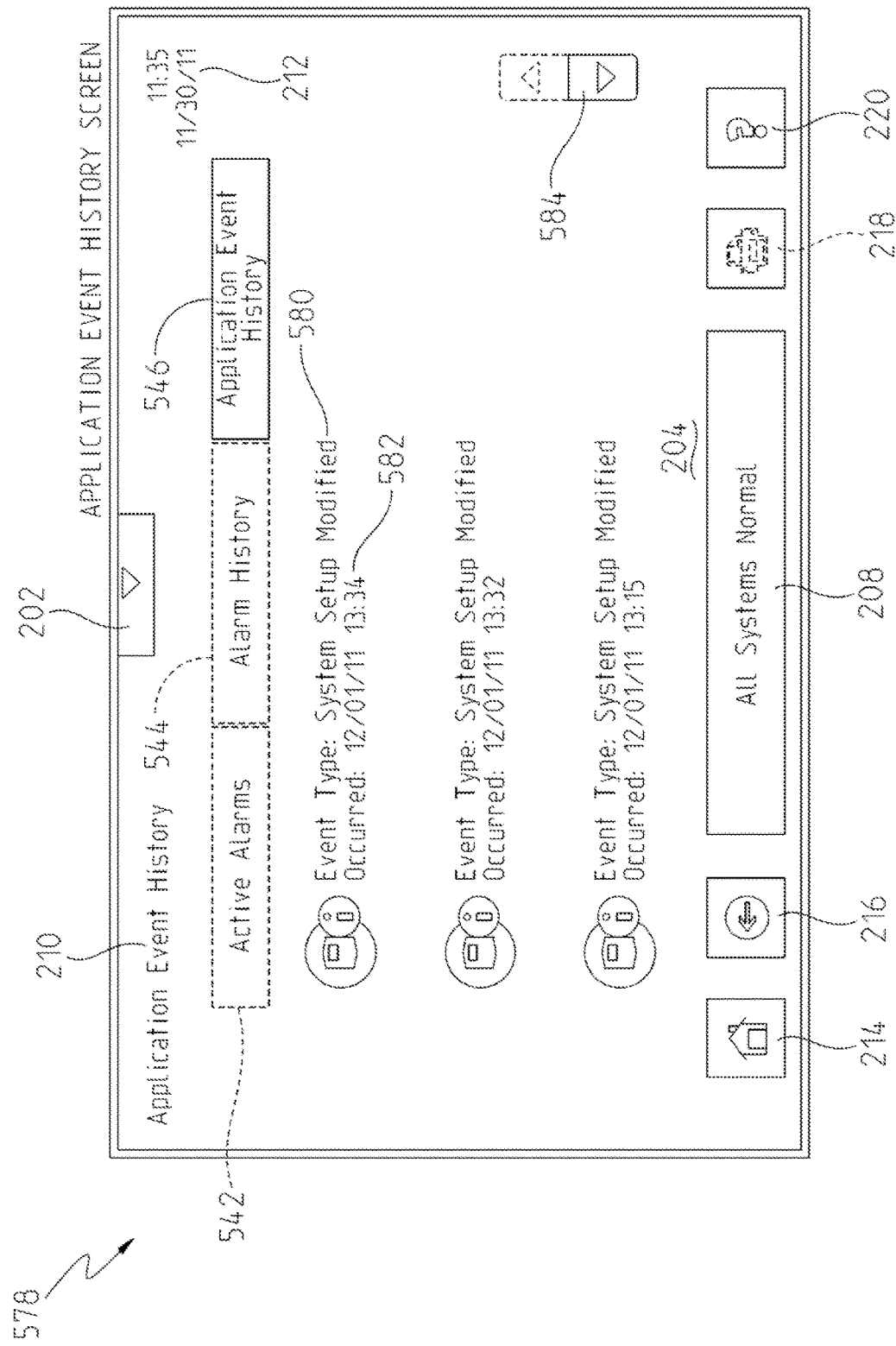

Similarly, when the user activates application event history button 546 of alarm function screen 538 (FIG. 36), an application event history screen 578 such as that depicted in FIG. 39 is displayed. As shown in FIG. 39, screen identification field 210 is populated with the words "Application Event History" to identify application event history screen 578. Application event history screen 578 includes, for each application event that has occurred during operation of the system, an event description field 580 which describes the application event, and a date occurred field 582 which provides the date and time upon which the event occurred. Additional application event information may be viewed using scroll arrow 584.

Utilities Function Screen

Figure 40:
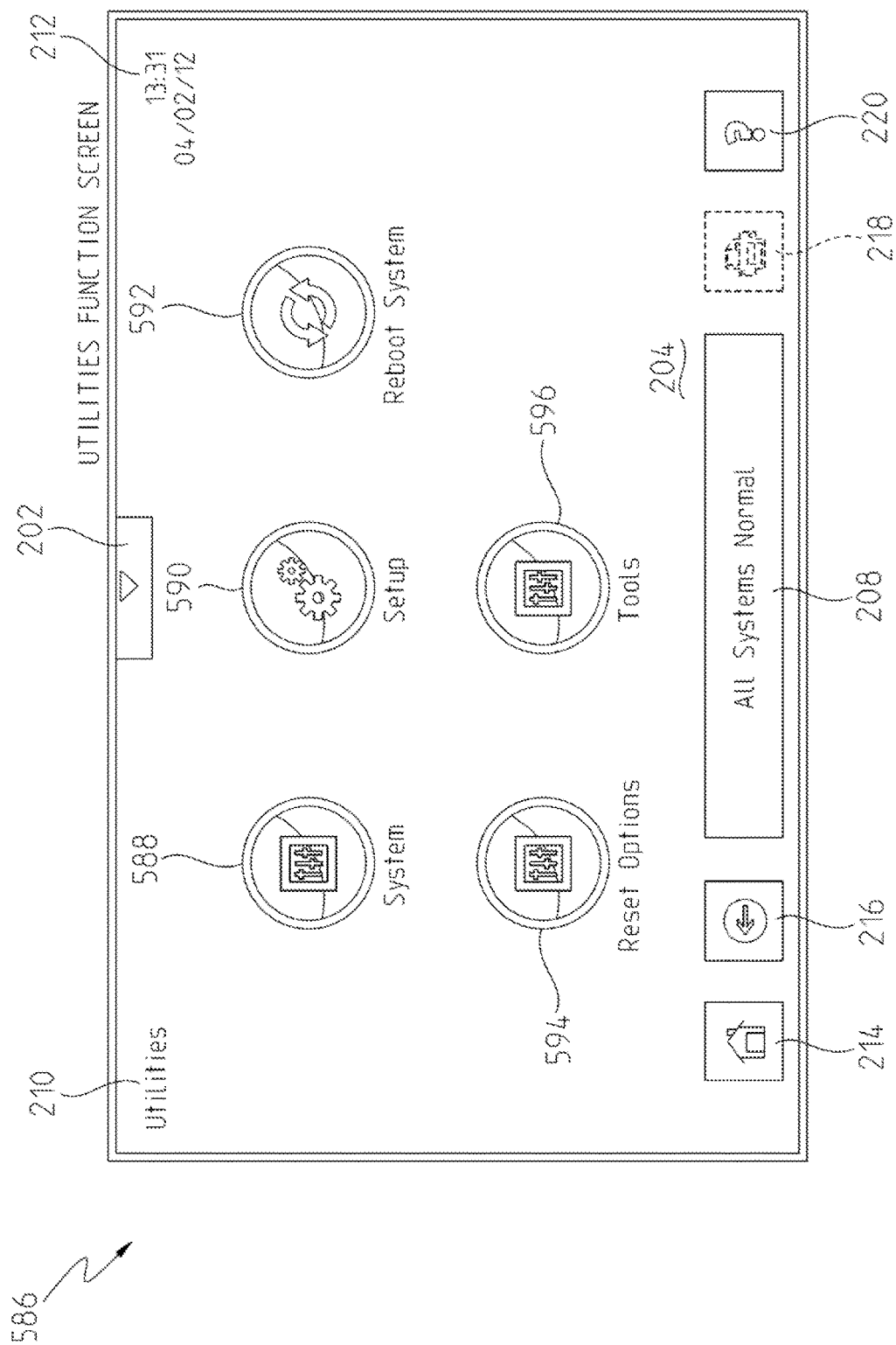
FIG. 40 is a screenshot of a utilities function screen generated by the console of FIG. 1.

Activation of utilities icon 230H from navigation window 222 (FIGS. 6 and 7) causes console 12 to display utilities function screen 586 as depicted in FIG. 40. In general, utilities function screen 586 permits the user to access a plurality of setup, configuration and system tools for configuring and maintaining the equipment installed at the site. As shown, utilities function screen 586 includes all of the components of home screen 200 except that one-touch buttons 206A-D previously occupying content field 204 are replaced with a system icon 588, a setup icon 590, a reboot system icon 592, a reset options icon 594, and a tools icon 596, the functions of each being described below.

Figure 41:
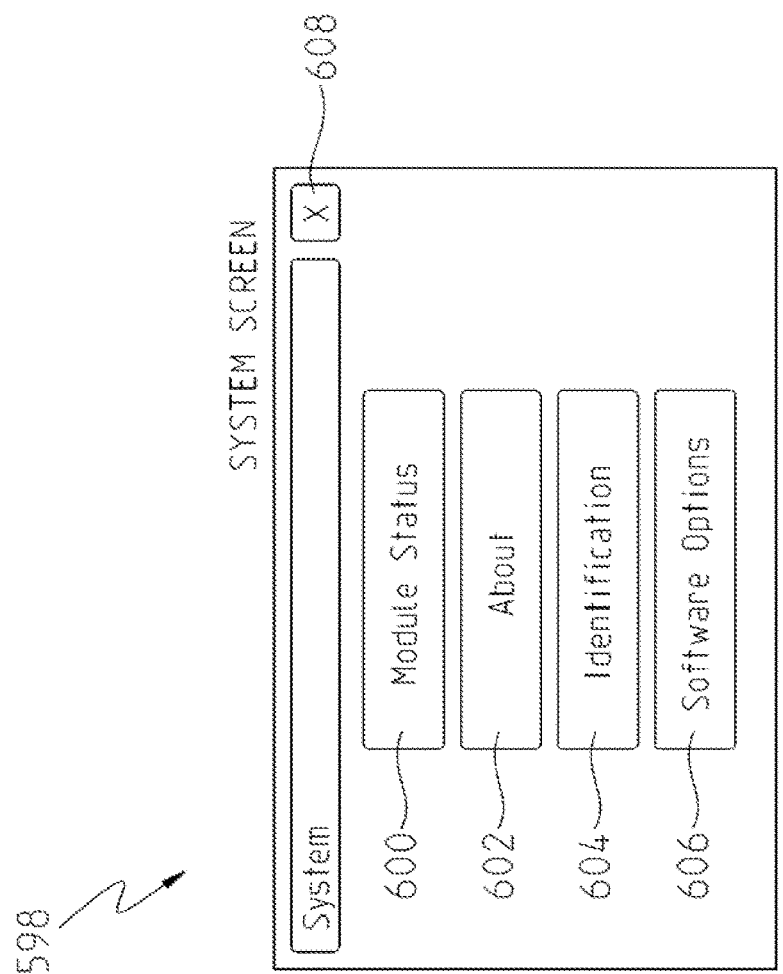
FIG. 41 is a screenshot of a system screen accessible through the utilities function screen of FIG. 40.
Figure 42:
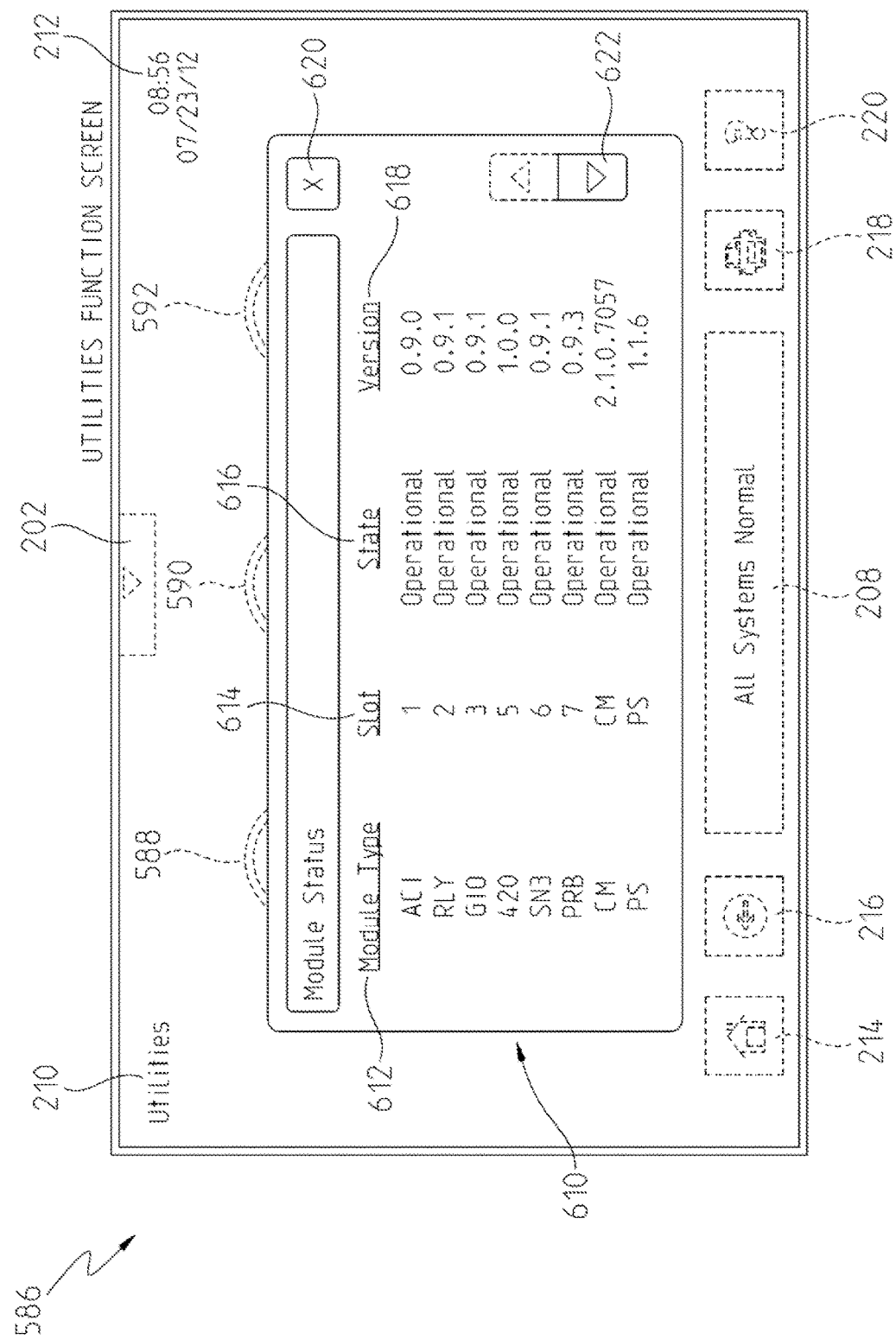
FIGS. 42-45 are screenshots of system information screens accessible through the system screen of FIG. 41.

When the user activates system icon 588, a system screen 598 such as that depicted in FIG. 41 is displayed. As shown, system screen 598 includes a module status button 600, an about button 602, an identification button 604, a software options button 606, and a cancel button 608. Activation of module status button 600 causes the display of a module status window 610 as depicted in FIG. 42. The various functions of console 12 are dependent upon which modules are installed. Console 12 will always include a power supply module and a controller module. Other modules include probe modules, sensor modules, and other input and output modules which may be installed to correspond to the number of pumps, lines, tanks and sensors associated with console 12. Module status window 610 includes module type column 612 which identifies each module installed in the system, a slot column 614 which identifies the slot associated with the module, a state column 616 which identifies the current operational state of the module, a version column 618 which identifies the software version associated with the module, a cancel button 620 for returning the user to system screen 598, and a scroll arrow 622 for use in viewing information about additional modules.

Figure 43:
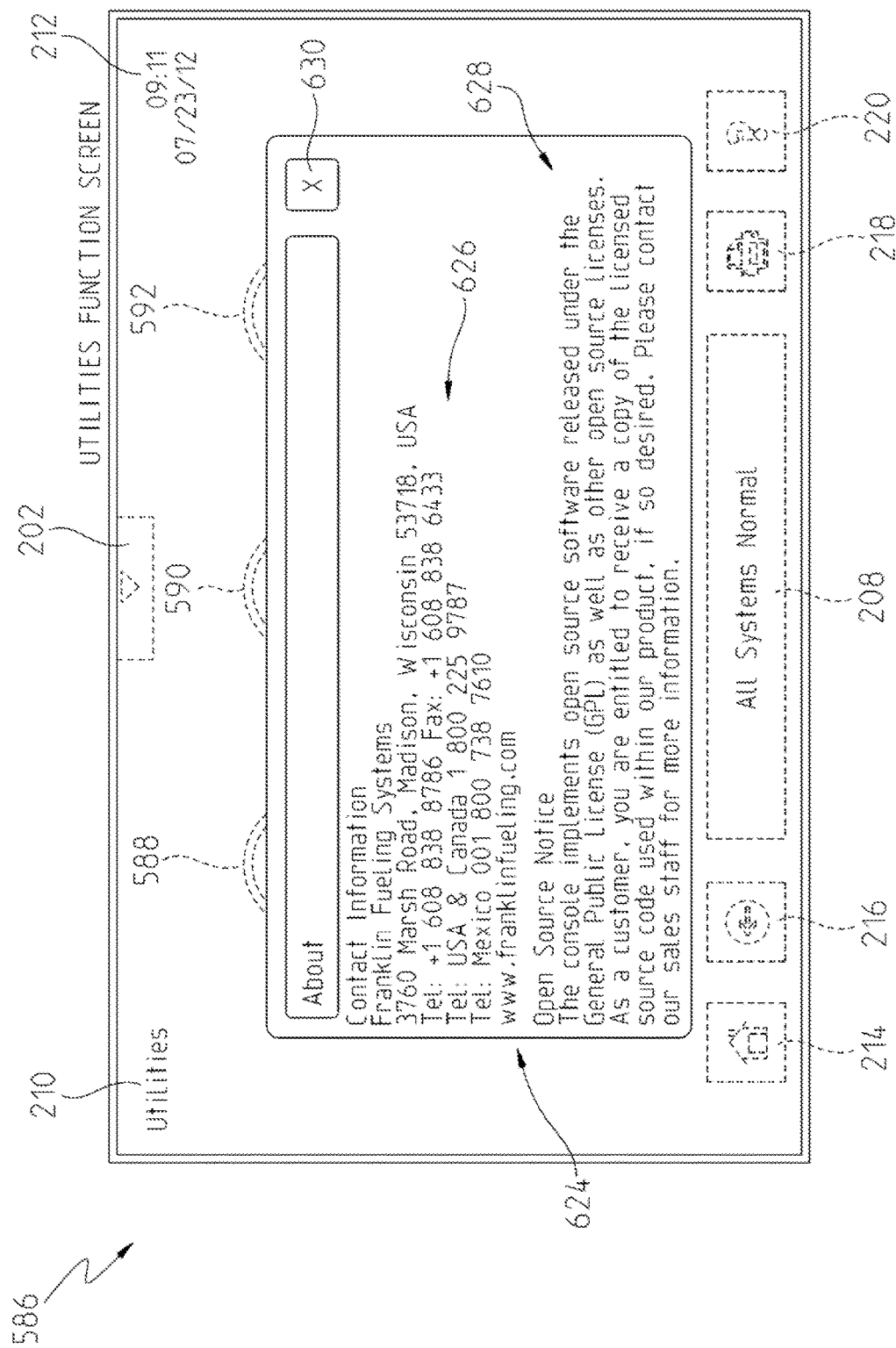

Activation of about button 602 causes the display of an about window 624 as depicted in FIG. 43. About window 624 includes a contact information area 626 which identifies the provider of console 12, and an open source note area 628, which provides information about use of open source software, if any, included in instructions 34, and a cancel button 630 which returns the user to system screen 598.

Figure 44:
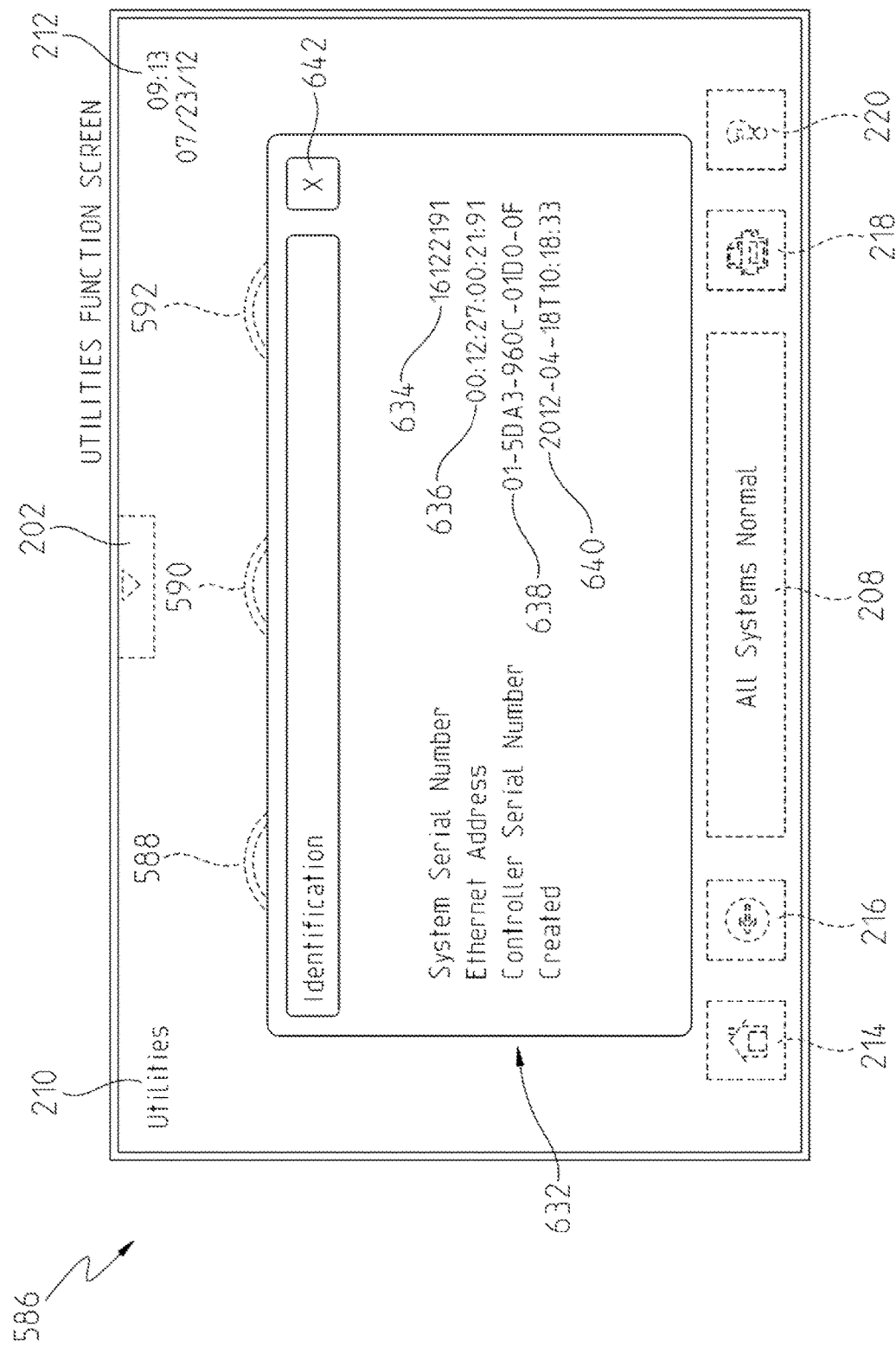

Activation of identification button 604 causes the display of an identification window 632 as depicted in FIG. 44. Identification window 632 includes a serial number field 634 which identifies the serial number associated with console 12, and an Ethernet address field 636, which provides the Ethernet address of console 12 if connected to network 24, a controller serial number field 638, which provides the serial number of the controller module of console 12 that includes processor 36, a created field 640, which provides the date and time system 10 was initialized, and a cancel button 642 which returns the user to system screen 598.

Figure 45:
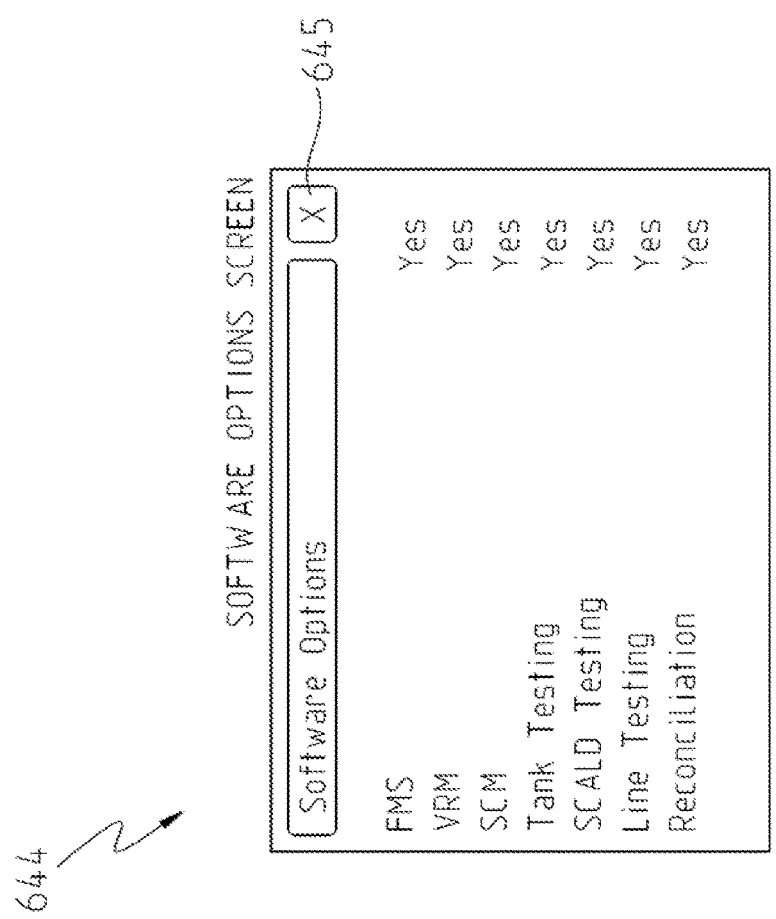

Finally, activation of software options button 606 of system screen 598 (FIG. 41) causes the display of a software options window 644 as depicted in FIG. 45. Software options window 644 includes a list of items of available software that have been installed on console 12, and a cancel button 645 which returns the user to system screen 598.

Figure 46:
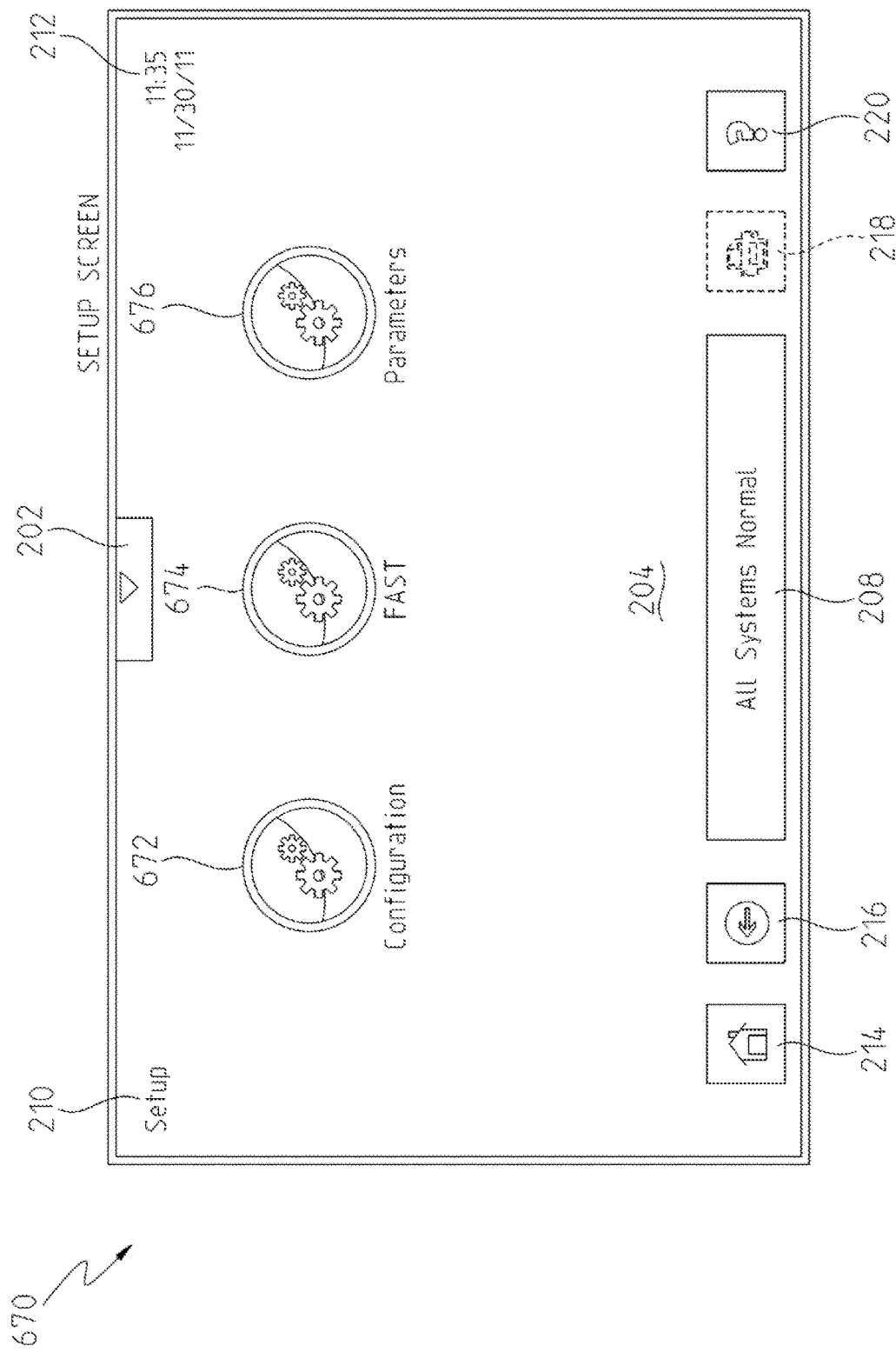
FIG. 46 is a screenshot of a setup screen accessible through the utilities function screen of FIG. 40.
Figure 47:
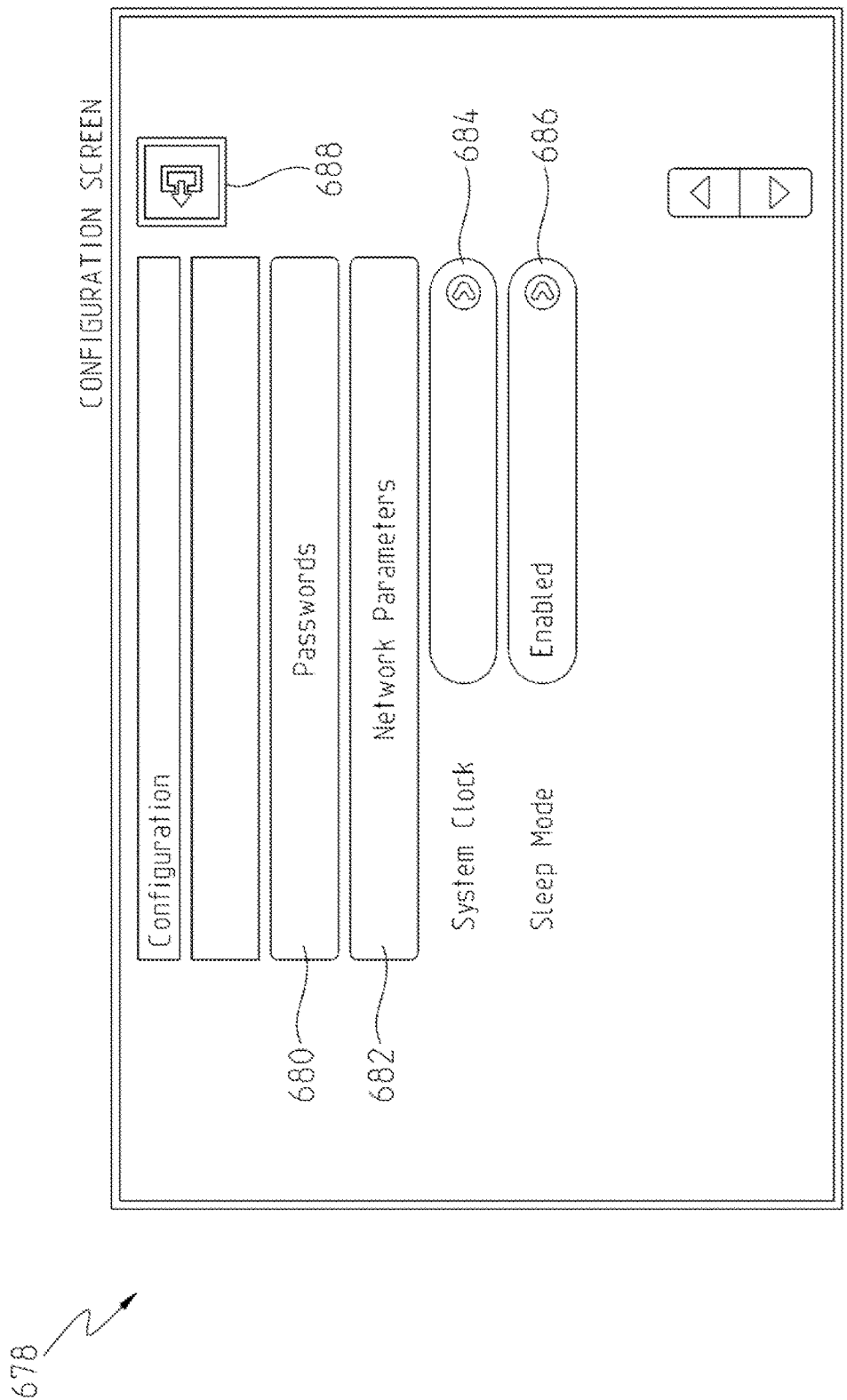
FIG. 47 is a screenshot of a configuration screen accessible through the setup screen of FIG. 46.

When the user activates setup icon 590 of utilities function screen 586 (FIG. 40), a setup screen 670 such as that depicted in FIG. 46 is displayed. As shown, setup screen 670 includes a configuration icon 672, a FAST icon 674, which activates an automatic setup tool that is normally only accessible by installers or programmers, and a parameters icon 676. Activation of configuration icon 672 causes the display of a configuration screen 678 as depicted in FIG. 47. Configuration screen 678 includes a passwords button 680 which permits a system administrator to set and change passwords for all levels of users as mentioned above, a network parameters button 682 which permits the configuration of IP connection settings used with network 24, a system clock button 684, activation of which causes display of a numeric keypad such as that of FIG. 30 to permit the user to set the date, time and time zone used by console 12, a sleep mode button 686 which permits the user to enable or disable a sleep mode function of console 12 which disables display 28 after a specified period of inactivity (e.g., five minutes), and a exit icon 688 which returns the user to set up screen 670.

Activation of FAST icon 674 of FIG. 46 causes console 12 to verify that all devices are properly connected to console 12. Console 12 identifies all software modules, compares them to the factory programmed module listing, and verifies that they are operational. Console 12 also identifies devices connected to various channels of the modules to determine that the correct device is connected to the correct channel. Console 12 then displays information to the user identifying the quantity of device, the type of device, and the model of device. The user is also presented with an apply option which permits the user to apply the data to the configuration of the system 10, thereby setting up the system very rapidly.

Figure 48:
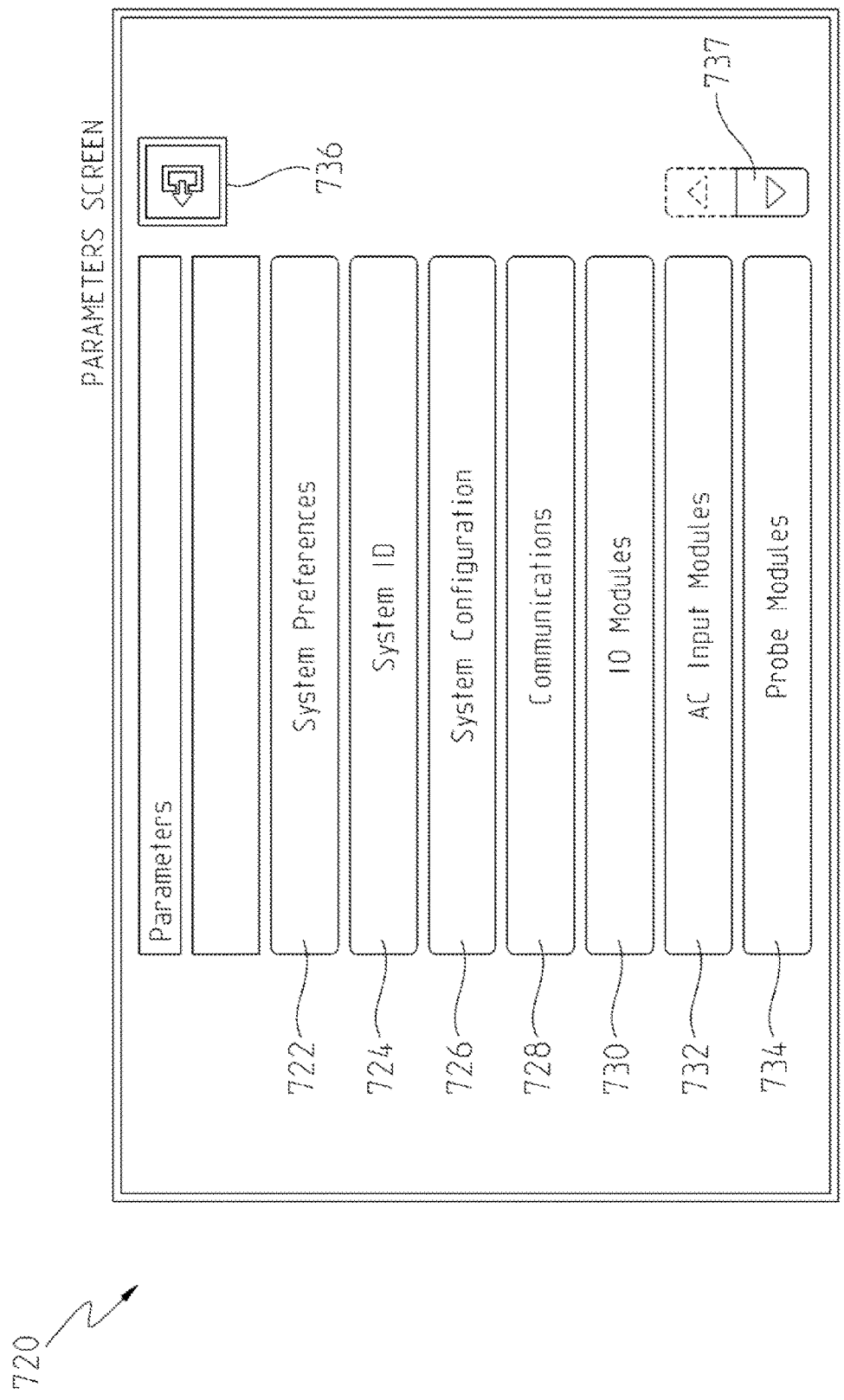
FIG. 48 is a screenshot of a parameters screen accessible through the setup screen of FIG. 46.

Activation of parameters button 676 of setup screen 670 causes the display of a parameters screen 720 as depicted in FIG. 48. Parameters screen 720 includes a system preferences button 722, a system ID button 724, a system configuration button 726, a communications button 728, and an I/O modules button 730, an AC input modules button 732, a probe modules button 734, an exit/save button 736 which returns the user to set up screen 670, and scroll arrows 737.

Figure 49:
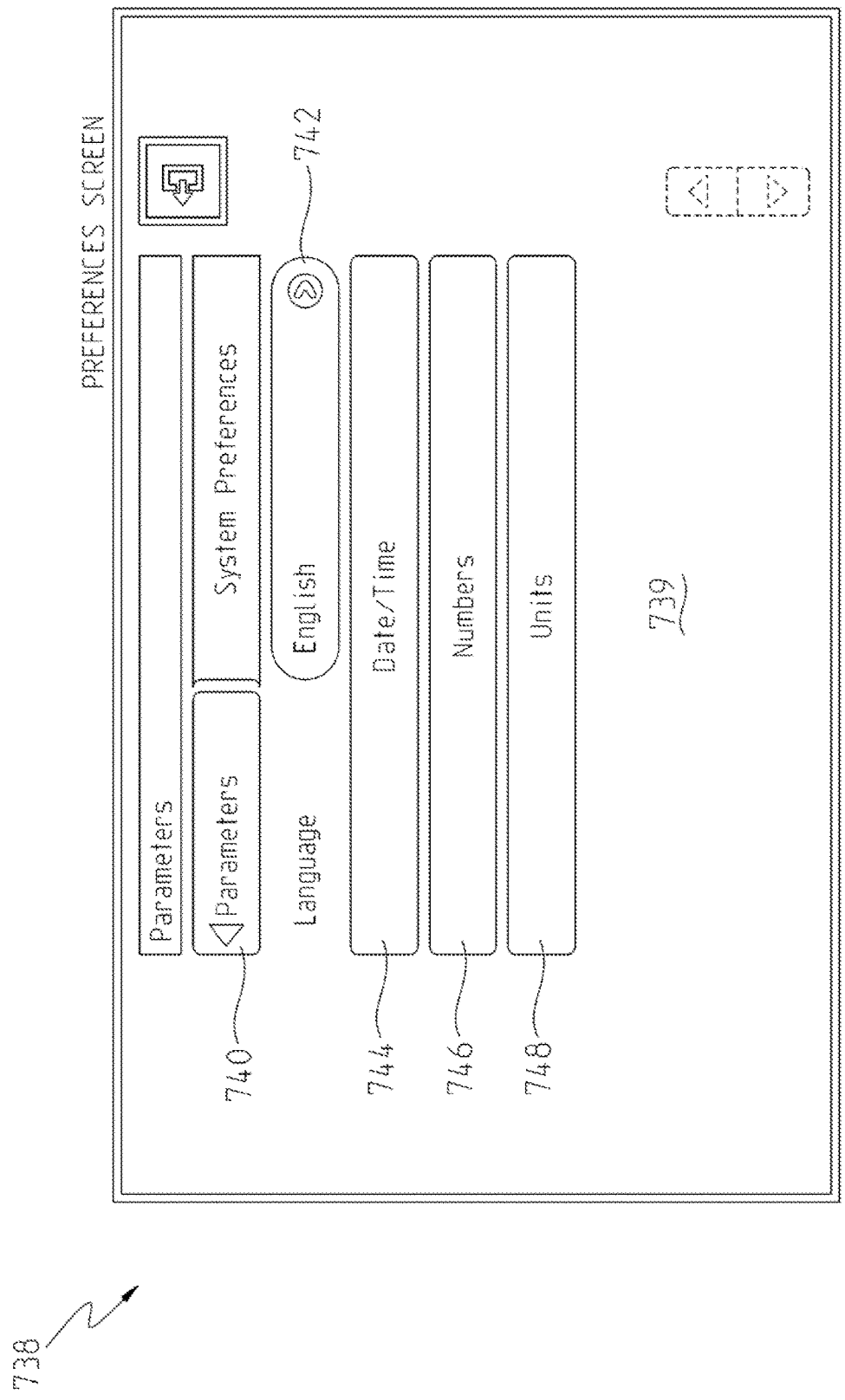
FIGS. 49-53 are screenshots of preferences screens accessible through the parameters screen of FIG. 48.
Figure 50:
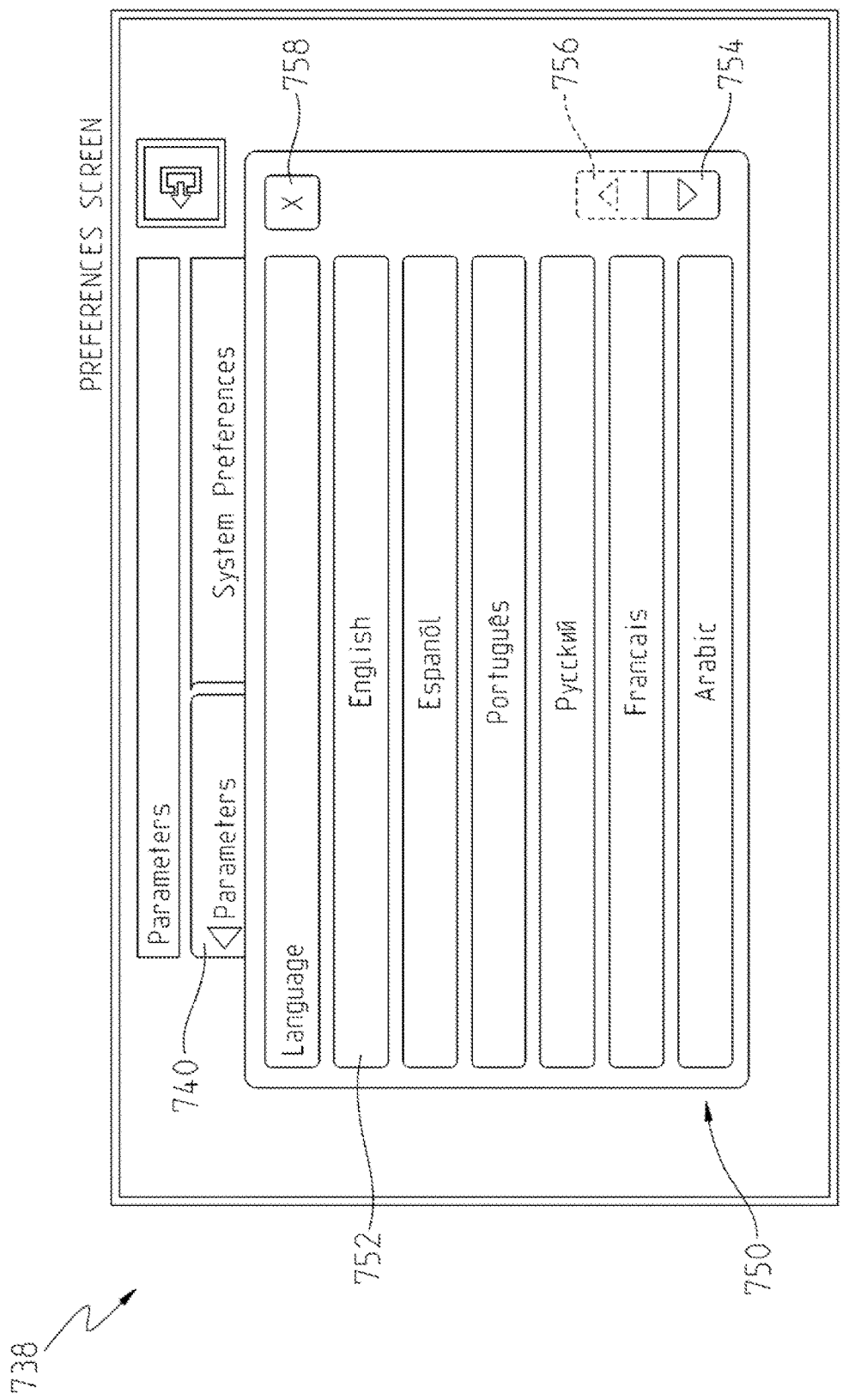

Activation of system preferences button 722 causes display of preferences screen 738 as depicted in FIG. 49. Preferences screen 738 includes a content area 739 having a parameters button 740 which returns the user to parameters screen 720, a language button 742, a date/time button 744, a numbers button 746 and a units button 748. Activation of language button 742 causes display of a language window 750 as depicted in FIG. 50. Language window 750 includes a plurality of language icons 752 which permit the user to select a language used by console 12, scroll arrows 754, 756 which allow the user to view additional language icons 752, and cancel button 758 which returns the user to preferences screen 738.

Figure 51:
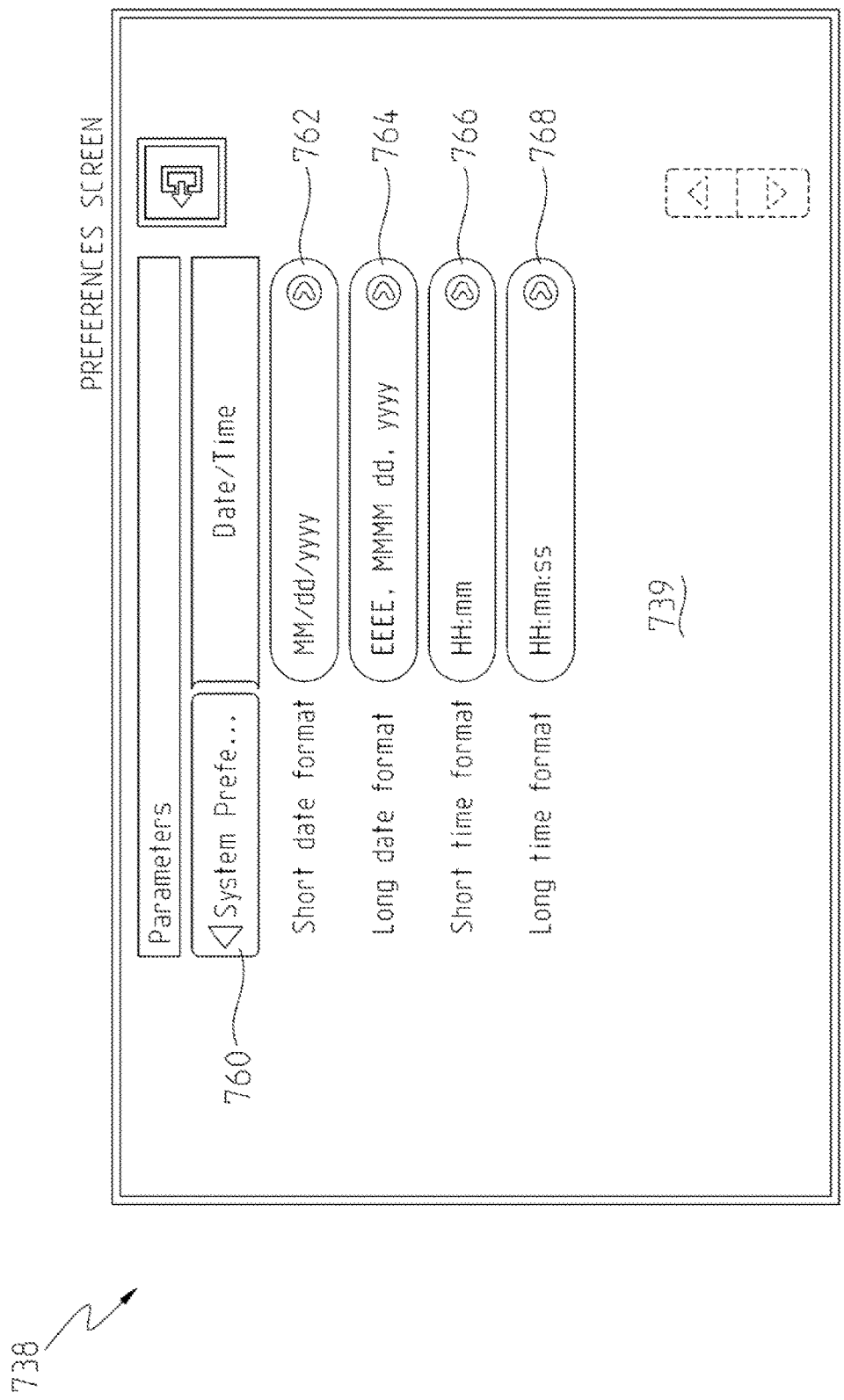

Activation of date/time button 744 of preferences screen 738 causes a change in content area 739 as depicted in FIG. 51. More specifically, content area 739 includes a systems preferences button 760 which returns the user to the preferences screen 738 as depicted in FIG. 49, a short date format button 762, a long date format button 764, a short time format button 766, and a long time format button 768. Activation of any of buttons 762, 764, 766, 768 provides the user with options for the date or time format selected.

Figure 52:
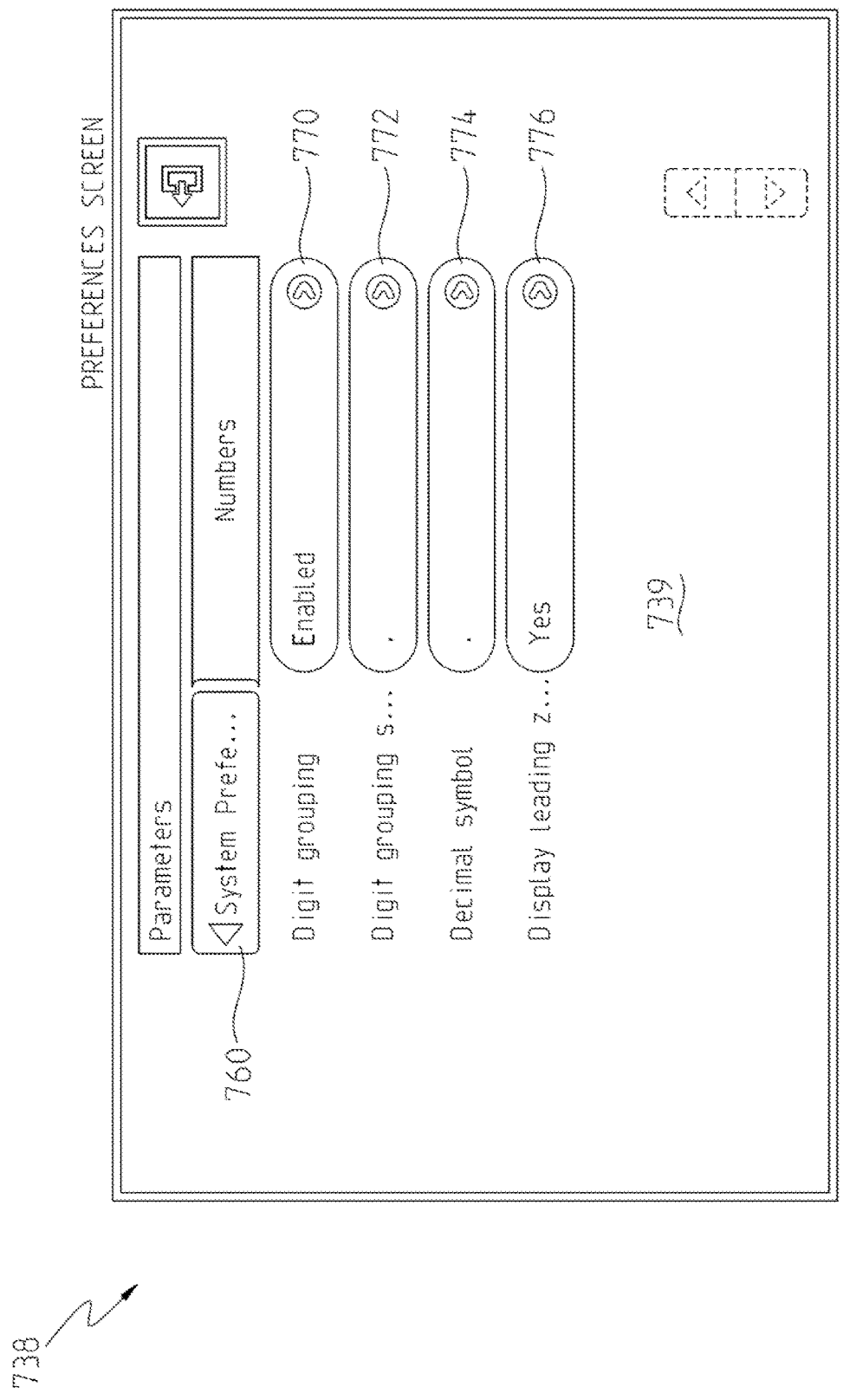

Activation of numbers button 746 of preferences screen 738 causes a change in content area 739 as depicted in FIG. 52. More specifically, content area 739 includes system preferences button 760 which returns the user to the preferences screen 738 as depicted in FIG. 49, a digit grouping button 770, a grouping symbol button 772, a decimal symbol button 774, and a leading zeros button 776. Activation of any of buttons 770, 772, 774, 776 provides the user with options for how numbers are displayed by console 12.

Figure 53:
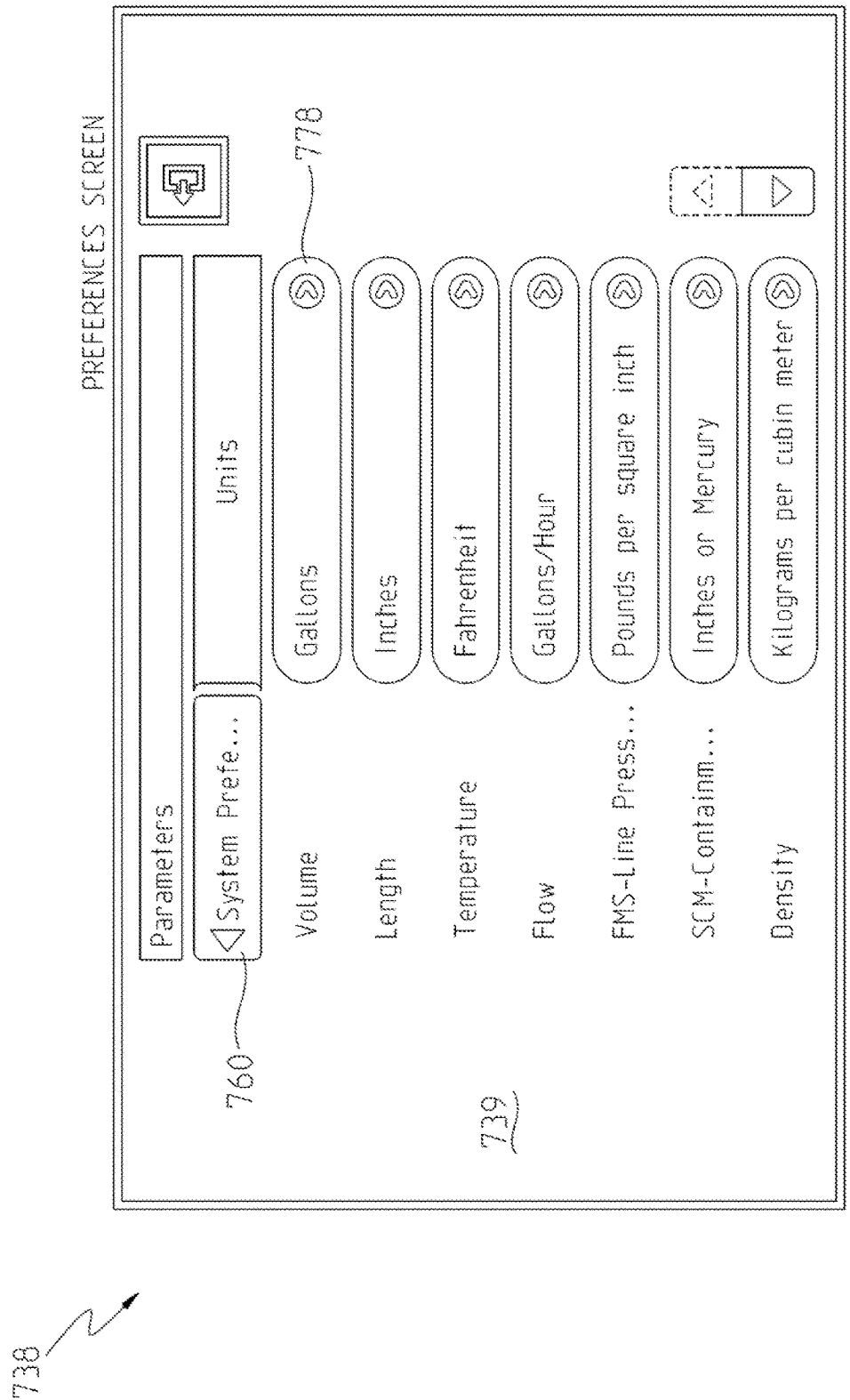

Activation of units button 748 of preferences screen 738 causes a change in content area 739 as depicted in FIG. 53. More specifically, content area 739 includes system preferences button 760 which returns the user to the preferences screen 738 as depicted in FIG. 49, and a plurality of units buttons 778, activation of which permit the user to select among various options for how units of volume, length, temperature, flow, pressure, containment, density, etc. are displayed by console 12.

Figure 54:
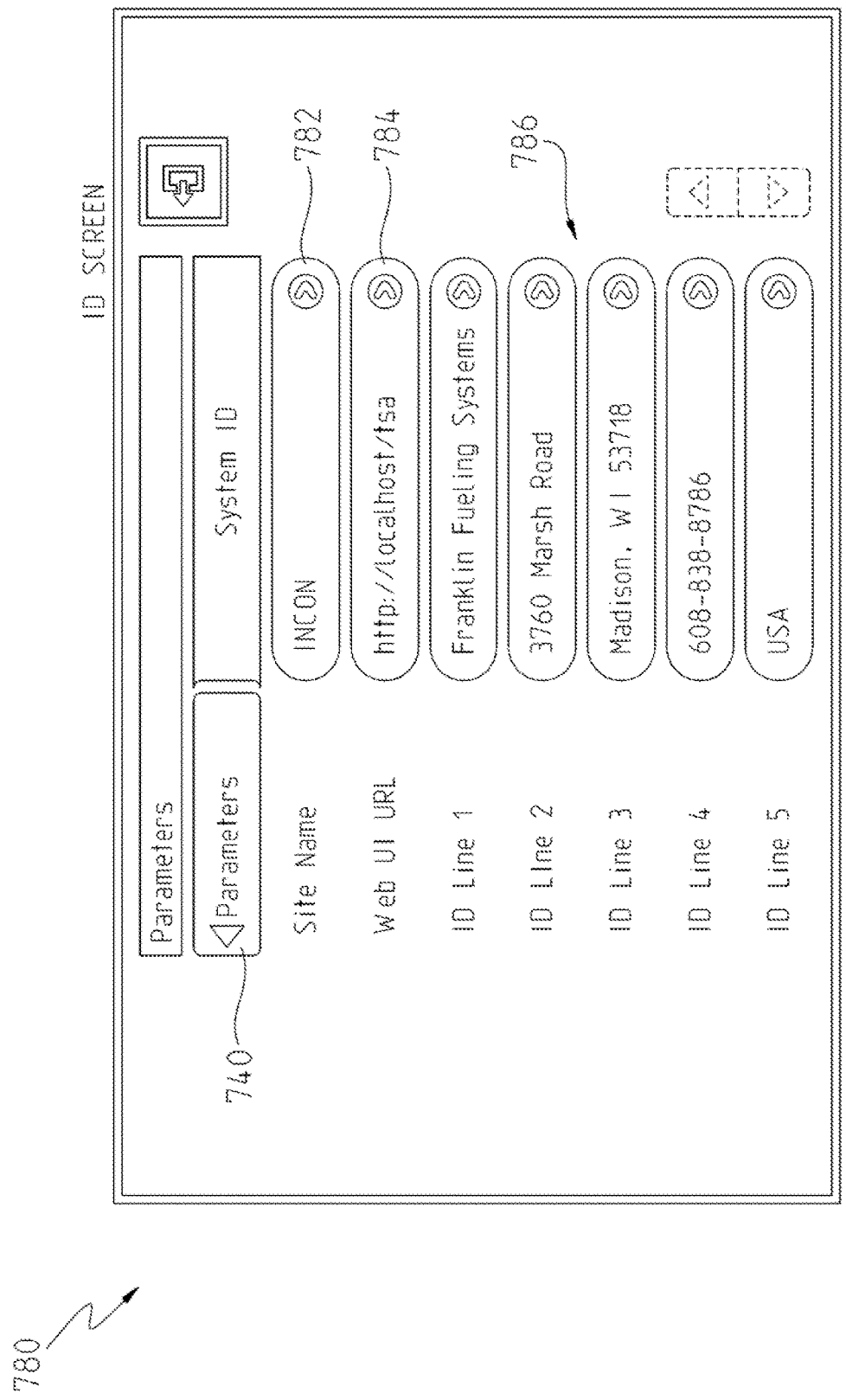
FIG. 54 is a screenshot of an ID screen accessible through the parameters screen of FIG. 48.

Activation of system ID button 724 (FIG. 48) causes display of ID screen 780 as depicted in FIG. 54. ID screen 780 includes parameters button 740 which returns the user to parameters screen 720, a site name button 782, a URL button 784, and a plurality of address buttons 786. Activation of site name button 782 causes display of a keyboard such as that depicted in FIG. 29 to permit the user to provide a name for the site location. Activation of URL button 784 similarly causes display of a keyboard to permit the user to provide a web address for accessing console 12. Finally, activation of the various address buttons 786 also cause display of a keyboard to permit the user to enter the name, street address, telephone number, and country location of the site.

Figure 55:
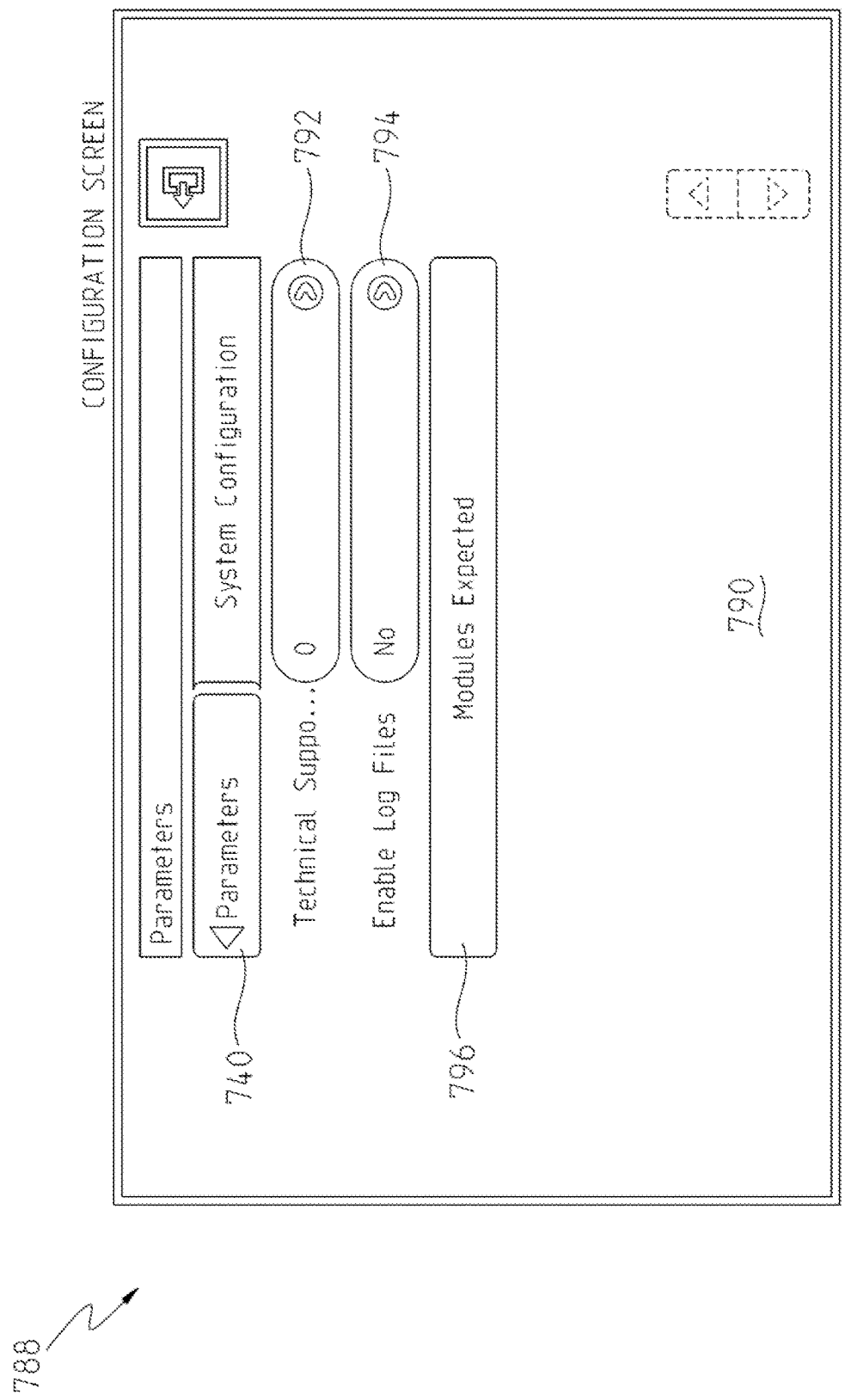
FIGS. 55 and 56 are screenshots of configuration screens accessible through the parameters screen of FIG. 48.

Activation of system configuration button 726 (FIG. 48) causes display of configuration screen 788 as depicted in FIG. 55. Configuration screen 788 includes a content area 790 having parameters button 740 which returns the user to parameters screen 720, a technical support key button 792, an enable log files button 794, and a plurality of modules expected button 796. Activation of technical support key button 792 permits the user to enter a key provided by technical support staff associated with console 12 to access advanced diagnostics and data logging functions of console 12. As such, activation of button 792 causes display of a keypad as described above. Activation of enable log files button 794 permits the user to select between enabling log files or disabling log files. Finally, activation of modules expected button 796 causes a change in content area 790 of configuration screen 788 as depicted in FIG. 56.

Figure 56:
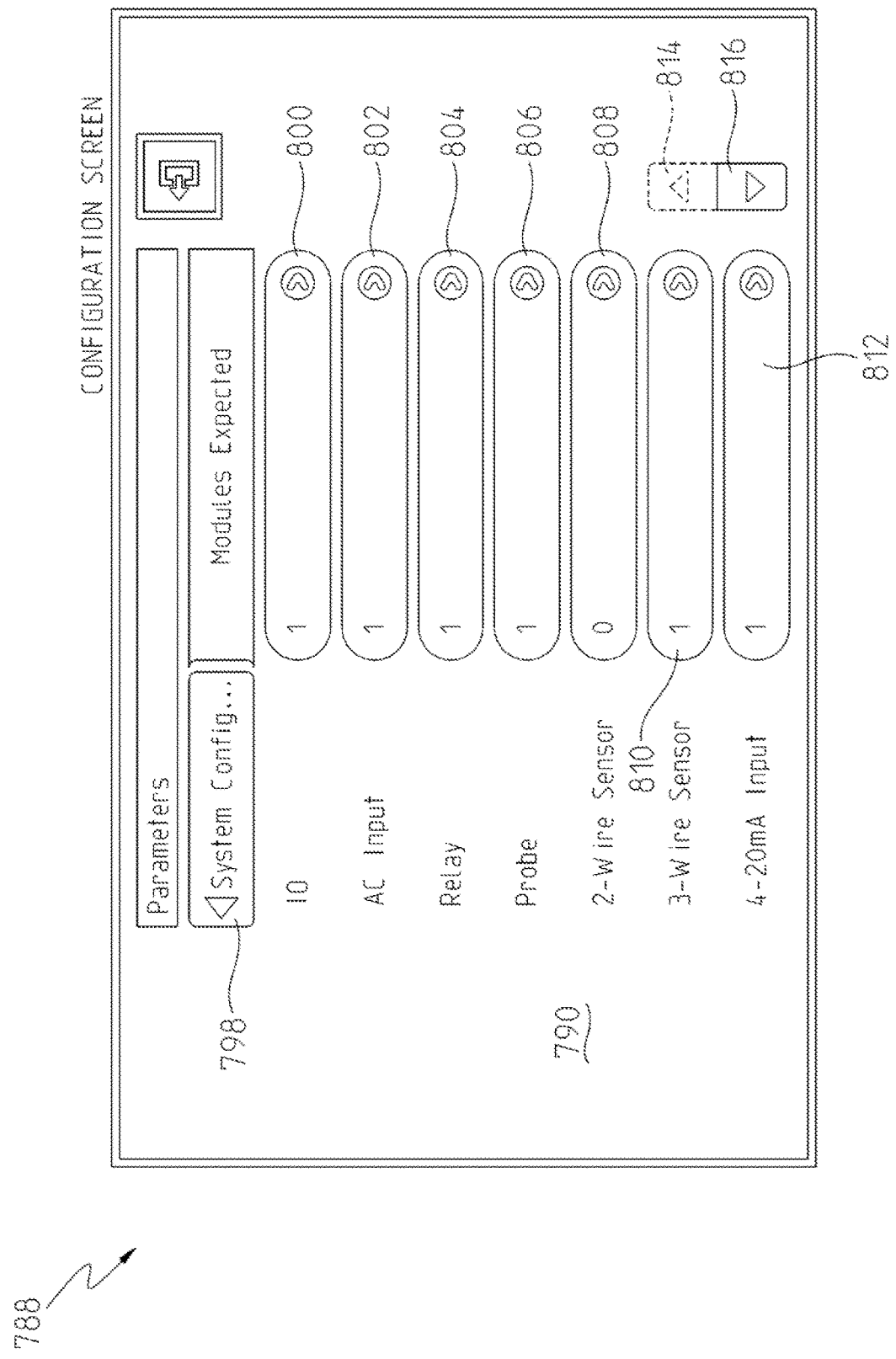

As shown in FIG. 56, content area 790 includes system configuration button 798 which returns the user to configuration screen of FIG. 55, an I/O button 800, an AC button 802, a relay button 804, a probe button 806, a 2-wire sensor button 808, a 3-wire sensor button 810, a 4-20 mA input button 812, and a plurality of other module related buttons (not shown) that can be viewed and accessed using scroll arrows 814, 816. In general, configuration screen permits the user to view the types modules installed in system 10 and the number of each type of module.

Figure 57:
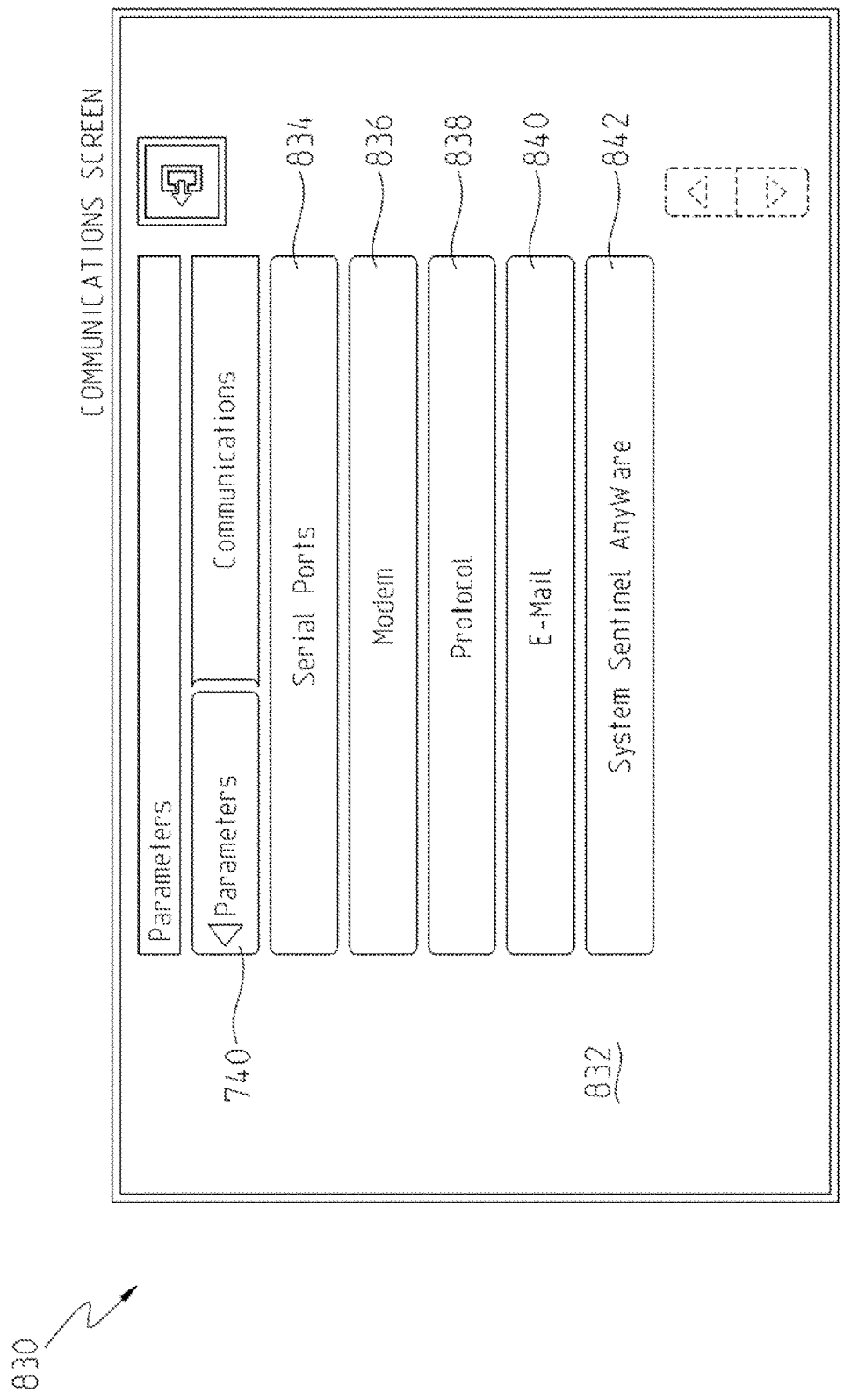
FIGS. 57-63 are screenshots of communications screens accessible through the parameters screen of FIG. 48.
Figure 58:
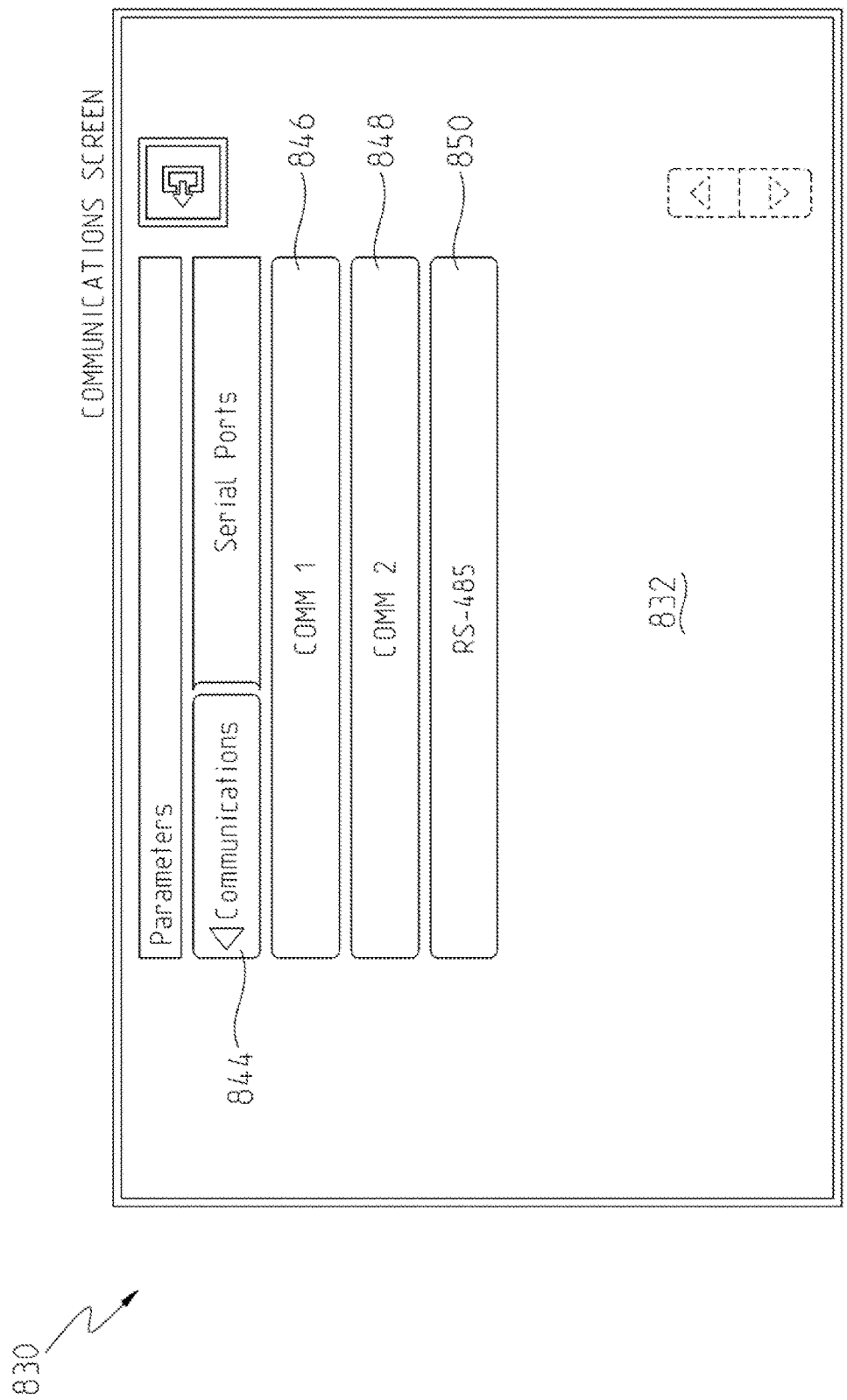

Activation of communications button 728 (FIG. 48) causes display of communications screen 830 as depicted in FIG. 57. Communications screen 830 includes a content area 832 having parameters button 740 which returns the user to parameters screen 720, a serial ports button 834, a modem button 836, a protocols button 838, an email button 840, and a remote access button 842. Activation of serial ports button 834 causes a change in content area 832 of communications screen 830 as depicted in FIG. 58. As shown, content area 832 includes a communications button 844 which returns the user to the communications screen of FIG. 57, a comm 1 button 846, a comm 2 button 848, and an RS-485 button 850.

Figure 59:
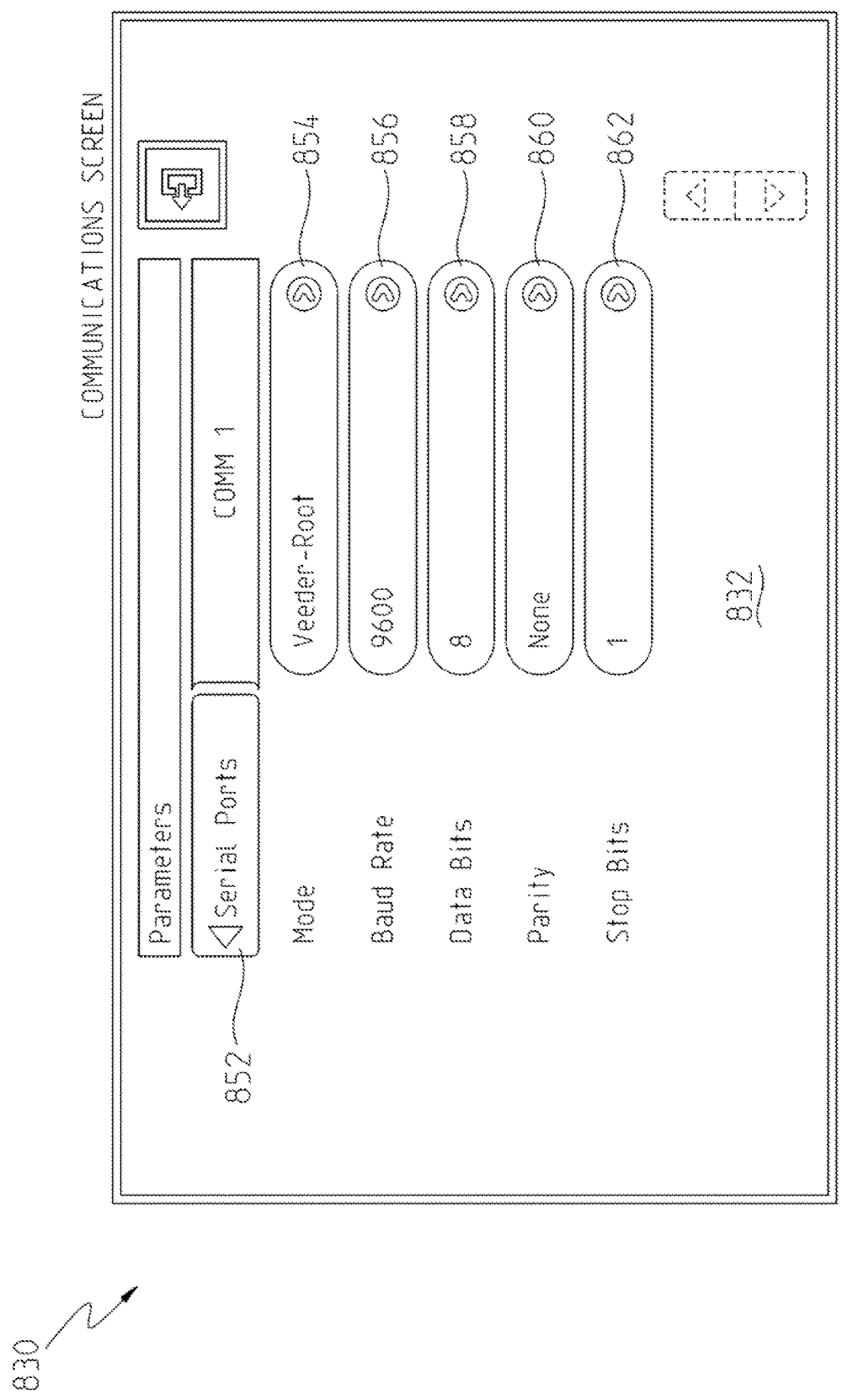

Activation of comm 1 button 846 causes a change in content area 832 as depicted in FIG. 59. As shown, content area 832 includes a serial ports button 852 which returns the user to communication screen 830 of FIG. 58, a mode button 854, a baud rate button 856, a data bits button 858, a parity button 860, and a stop bits button 862. The user may set all communications parameters for comm 1 port 44 (FIG. 3) of console 12 by activating an appropriate button shown in FIG. 59 and selecting a desired parameter. Similar options are presented to the user for comm 2 port 46 and RS-485/TPI port 58 upon activation of comm 2 button 848 or RS-485 button 850 of FIG. 58.

Figure 60:
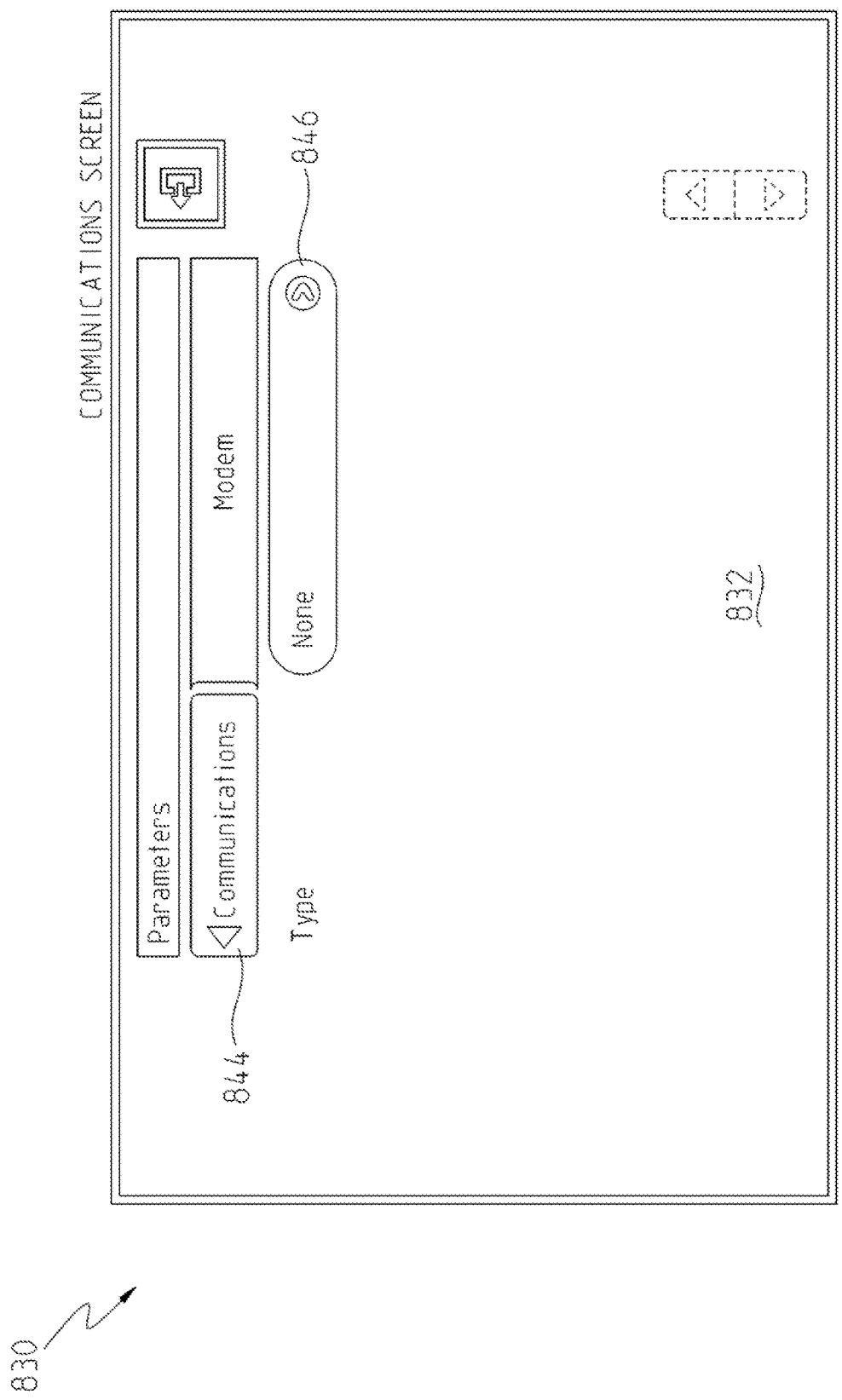

Activation of modem button 836 of FIG. 57 causes a change in content area 832 as depicted in FIG. 60. As shown, content area 832 includes communications button 844 which returns the user to communication screen 830 of FIG. 57, and a modem type button 864. If a modem is installed in system 10 for use with network 24, the user may activate modem type button 866 and identify the type of modem installed.

Figure 61:
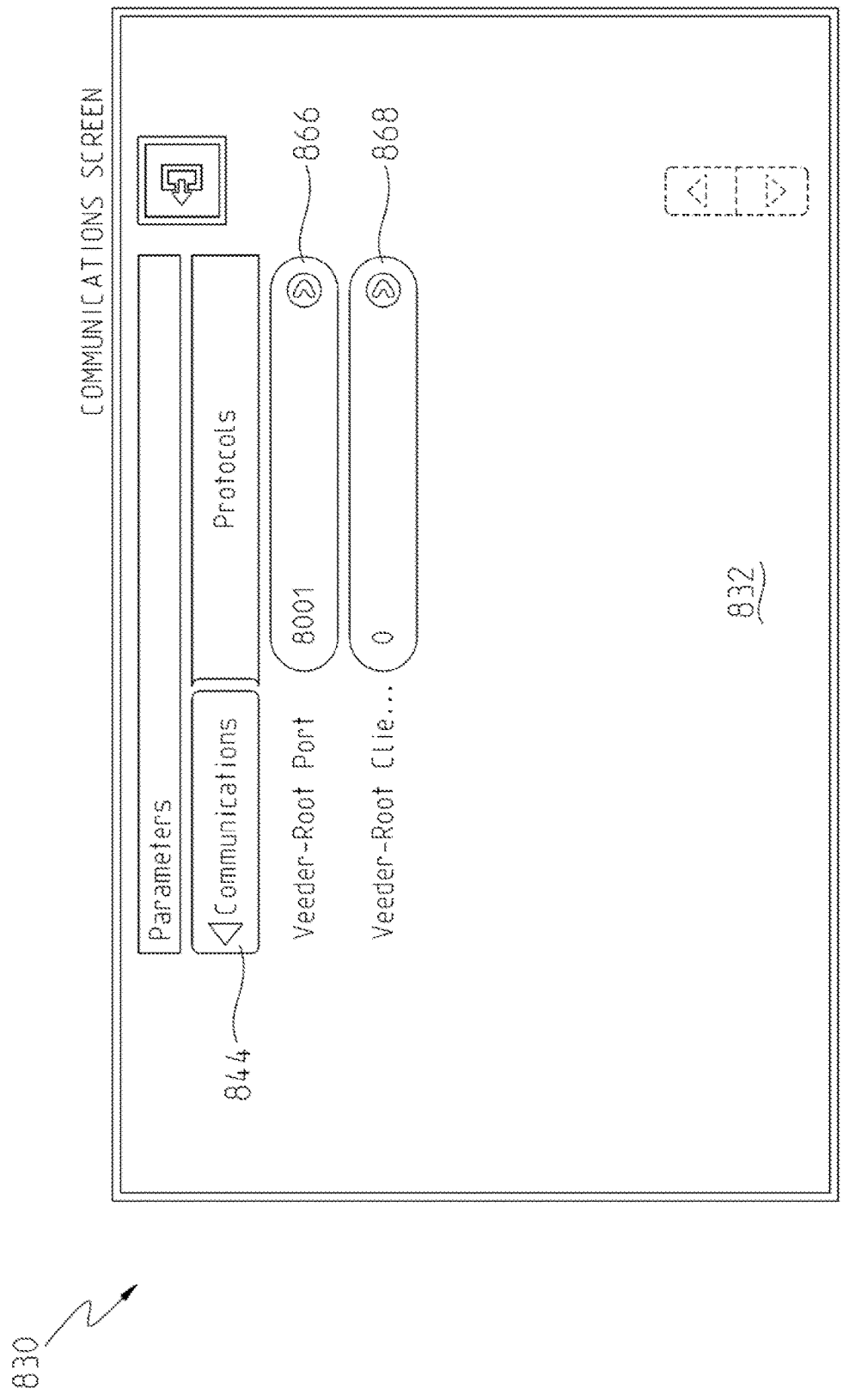

Activation of protocols button 838 of FIG. 57 causes a change in content area 832 as depicted in FIG. 61. As shown, content area 832 includes communications button 844 which returns the user to communication screen 830 of FIG. 57, a veeder-root port button 866, and a veeder-root client timeout button 868.

Figure 62:
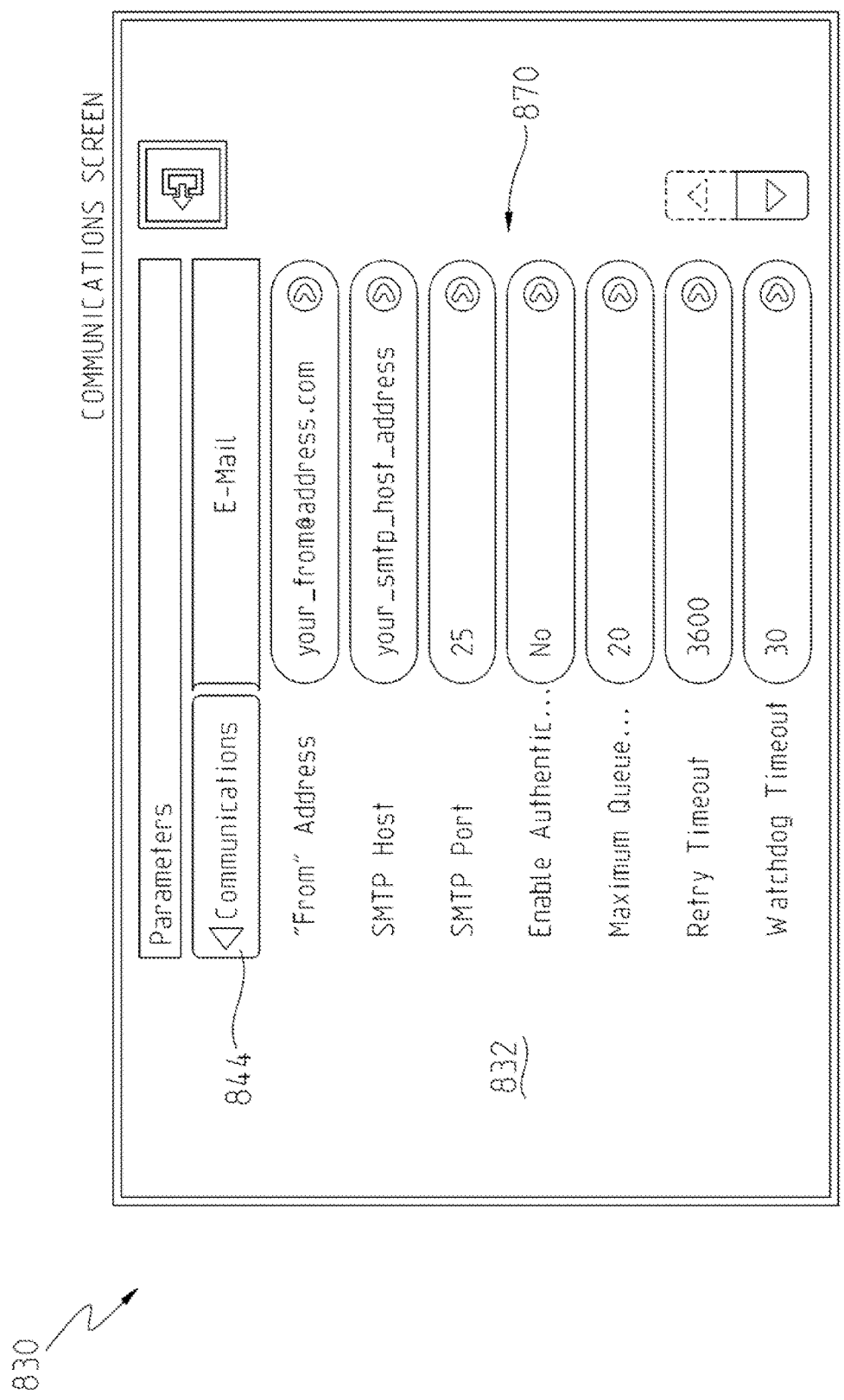

Activation of email button 840 of FIG. 57 causes a change in content area 832 as depicted in FIG. 62. As shown, content area 832 includes communications button 844 which returns the user to communication screen 830 of FIG. 57, and a plurality of email settings buttons 870, activation of which provide the user with options, a keyboard, and/or a keypad to select or enter a variety of different email related parameters.

Figure 63:
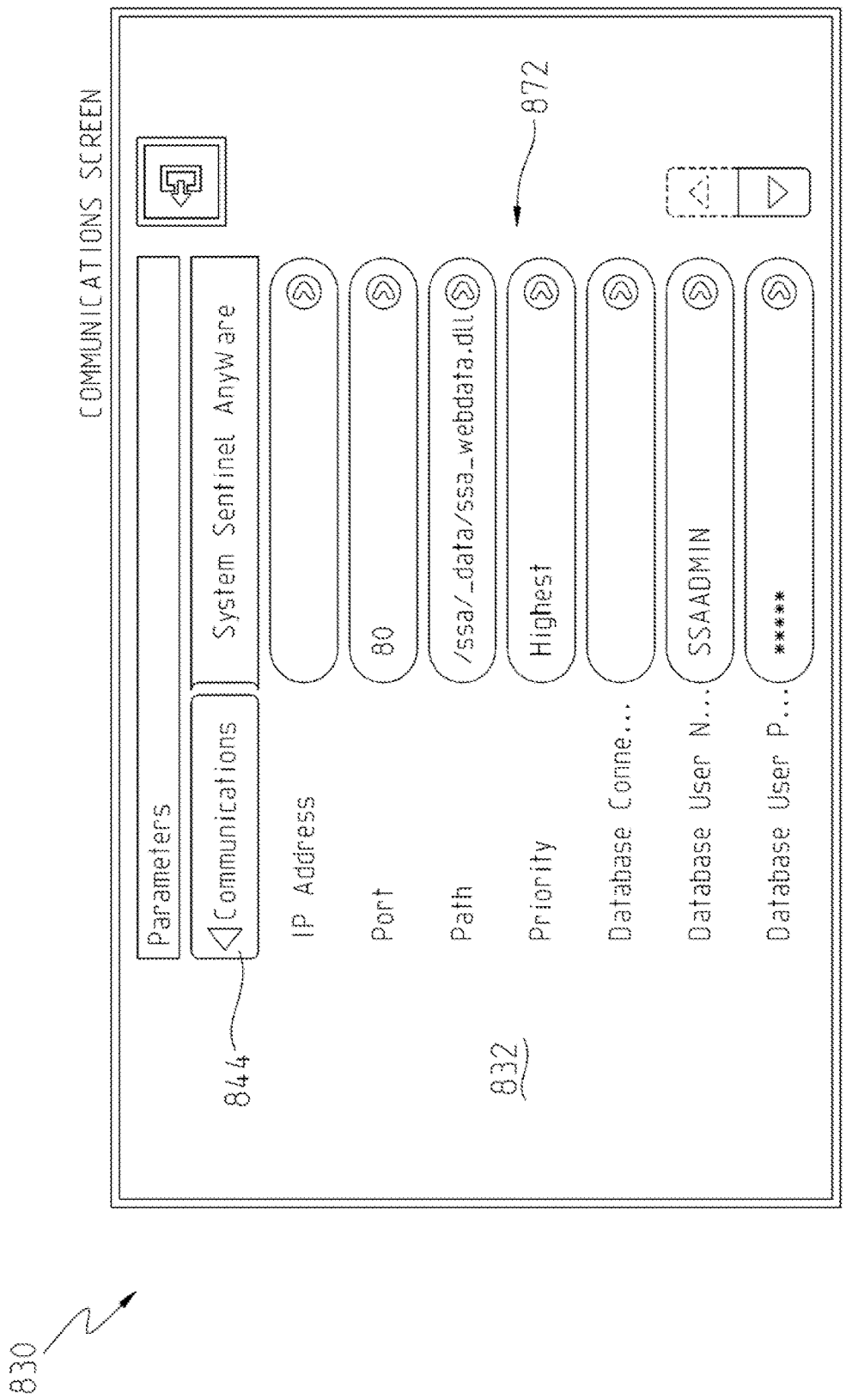

Activation of sentinel button 842 of FIG. 57 causes a change in content area 832 as depicted in FIG. 63. As shown, content area 832 includes communications button 844 which returns the user to communication screen 830 of FIG. 57, and a plurality of remote access settings buttons 872, activation of which provide the user with options, a keyboard, and/or a keypad to select or enter a variety of different remote access related parameters. In general, remote access settings buttons 872 permit the user to specify and configure the remote location of the remote monitoring software used to monitor the site.

Figure 64:
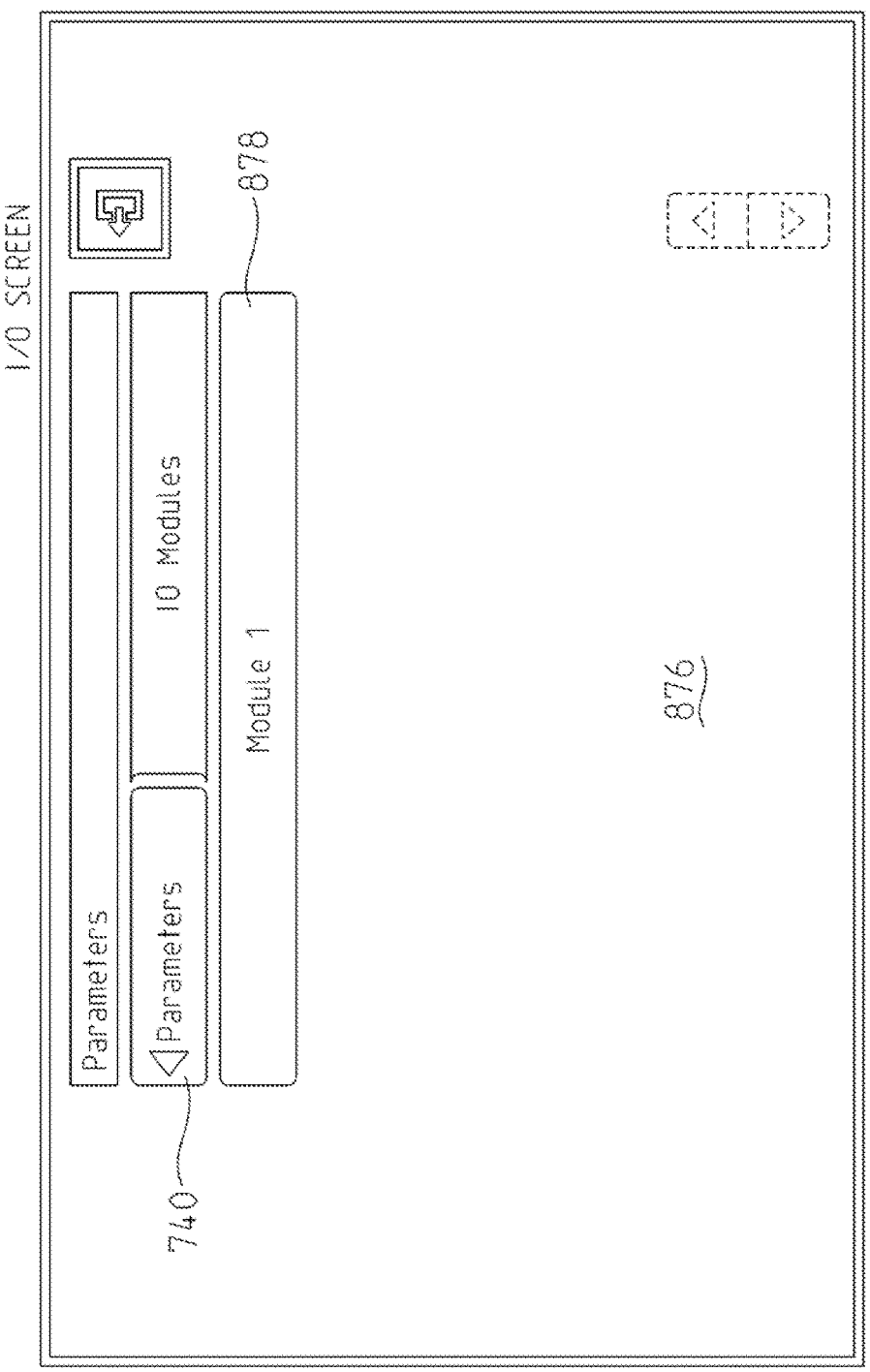
FIGS. 64 and 65 are screenshots of I/O screens accessible through the parameters screen of FIG. 48.
Figure 65:
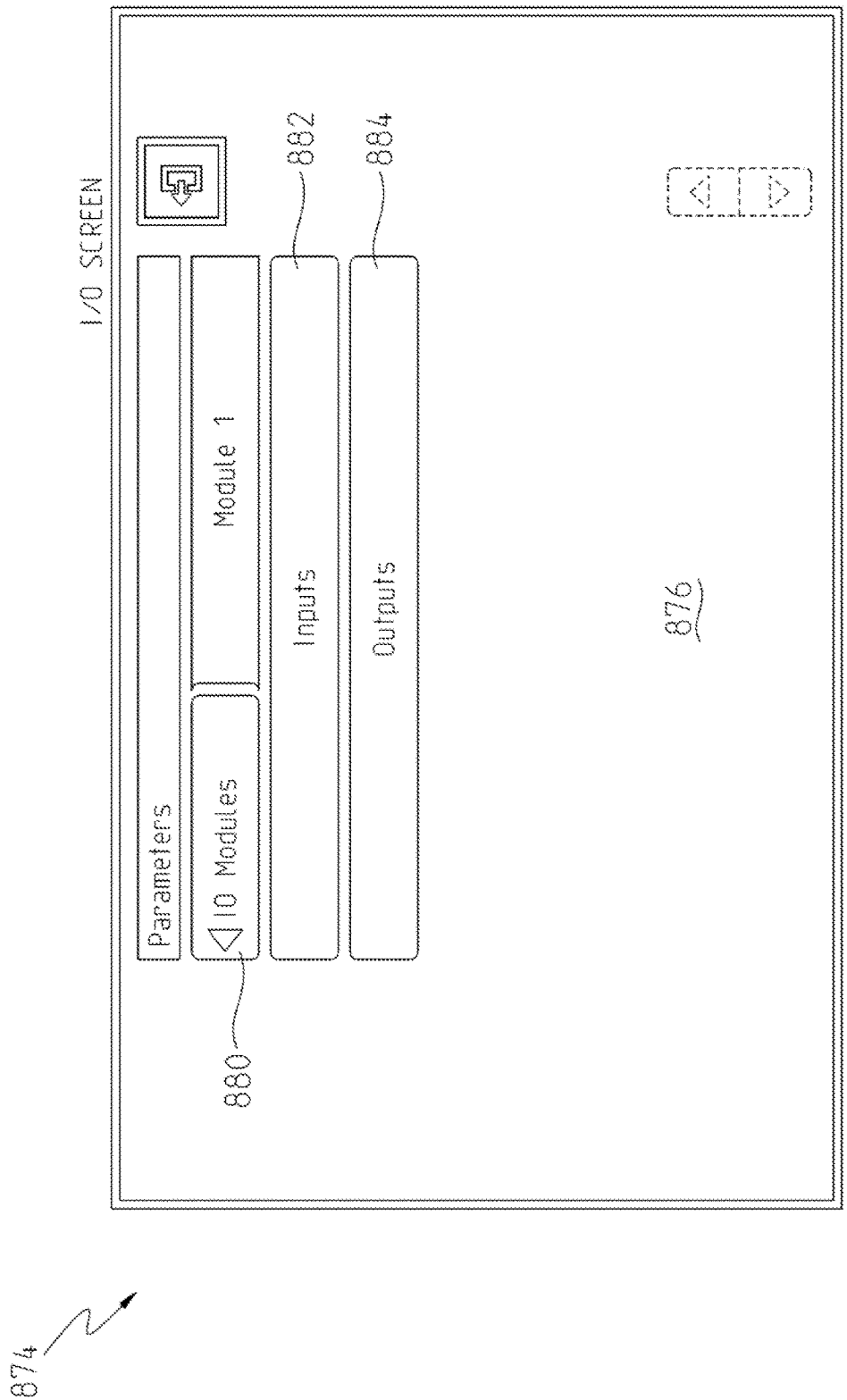

Activation of I/O modules button 730 (FIG. 48) causes display of I/O screen 874 as depicted in FIG. 64. I/O screen 874 includes a content area 876 having parameters button 740 which returns the user to parameters screen 720, and at least one module button 878. Activation of module button 878 causes a change in content area 876 of I/O screen 874 as depicted in FIG. 65. As shown, content area 876 includes an I/O modules button 880 which returns the user to the I/O screen 874 of FIG. 64, an inputs button 882, and an outputs button 884. Activation of inputs button 882 or outputs button 884 allows the user to configure the inputs and outputs corresponding to a particular I/O module.

Figure 66:
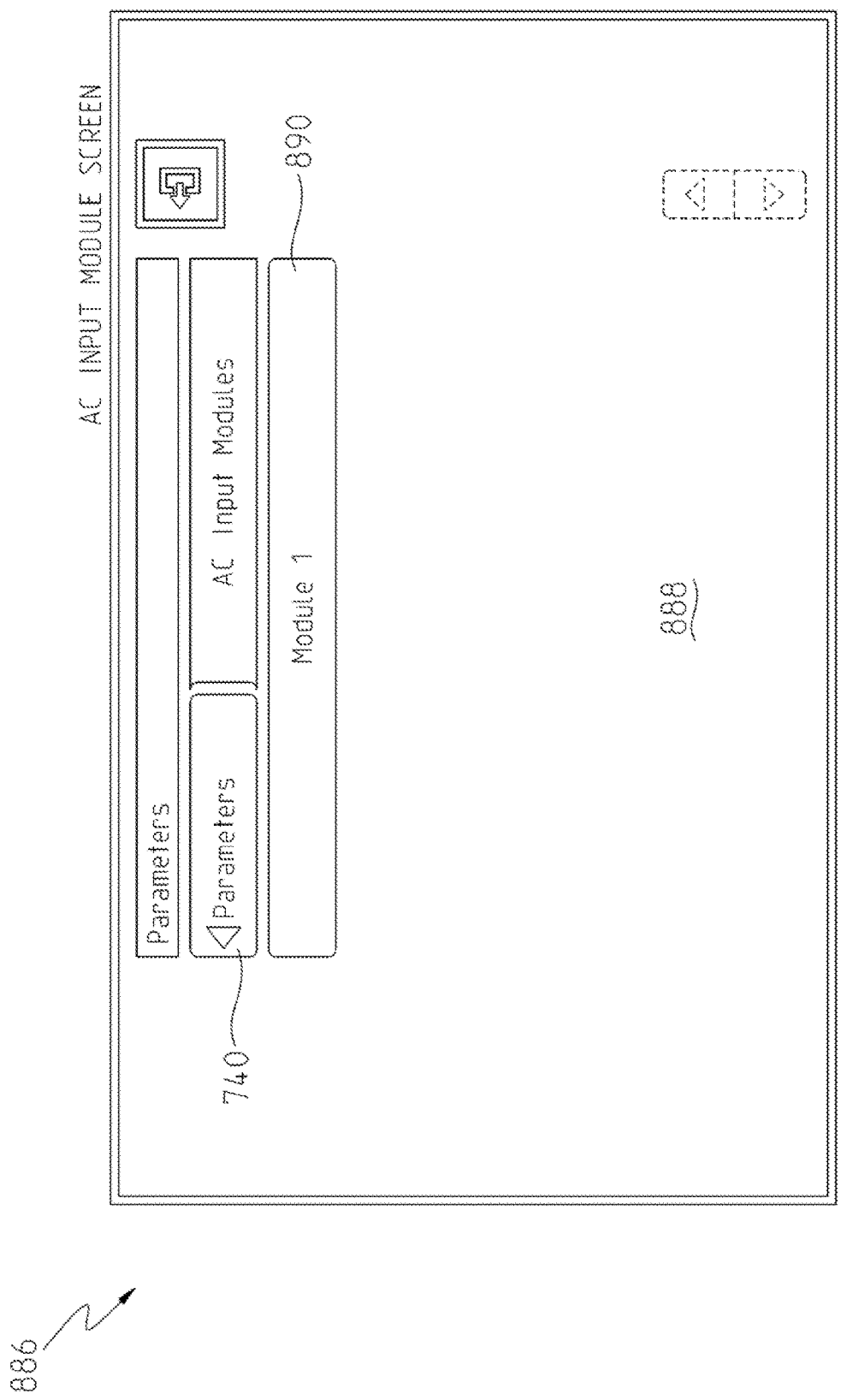
FIGS. 66-68 are screenshots of AC input module screens accessible through the parameters screen of FIG. 48.
Figure 67:
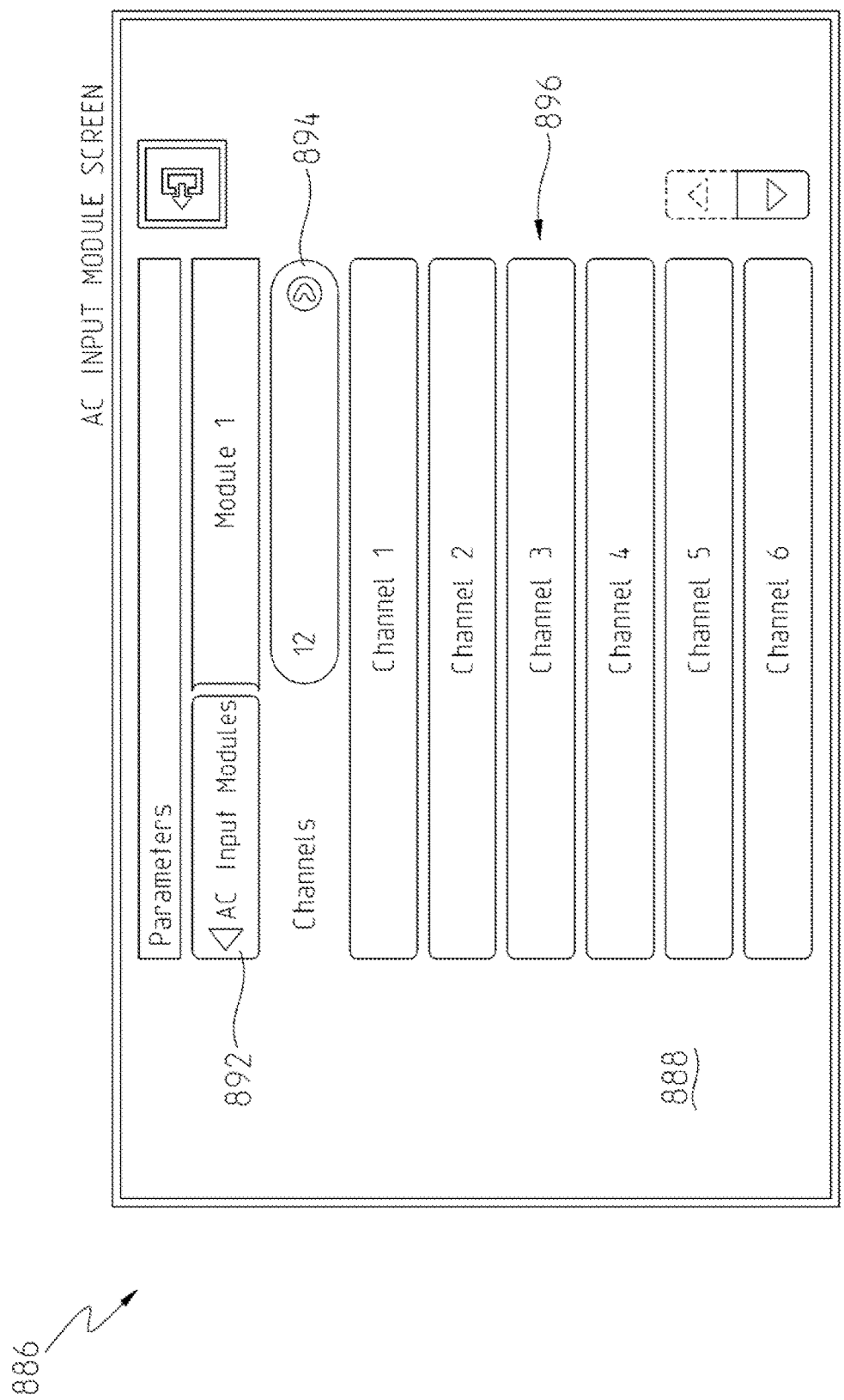
Figure 68:
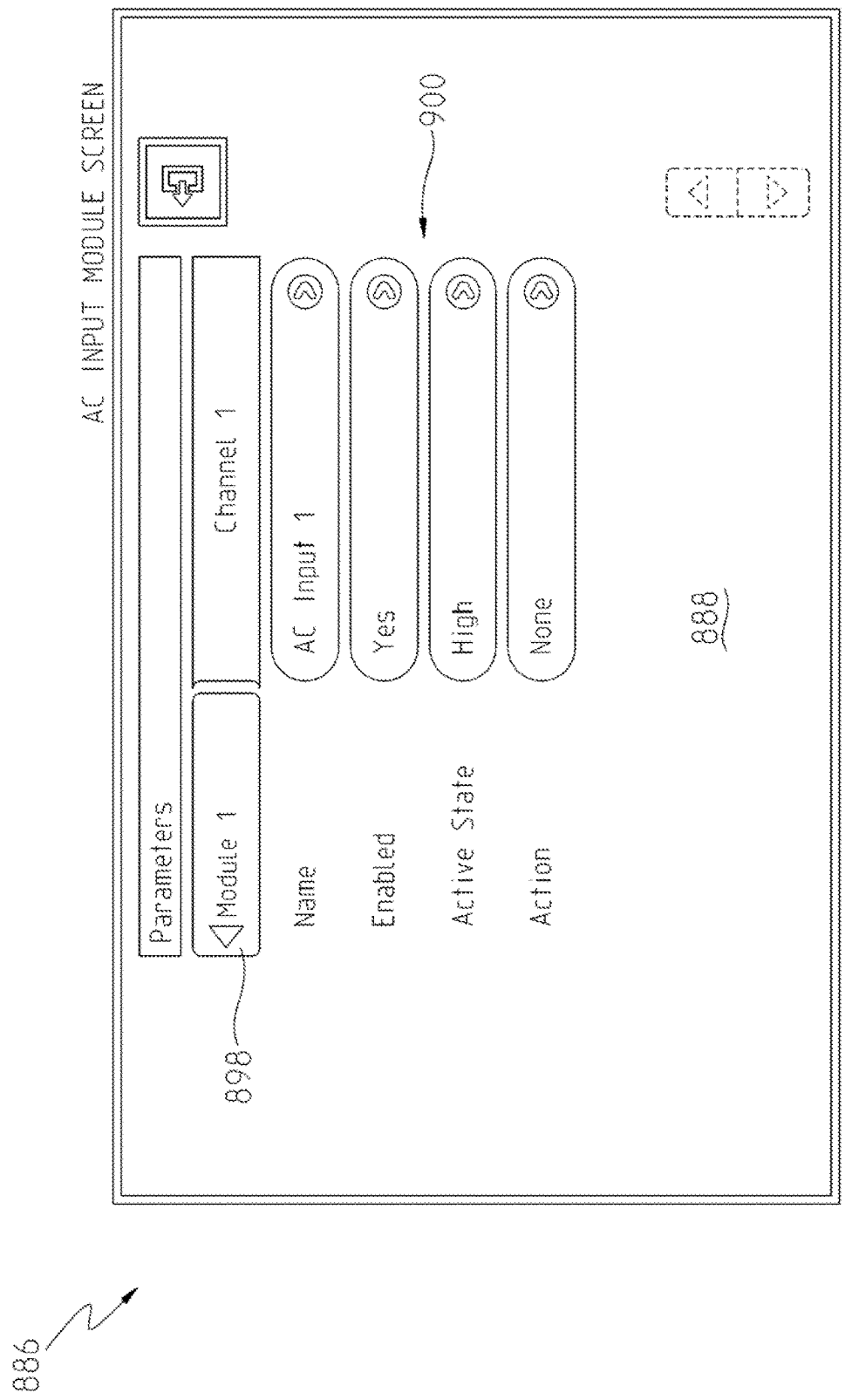

Activation of AC input modules button 732 (FIG. 48) causes display of AC input modules screen 886 as depicted in FIG. 66. AC input modules screen 886 includes a content area 888 having parameters button 740 which returns the user to parameters screen 720, and at least one module button 890. Activation of module button 890 causes a change in content area 888 of AC input modules screen 886 as depicted in FIG. 67. As shown, content area 888 includes an AC input modules button 892 which returns the user to the AC input modules screen 886 of FIG. 65, a channels button 894, and a plurality of individual channel buttons 896. Activation of channels button 894 allows the user to specify the number of available channels of a particular AC input module that will be used and programmed. Activation of any of individual channel buttons 896 causes a change in content area 888 as depicted in FIG. 68 (for the example activation of individual channel 1 button 896). As shown, content area 888 includes a module 1 button 898 and a plurality of channel setting buttons 900, activation of which permit the user to select from setting options or enter setting information.

Activation of probe modules button 734 (FIG. 48) or any of a variety of additional parameter buttons (such as those depicted in FIG. 69A) accessible using scroll arrows 737 similarly causes display of parameter setting screens as described above.

Figure 69A:
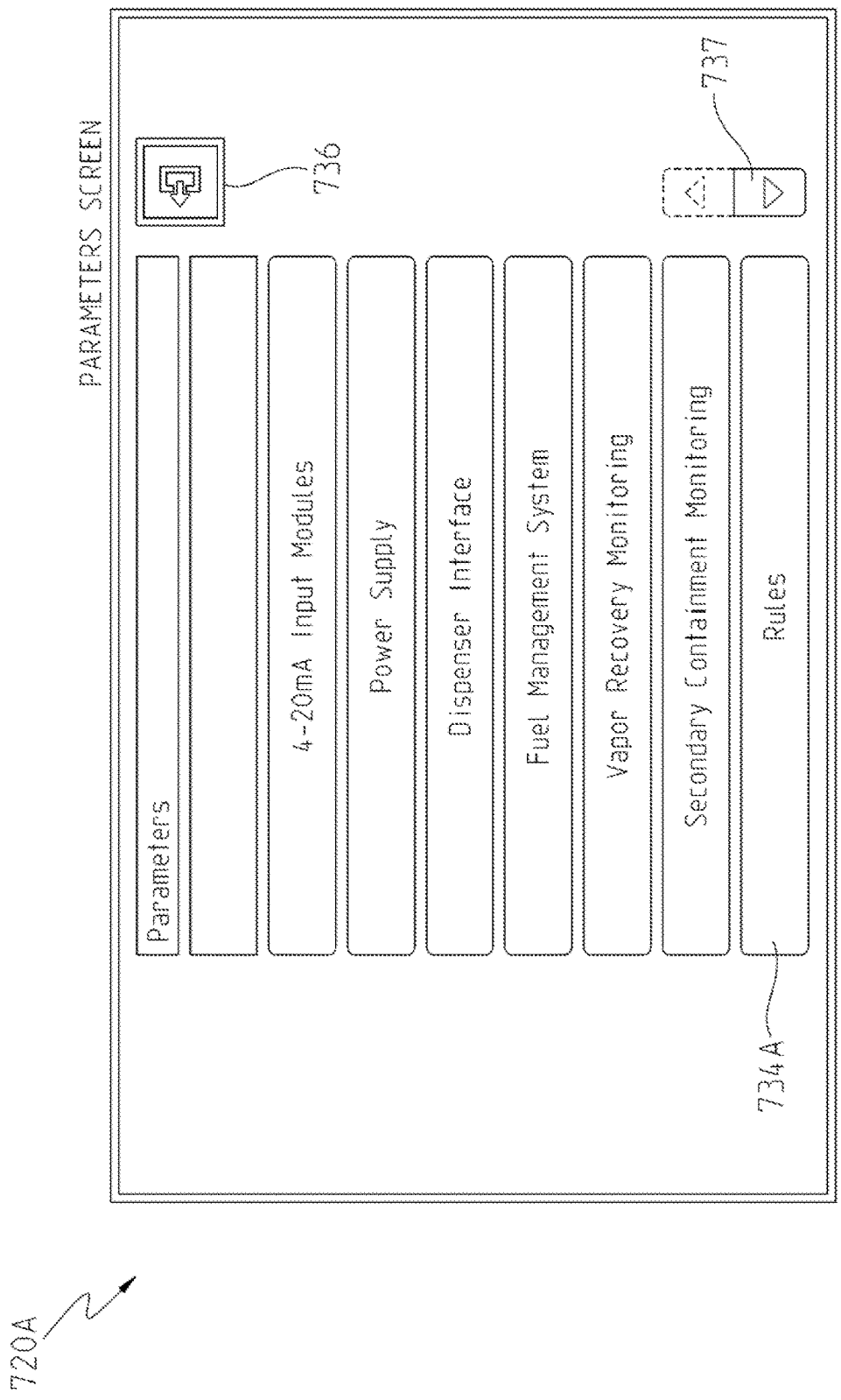
FIGS. 69A-K are screenshots of screens used in programming rules and one-touch buttons.
Figure 69B:
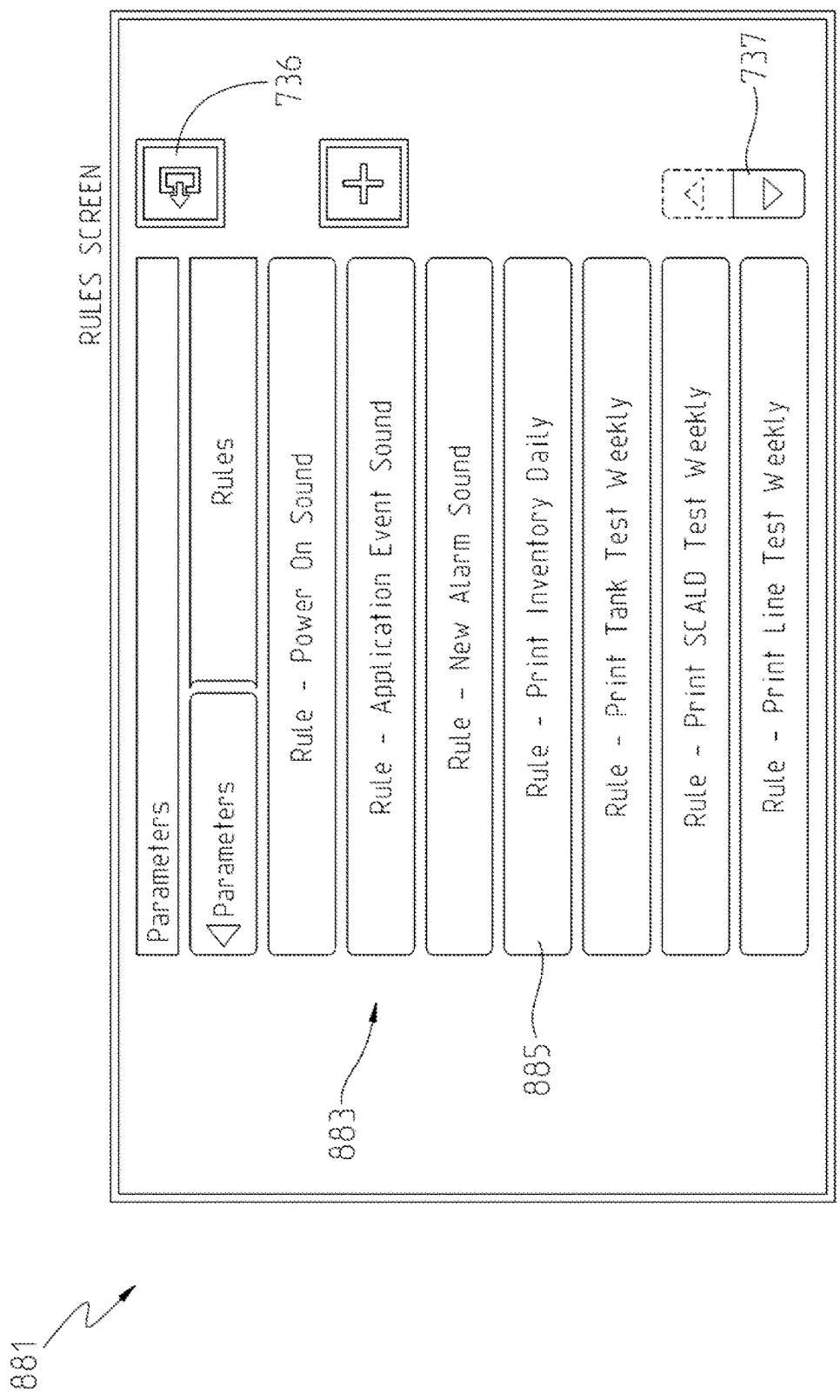
Figure 69C:
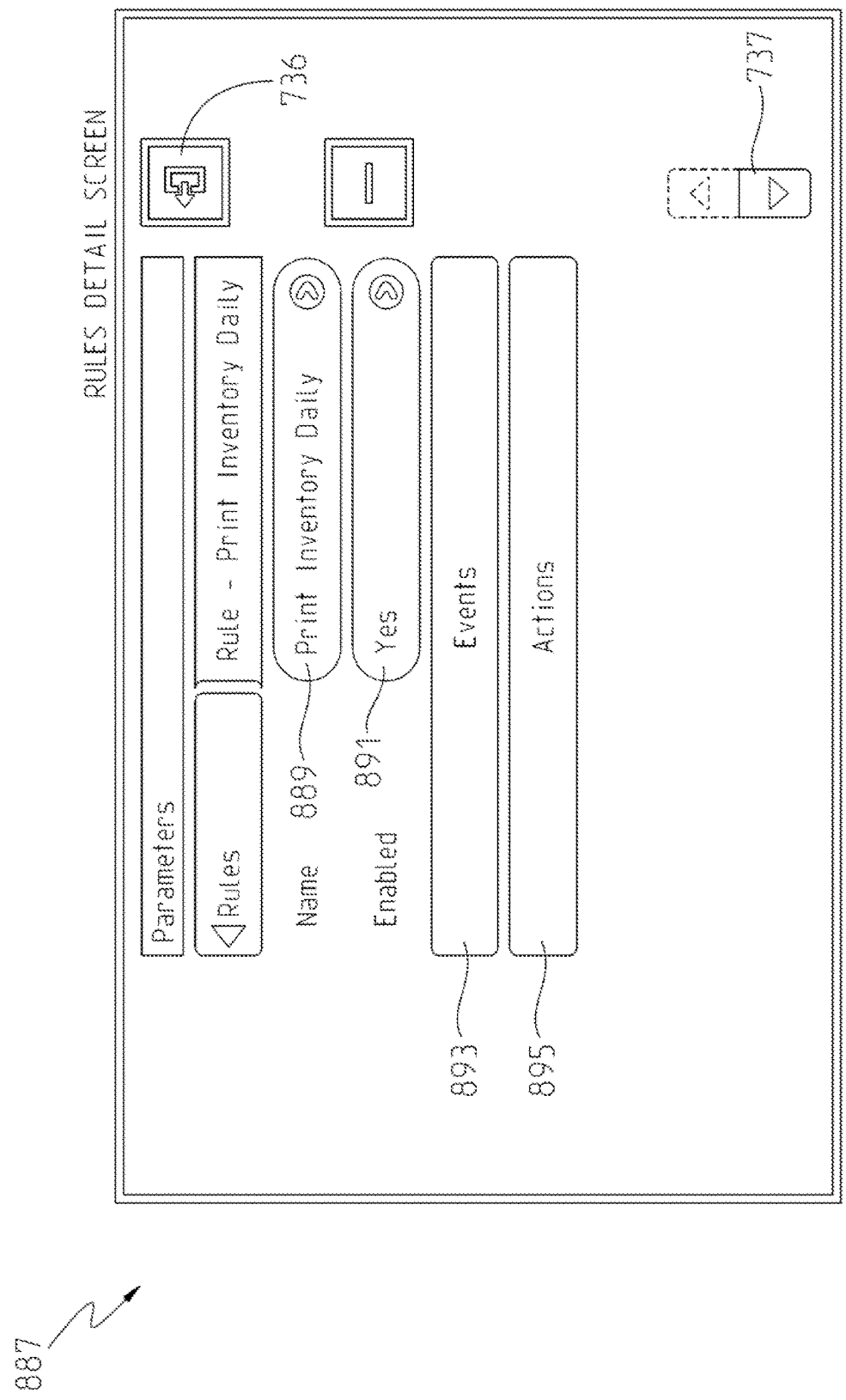

As indicated above, activation of scroll arrows 737 of FIG. 48 causes console 12 to generate further parameters screens. One such screen (parameters screen 720A) is depicted in FIG. 69A. Parameters screen 720A includes, among other things, a rules button 734A. Activation of rules button 734A causes console 12 to display a rules screen 881 such as that depicted in FIG. 69B. Rules screen 881 includes a plurality of rules icons 883, each of which represents a specification of one or more actions that take place upon the occurrence of an event. For example, when the user activates print inventory daily rule button 885, a rules detail screen 887 such as that depicted in FIG. 69C is displayed which allows the user to configure the parameters associated with the print inventory daily rule. More specifically, rules detail screen 887 includes a name button 889, activation of which causes display of a pop-up keyboard as described above to permit the user to name the rule, an enabled button 891 which permits the user to enable or disable the rule, an events button 893 and an actions button 895. The content of rules detail screen 887 depends upon the rules icon 883 activated by the user from rules screen 881 of FIG. 69B. In this example, activation of events button 893 causes display of events screen 897 of FIG. 69D which includes one or more event buttons 899 and an add button 901 which permits the user to specify additional events. In this example, activation of event button 899 causes display of an event detail screen 903 such as that depicted in FIG. 69E which in this example includes a type button 905, a schedule type button 907, and a time button 909. The buttons 907, 909 depicted in FIG. 69E depend upon the type of event selected using type button 905. Activation of type button 905 causes a type window 911 to pop up as depicted in FIG. 69F. From type window 911, the user may specify the type of event being programmed as part of the corresponding rule by selecting one of the options buttons 913. One of options buttons 913 is one-touch button 915, activation of which permits the user to specify that the rule being programmed should be displayed as one of the one-touch buttons 206A-D shown in FIG. 4A. If the user activates one-touch button 915, console 12 returns to the display of event detail screen 903, but type button 905 is now labeled one-touch button, and schedule type button 907 and time button 909 are replaced by position button 917 as shown in FIG. 69G. Activation of position button 917 results in a pop-up window similar to window 911 of FIG. 69F which permits the user to select the location (upper left, upper right, lower left, or lower right) of the newly defined one-touch button 206A-D for display on home screen 200 of FIG. 4A.

Figure 69D:
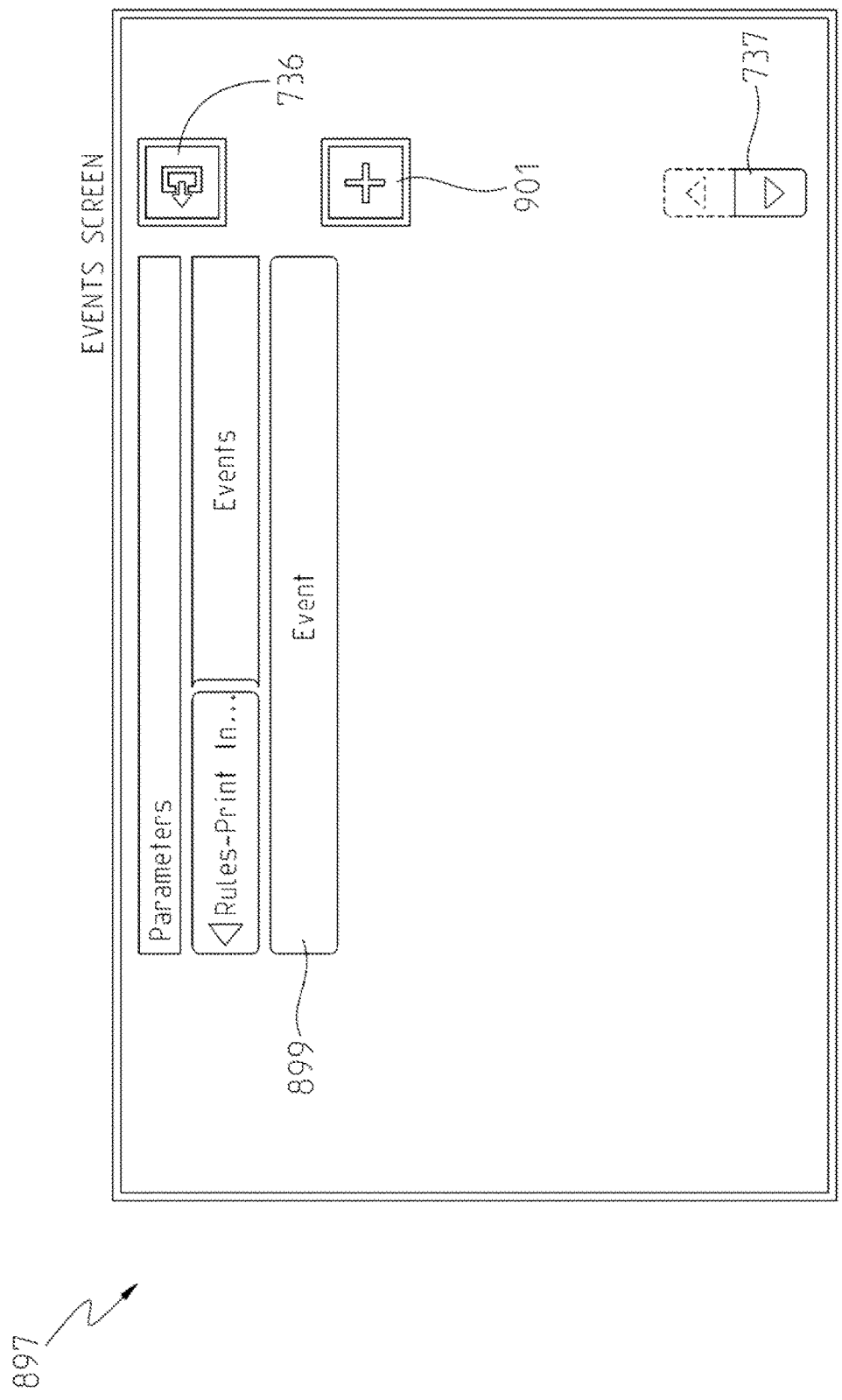
Figure 69E:
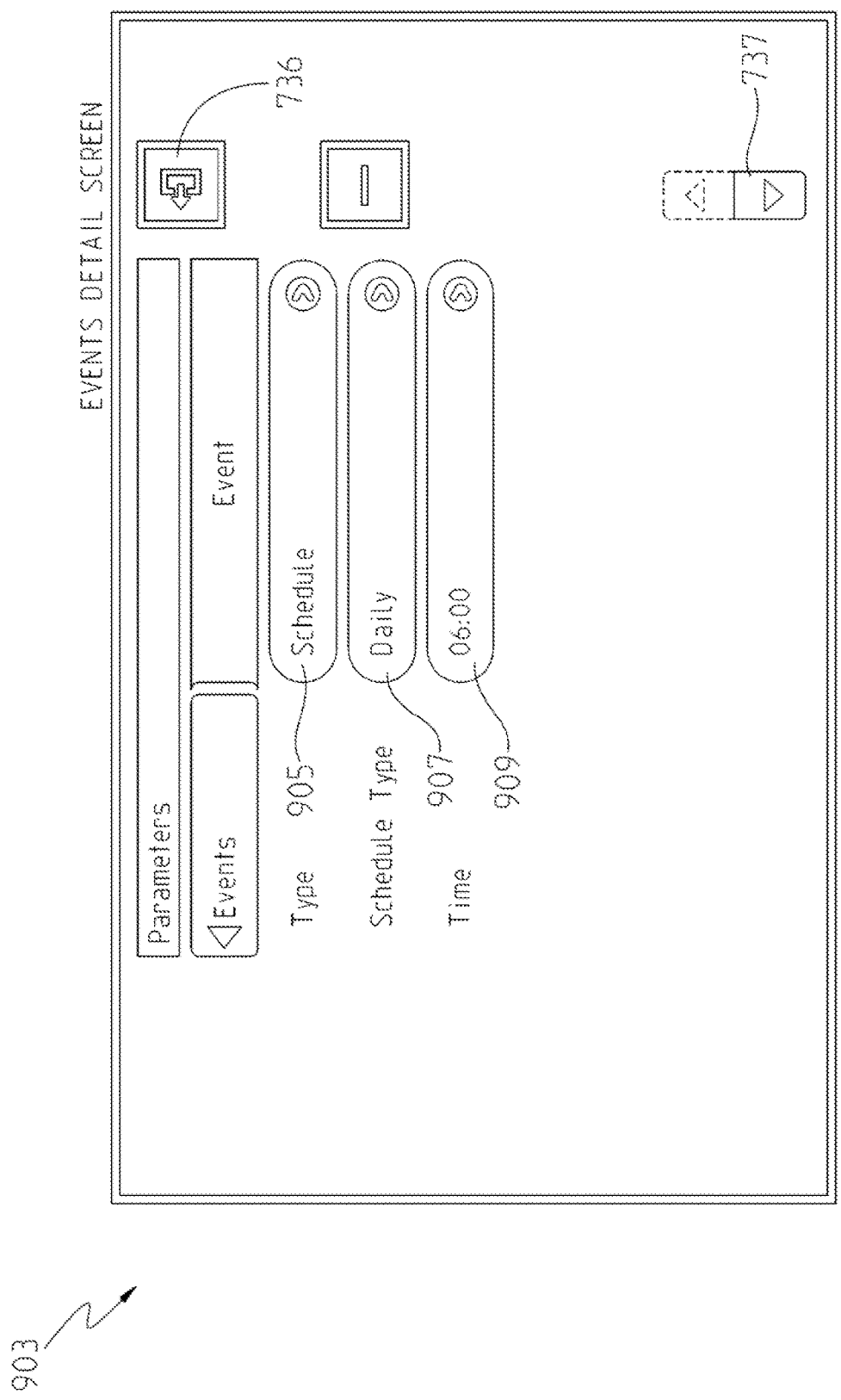
Figure 69F:
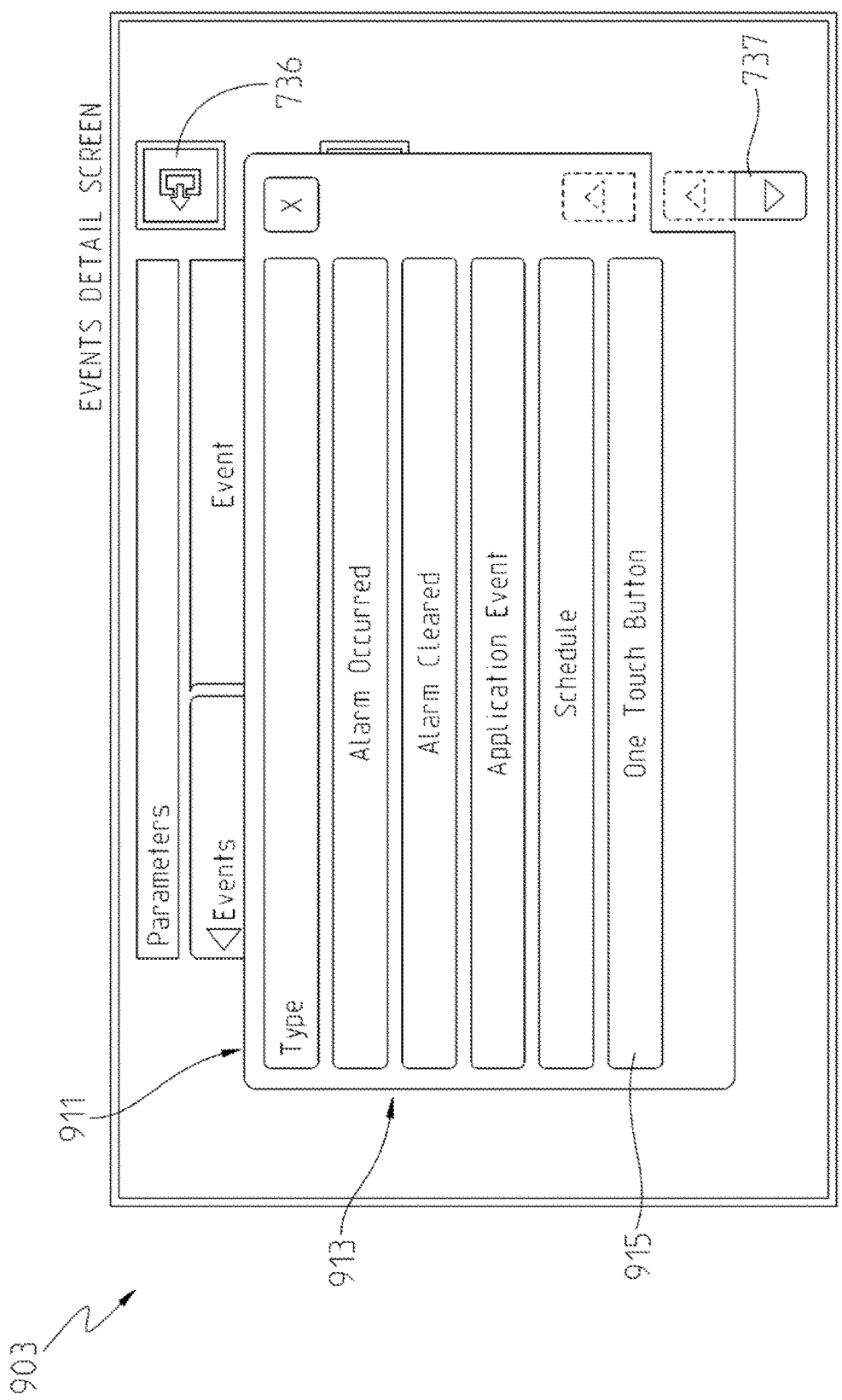
Figure 69G:
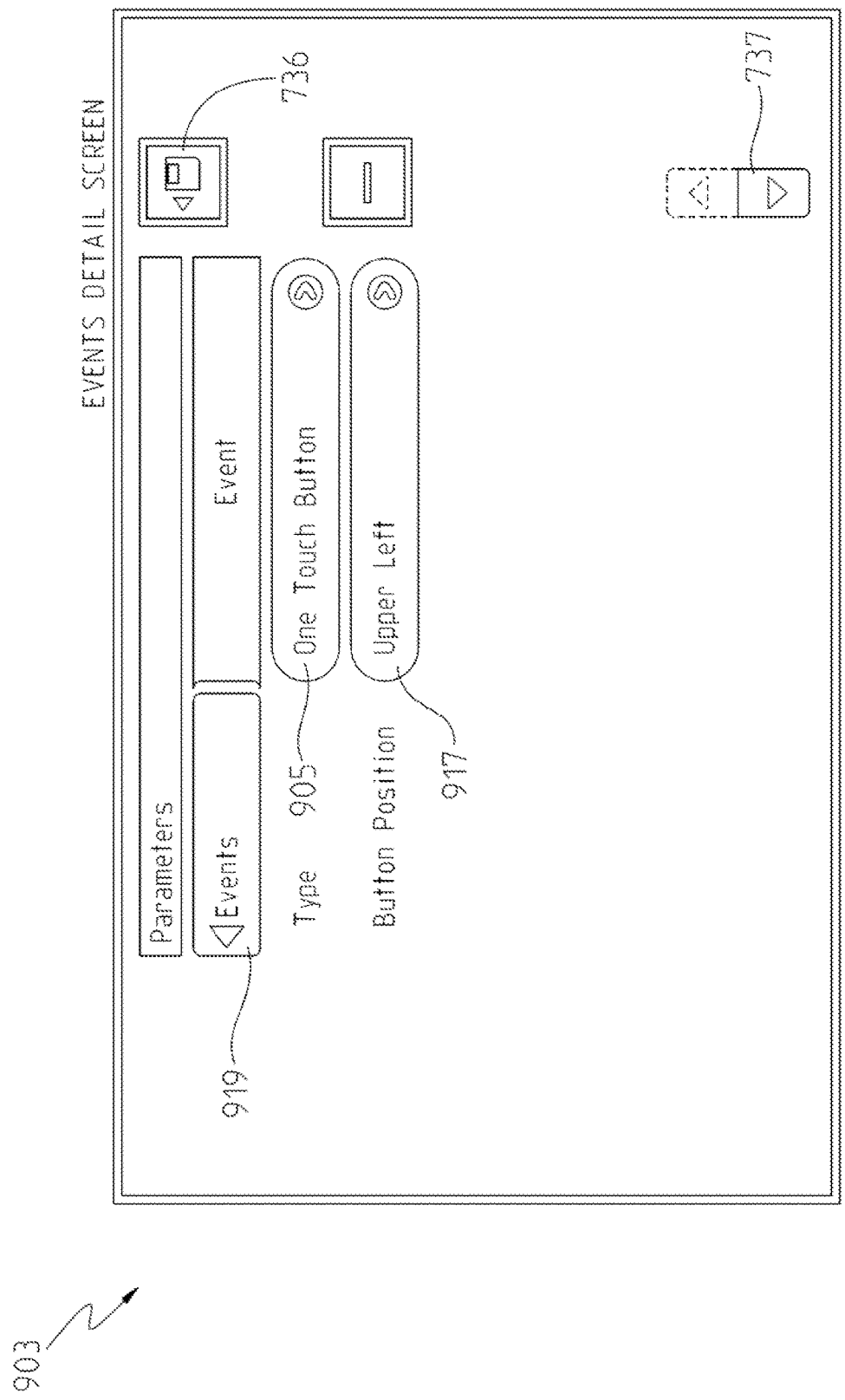
Figure 69H:
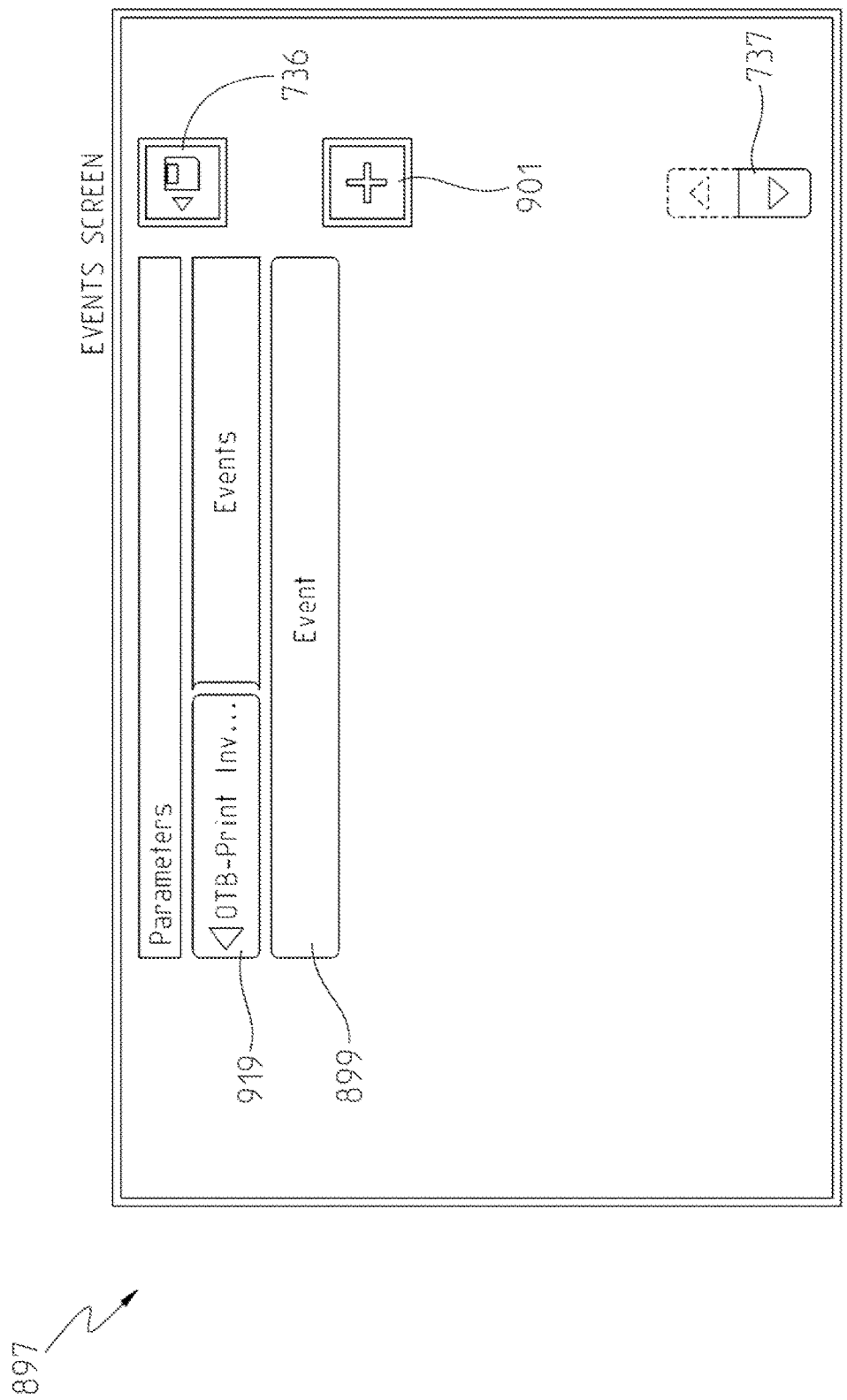
Figure 69I:
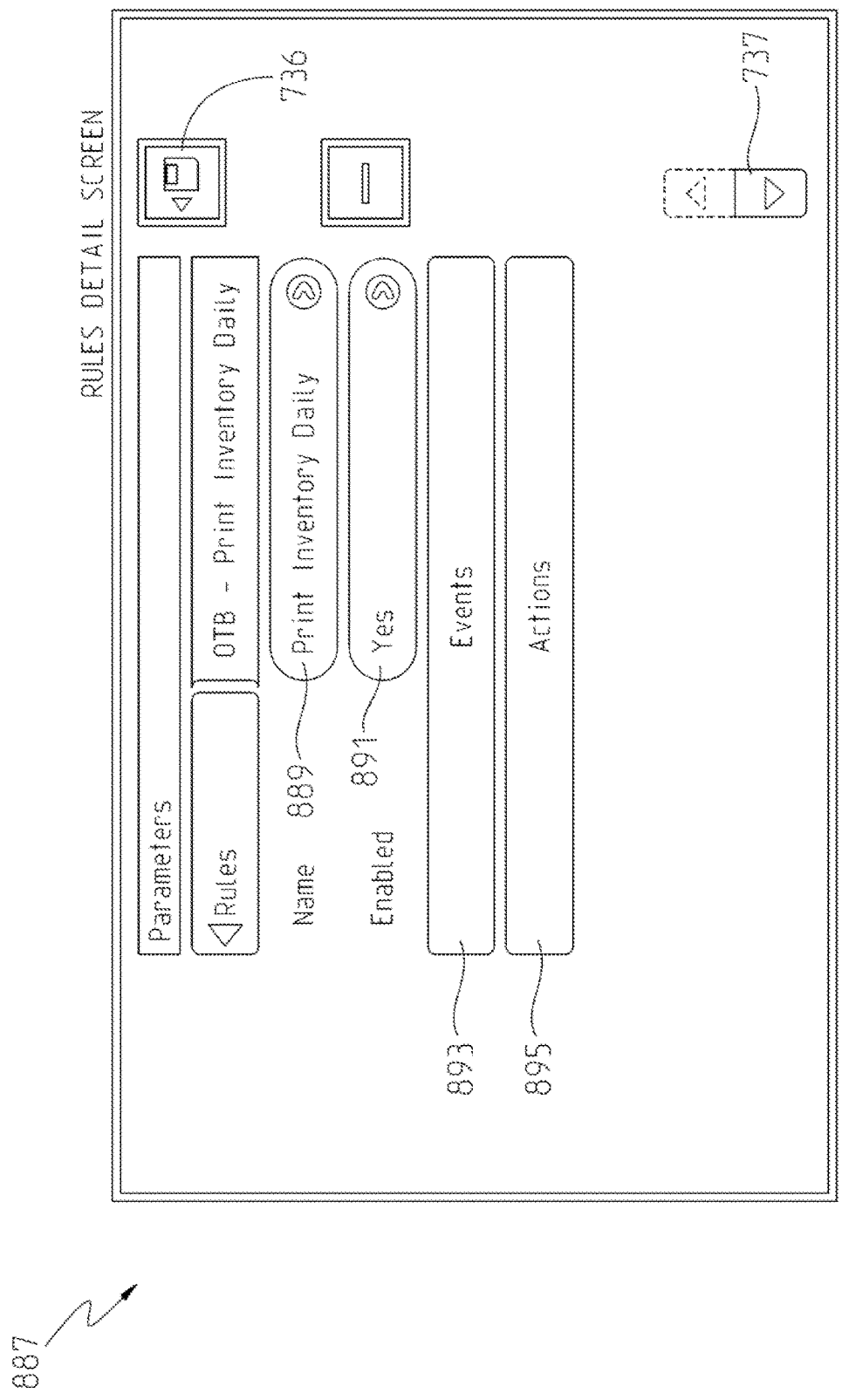
Figure 69J:
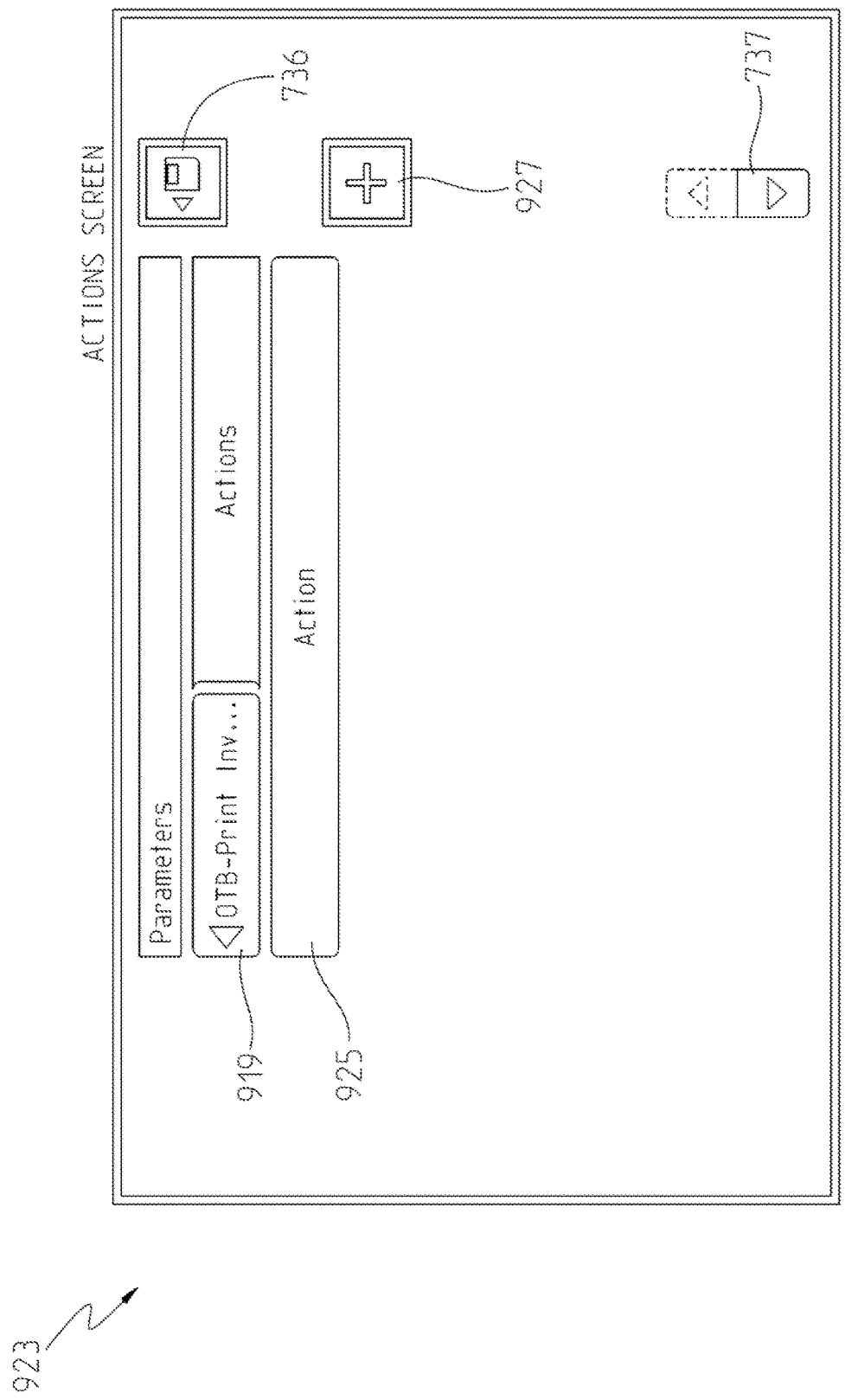
Figure 69K:
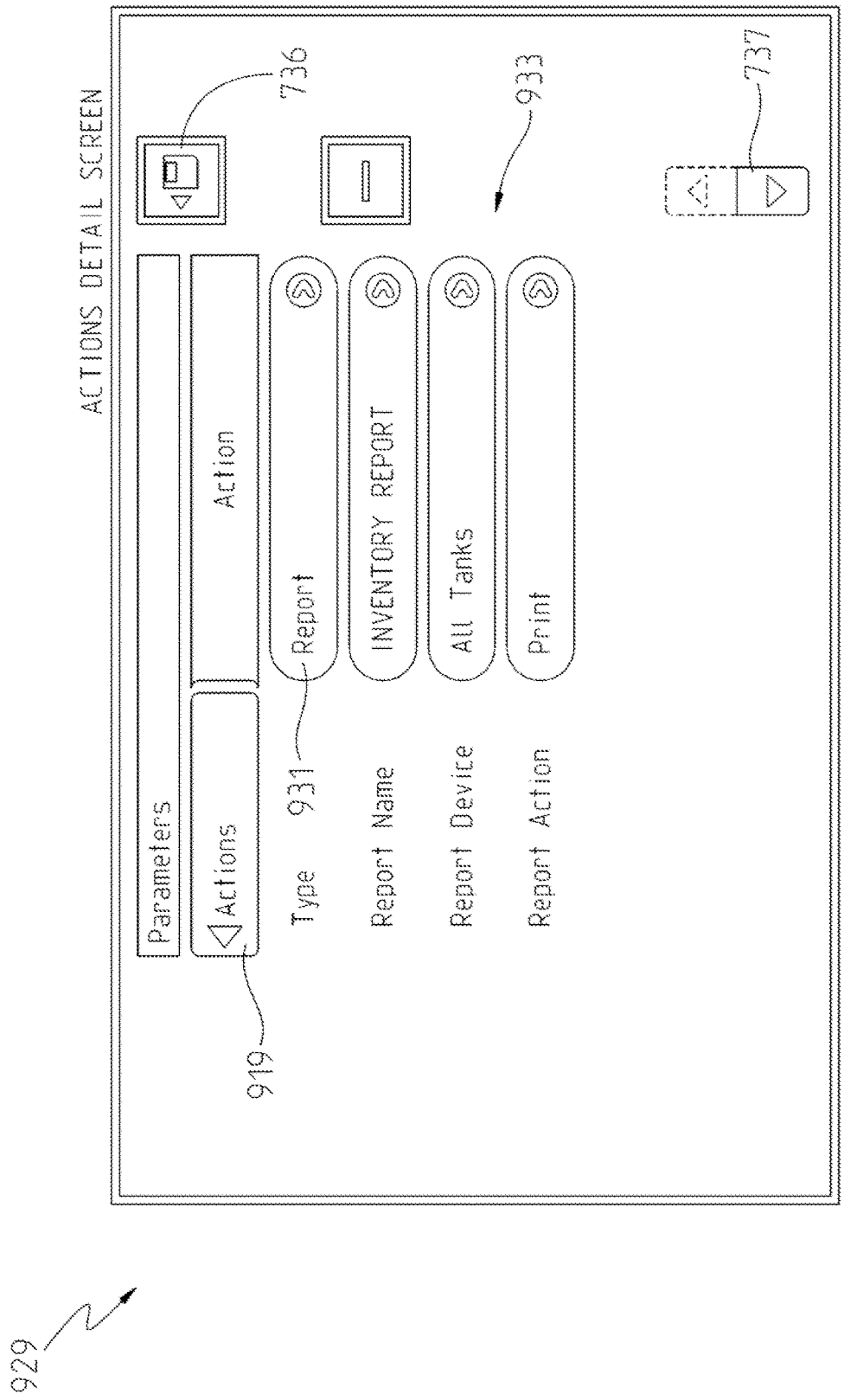

If the user activates return button 919 of FIG. 69G, then console 12 again displays events screen 897 of FIG. 69D except that return button 919 indicates that the rule being programmed is a one-touch button for printing a daily inventory report (i.e., "OTB—Print Inventory Daily") as shown in FIG. 69H. If the user again activates return button 919, then console 12 again displays rules detail screen 887 of FIG. 69C except that rule identification field 921 identifies the rule being programmed as "OTB—Print Inventory Daily" as shown in FIG. 69I. The user may define or edit the actions that will take place upon activation of the one-touch button being programmed by activating actions button 895. In this example, when actions button 895 is activated, console 12 displays actions screen 923 as shown in FIG. 69J. As shown, actions screen 923 includes, among other things, return button 919, action button 925 and add button 927. The user may activate add button 927 to include (and edit) additional actions to be executed upon activation of the one-touch button being programmed. When the user activates action button 925, an actions detail screen 929 such as depicted in FIG. 69K is displayed. Actions detail screen 929 includes a type button 931, activation of which permits the user to select from a plurality of action types such as email, report, relay, tank testing, line testing, etc. Depending upon the action type selected using type button 931, other action definition buttons 933 are displayed to permit the user to define parameters of the action being programmed.

Figure 70:
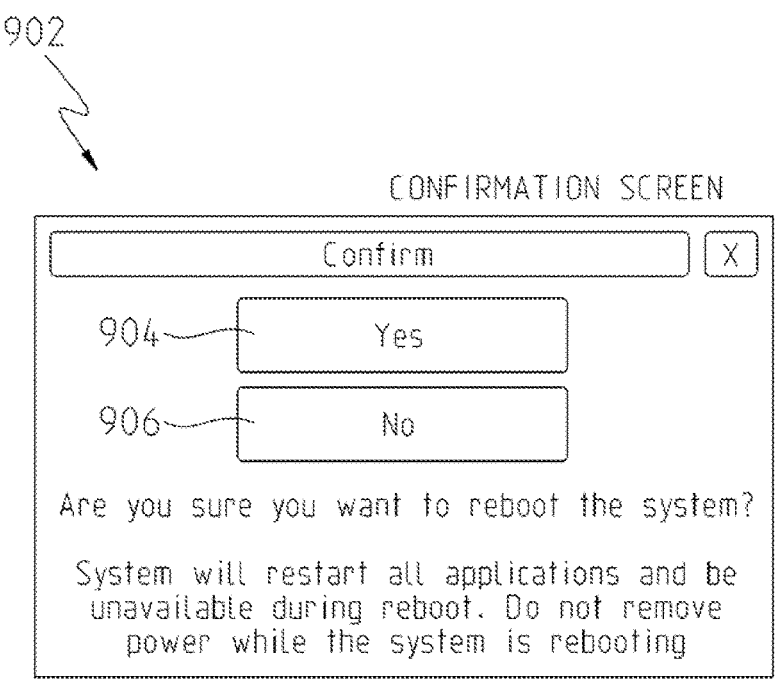
FIG. 70 is a screenshot of a reboot confirmation screen accessible through the utilities function screen of FIG. 40.

Returning to utilities function screen 586 of FIG. 40, when the user activates reboot system icon 592, a confirmation screen 902 such as that depicted in FIG. 70 is displayed. As shown, confirmation screen 902 includes a yes button 904, which when activated causes console 12 to restart all applications (although in one embodiment of the disclosure, the user must be an administrator and enter a password to initiate a reboot), and a no button 906, which when activated returns the user to utilities function screen 586.

Figure 71:
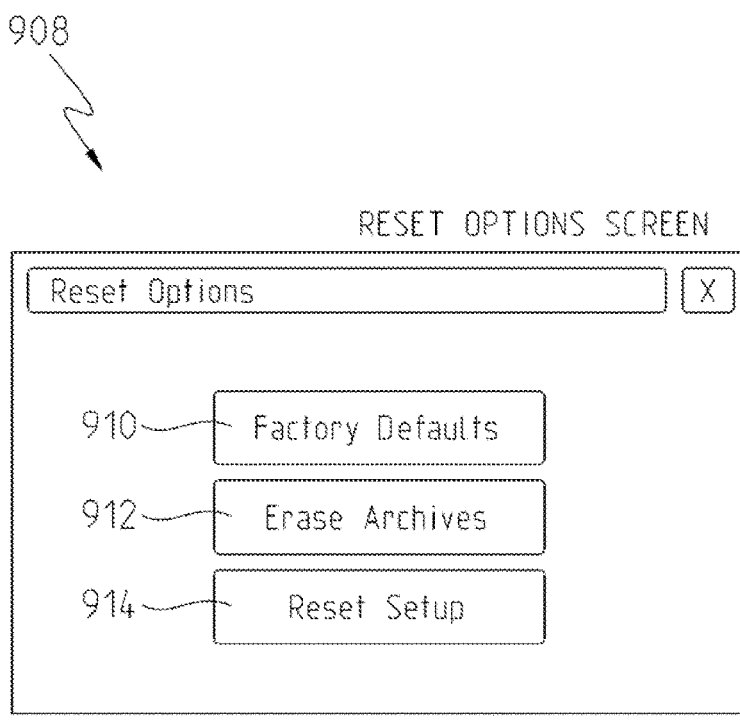
FIG. 71 is a screenshot of a reset options screen accessible through the utilities function screen of FIG. 40.

When the user activates reset options icon 594 of utilities function screen 586, a reset options screen 908 such as that depicted in FIG. 71 is displayed. As shown, reset options screen 908 includes a factory defaults button 910, which when activated causes the system to reset all system options to their default settings, an erase archives button 912, which when activated erases all historical data that has been collected by console 12 (e.g., deliveries, tank tests, alarms, etc.) without changing configuration programming options, and a reset setup button 914, which when activated resets all configuration programming options and changes all parameters back to the factory default settings, but retains all historical data.

Figure 72:
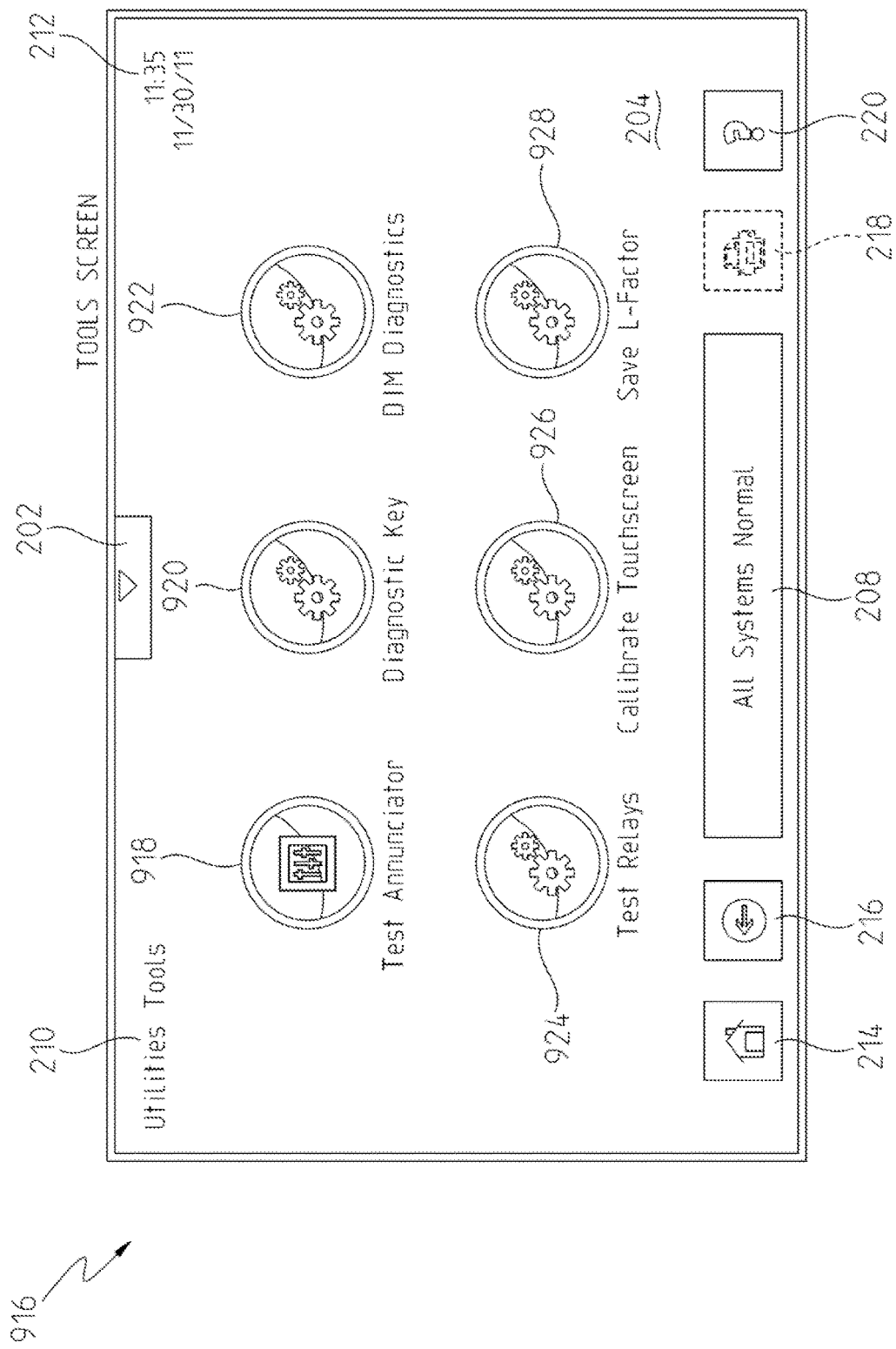
FIG. 72 is a screenshot of a tools screen accessible through the utilities function screen of FIG. 40.

When the user activates tools icon 596 of utilities function screen 586 (FIG. 40), a tools screen 916 such as that depicted in FIG. 72 is displayed. As shown, tools screen 916 includes a test annunciator icon 918, a diagnostic key icon 920, a DIM diagnostics icon 922, a test relays icon 924, a calibrate touchscreen icon 926, and a save L-Factor icon 928. Activation of test annunciator icon 918 causes console 12 to activate an internal alarm beeper or horn (shown as item 29 in FIG. 1) until the user activates a cancel button, thereby permitting the user to test the operation of the alarm. Diagnostic key icon 920 is used to enter an advanced diagnostics mode. When the user activates diagnostic key icon 920, console 12 displays a series of letters and numbers which the user provides to technical support personnel associated with console 12 to receive a password needed to enter the advanced diagnostics mode. Activation of DIM diagnostics icon 922 allows a technician to interface with the internal DIM (dispenser interface module) settings. If the DIM module is installed, activation of icon 922 causes console 12 to provide a special set of diagnostics tools for use with the DIM module. Activation of test relays icon 924 allows the user to view the state of all system relays and test their operation by activating and deactivating them. Activation of calibrate touchscreen icon 926 enables a re-calibration procedure for the display 28. In general, the procedure prompts the user to touch specific locations on display 28 to recalibrate its touchscreen functionality. Activation of save L-Factors icon 928 allows a technician to save line factors read from a DIM when using a specific type of dispenser.

Containment Function Screen

Figure 73:
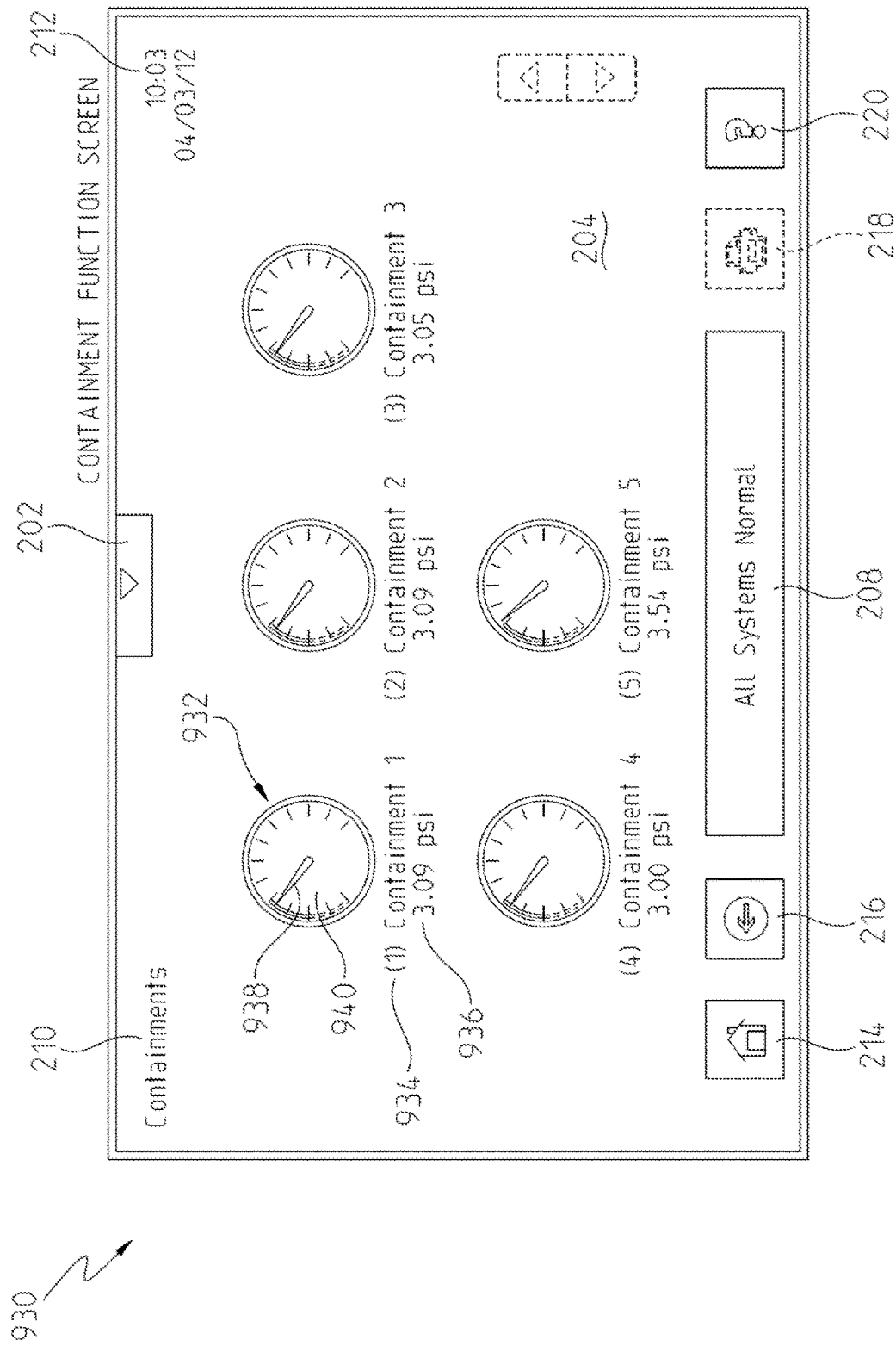
FIG. 73 is a screenshot of a containment function screen generated by the console of FIG. 1.

Activation of containment icon 230I from navigation window 222 (FIGS. 6 and 7) causes console 12 to display containment function screen 930 as depicted in FIG. 73. In general, containment function screen 930 permits the user to access information regarding and perform control functions on the containment system(s) 18 installed at the site. As shown, containment function screen 930 includes all of the components of home screen 200 except that one-touch buttons 206A-D previously occupying content field 204 are replaced with a plurality of containment icons 932, each including a containment identifier 934 which identifies the secondary containment system 18 and a vacuum indicator 936 which provides a numeric representation of the vacuum level in the containment system 18. Containment icons 932 each also include a dial 938 on a gauge 940 which provide a graphic representation of the vacuum level provided by vacuum indicator 936.

Figure 74:
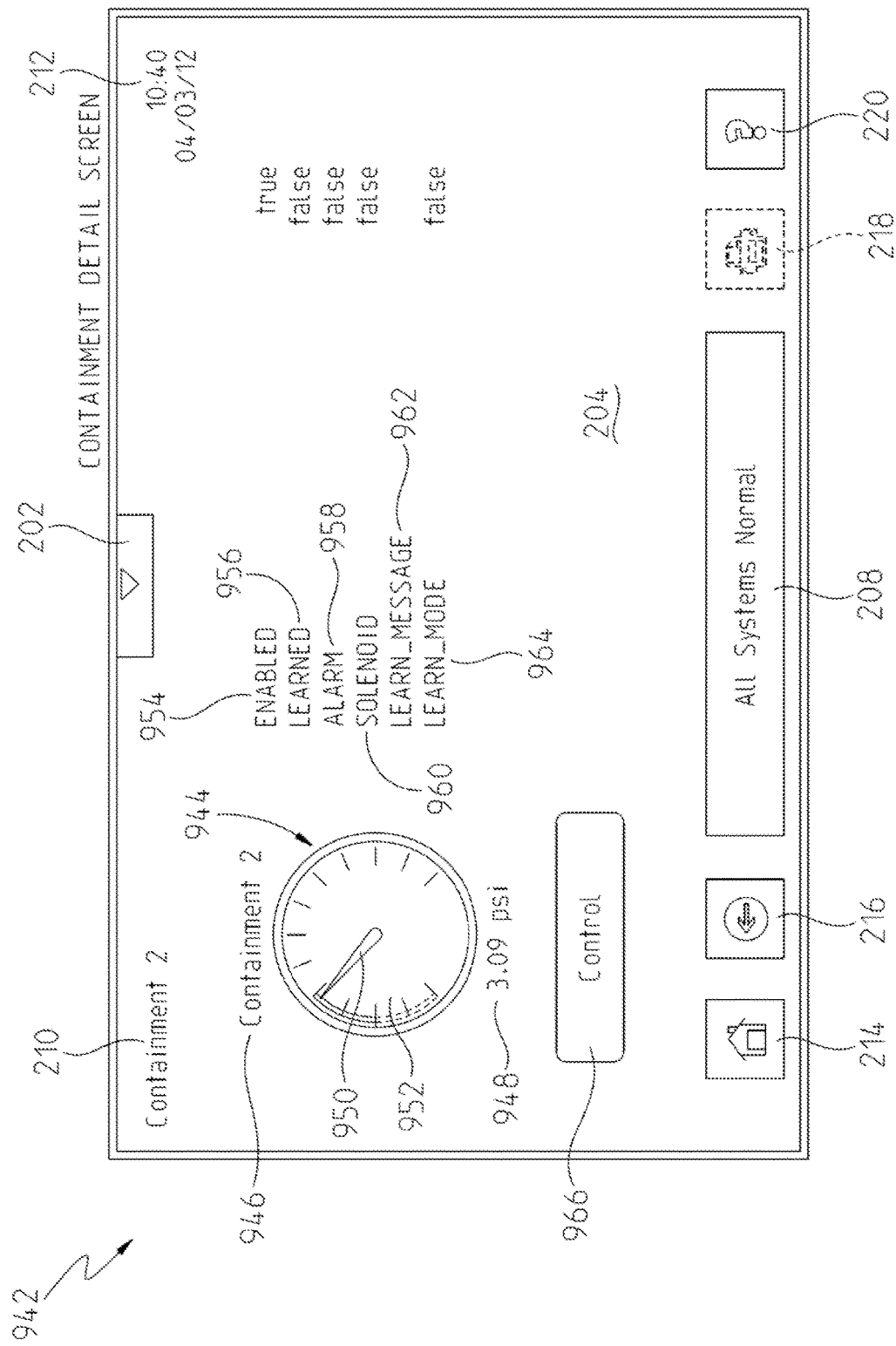
FIG. 74 is a screenshot of a containment detail screen accessible through the containment function screen of FIG. 73.
Figure 75:
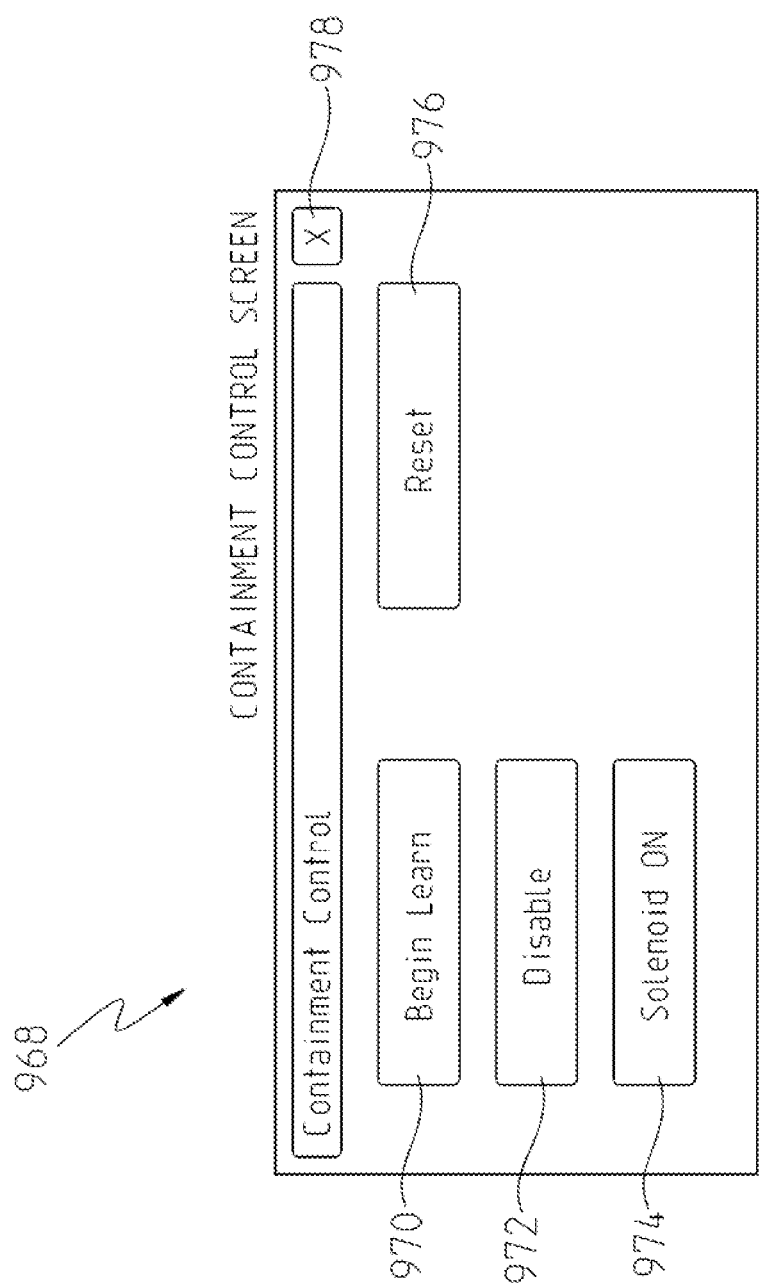
FIG. 75 is a screenshot of a containment control screen accessible through the containment detail screen of FIG. 74.

The user may obtain additional information about any of the containment systems 18 represented by each of containment icons 932 by touching the icon 932. When any one of containment icons 932 is activated, a containment detail screen 942 such as that depicted in FIG. 74 is displayed. As shown in FIG. 74, screen identification field 210 is populated with an identification of the containment system 18 corresponding to the containment icon 932 activated by the user and content field 204 is populated with information regarding the containment system 18. Containment detail screen 942 generally includes a detailed containment icon 944 accompanied by detailed containment identification information 946 and vacuum indicator 948. Detailed containment icon 944 also includes a dial 950 and gauge 952 which together provide a graphic representation of the vacuum level indicated by vacuum indicator 948. Containment detail screen 942 further includes an enabled field 954 indicating whether the system is enabled, a learned field 956 indicating whether the containment 18 has been learned (via a process of controlled leaking in the manner described above with reference to lines 14), an alarm field 958 indicating whether there is an alarm condition associated with the particular containment 18, a solenoid field 960 indicating the condition of the solenoid valve used to control whether vacuum created by a submersible pump is applied to the particular containment 18, a learn message field 962 identifying the actual process of learning the containment 18, a learn mode field 964 indicating whether the containment 18 is or is not currently in learn mode, and a control button 966, activation of which causes the system to display a containment control screen 968 such as that depicted in FIG. 75.

Containment control screen 968 includes a begin learn button 970, a disable button 972, a solenoid on button 974, a reset button 976, and a cancel button 978, activation of which returns the user to containment detail screen 942. Activation of begin learn button 970 starts the learning process described above. Activation of disable button 972 disables the associated containment 18 by preventing it from running any tests or performing any monitoring. Activation of solenoid on button 974 switches the solenoid associated with the containment 198 on and off. Finally, activation of reset button 976 resets any alarm currently in effect for the particular containment 18.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A fuel delivery management system, the system including:
    a console having:
        a processor;
        a touch-sensitive display;
        a plurality of ports configured to facilitate communications with a plurality of lines, tanks, and pumps; and
        a memory that contains instructions that, when executed by the processor, cause the processor to:
            generate a home screen on the touch-sensitive display, the home screen having a navigation menu icon that, when activated by a user, causes the processor to generate a navigation window that overlays a portion of the home screen,
            wherein the navigation window includes a plurality of user-interface elements including a first user-interface element that, when activated by a user, causes the processor to enable user configuration of a second user-interface element,
            wherein, when activated by a user subsequent to the user configuration, the second user-interface element causes the processor to present, on the touch-sensitive display, a screen that corresponds to the second user-interface element,
            wherein, in addition to the first user-interface element, the plurality of user-interface elements in the navigation window further includes at least one user-interface navigation element that, when activated by a user, causes the processor to present, on the touch-sensitive display, a screen that corresponds to the activated user-interface navigation element, wherein:
                the at least one user-interface navigation element includes a first user-interface navigation element and a second user-interface navigation element,
                the first user-interface navigation element, when activated by a user, causes the processor to present, on the touch-sensitive display, a screen that corresponds to the first user-interface navigation element; and
                the second user-interface navigation element, when activated by a user, causes the processor to present, on the touch-sensitive display, a screen that corresponds to the second user-interface navigation element, wherein the navigation menu icon is displayed:
                    in a first location on the home screen,
                    in the first location on the screen that corresponds to the first user-interface navigation element, and
                    in the first location on the screen that corresponds to the second user-interface navigation element.

2. The fuel delivery management system of claim 1, wherein the screen that corresponds to the first user-interface navigation element includes information regarding one of the plurality of lines, tanks, and pumps.

3. The fuel delivery management system of claim 1, wherein the home screen further includes a status window that includes system status information and is displayed in one of a plurality of different ways, each corresponding to a different system status.

4. The fuel delivery management system of claim 3, wherein the status window being activated by a user causes the processor to display an alarm screen.

5. The fuel delivery management system of claim 4, wherein the alarm screen includes a hint field that provides information about an active alarm and recommendations for addressing the alarm.

6. The fuel delivery management system of claim 3, wherein the status region is displayed:
    in a second location on the home screen,
    in the second location on the screen that corresponds to the first user-interface navigation element, and
    in the second location on the screen that corresponds to the second user-interface navigation element.

7. The fuel delivery management system of claim 1, wherein the screen that corresponds to the second user-interface element has a home icon that, when activated by a user, causes the processor to re-present the home screen on the touch-sensitive display.

8. The fuel delivery management system of claim 1, wherein at least one of (i) the screen that corresponds to the first user-interface navigation element and (ii) the screen that corresponds to the second user-interface navigation element has a home icon that, when activated by a user, causes the processor to re-present the home screen on the touch-sensitive display.

9. The fuel delivery management system of claim 8, wherein each of (i) the screen that corresponds to the first user-interface navigation element and (ii) the screen that corresponds to the second user-interface navigation element has such a home icon.

10. The fuel delivery management system of claim 1, wherein the set of screens that corresponds collectively to the at least one user-interface navigation element makes up a proper subset of a total set of screens of the console.

* * * * *